United States Patent
Vogelsang et al.

(10) Patent No.: US 9,344,635 B2
(45) Date of Patent: May 17, 2016

(54) CONDITIONAL-RESET, TEMPORALLY OVERSAMPLED IMAGE SENSOR

(71) Applicant: Rambus Inc., Sunnyvale, CA (US)

(72) Inventors: Thomas Vogelsang, Mountain View, CA (US); David Geoffrey Stork, Portola Valley, CA (US); John Eric Linstadt, Palo Alto, CA (US); James E. Harris, San Jose, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 14/355,799

(22) PCT Filed: Nov. 8, 2012

(86) PCT No.: PCT/US2012/064177
§ 371 (c)(1),
(2) Date: May 1, 2014

(87) PCT Pub. No.: WO2013/070932
PCT Pub. Date: May 16, 2013

(65) Prior Publication Data

US 2014/0293102 A1    Oct. 2, 2014

Related U.S. Application Data

(60) Provisional application No. 61/557,364, filed on Nov. 8, 2011, provisional application No. 61/557,368, filed on Nov. 8, 2011, provisional application No. 61/580,189, filed on Dec. 23, 2011.

(51) Int. Cl.
*H04N 3/14* (2006.01)
*H04N 5/335* (2011.01)
(Continued)

(52) U.S. Cl.
CPC .............. *H04N 5/235* (2013.01); *H04N 5/2355* (2013.01);
(Continued)

(58) Field of Classification Search
CPC ..... H04N 5/235; H04N 5/3535; H04N 5/355; H04N 5/3745; H04N 5/2355; H04N 5/3355; H04N 5/35536; H04N 1/00769

USPC .......... 348/294, 298, 302, 308, 312; 250/208.1; 257/290–292
See application file for complete search history.

(56) References Cited

U.S. PATENT DOCUMENTS 6,152,368 A * 11/2000 Olmstead et al. ............. 235/454
7,876,362 B2    1/2011 Krymski
(Continued)

FOREIGN PATENT DOCUMENTS

| WO | WO-2008-027212 A1 | 3/2008 |
| WO | WO-2008-062404 A2 | 5/2008 |
| WO | WO-2010-084493 A1 | 7/2010 |

OTHER PUBLICATIONS

Clark, R. N., "Digital Cameras: Does Pixel Size Matter? Factors in Choosing a Digital Camera (Does Sensor Size Matter?)," ClarkVision.com, Slideshow Presentation, Jun. 8, 2011. 36 pages.
Finkelstein et al., "STI-Bounded Single-Photon Avalanche Diode in a Deep-Submicrometer CMOS Technology," IEEE Electronic Device Letters, vol. 27, No. 11, Nov. 2006, pp. 887-889. 3 pages.
Fossum, Eric R., "Active Pixel Sensors: Are CCD's Dinosaurs?" SPIE vol. 1900, 1993, pp. 2-14. 13 pages.

(Continued)

*Primary Examiner* — Yogesh Aggarwal
(74) *Attorney, Agent, or Firm* — Charles Shemwell

(57) ABSTRACT

Pixel circuits in an image sensor are sampled repetitively during an image frame period. At each sampling, a signal indicative of the photocharge integrated by a pixel circuit since last reset is compared to a threshold. If the integrated photocharge signal has not reached the threshold, the pixel circuit is permitted to continue integrating photocharge. If the integrated photocharge signal has reached the threshold, the pixel circuit is reset to remove integrated photocharge and photocharge integration for that pixel circuit is restarted. A corresponding pixel circuit value is recorded for the reset pixel circuit.

20 Claims, 38 Drawing Sheets

(51) Int. Cl.
*H04N 5/235* (2006.01)
*H04N 5/355* (2011.01)
*H04N 5/3745* (2011.01)
*H04N 5/353* (2011.01)
*H04N 1/00* (2006.01)

(52) U.S. Cl.
CPC ............ *H04N 5/3355* (2013.01); *H04N 5/355* (2013.01); *H04N 5/3535* (2013.01); *H04N 5/35536* (2013.01); *H04N 5/3745* (2013.01); *H04N 1/00769* (2013.01)

(56) References Cited

U.S. PATENT DOCUMENTS

| | | |
|---|---|---|
| 8,022,450 B2 | 9/2011 | Lim |
| 2008/0074524 A1 | 3/2008 | Panicacci |
| 2008/0218614 A1 | 9/2008 | Joshi et al. |
| 2009/0066825 A1 | 3/2009 | Nezaki et al. |
| 2010/0060765 A1 | 3/2010 | Kim et al. |
| 2010/0079651 A1 | 4/2010 | Lim |
| 2010/0134662 A1 | 6/2010 | Bub |
| 2011/0036989 A1 | 2/2011 | Marks et al. |
| 2011/0074995 A1 | 3/2011 | Rafferty et al. |
| 2011/0121421 A1 | 5/2011 | Charbon et al. |
| 2011/0149274 A1 | 6/2011 | Rissa et al. |

OTHER PUBLICATIONS

Fossum, Eric R., "What to Do With Sub-Diffraction-Limit (SDL) Pixels?—A Proposal for a Gigapixel Digital Film Sensor (DFS)," 2004, Discussion Session, pp. 214-217. 4 pages.
International Preliminary Report on Patentability dated May 22, 2014 (Chapter1) in International Application No. PCT/US2012/064177. 6 pages.
International Search Report and Written Opinion dated Jan. 28, 2013 in International Application No. PCT/US2012/064177. 14 pages.
Ohta, Jun, "Basic Pixel Structure," from Smart CMOS Image Sensors and Applications, Chapter 2.5: Fundamentals of CMOS Image Sensors, published Sep. 17, 2007, pp. 36-39. 2 pages.
Sbaiz et al., "The Gigavision Camera," IEEE Conference on Acoustics, Speech, and Signal Processing, Apr. 2009. 4 pages.
Veerappan et al., "A 160×128 Single-Photon Image Sensor with On-Pixel 55ps 10b Time-to-Digital Converter," 2011 IEEE International Solid-State Circuites Conference, Session 17, Biomedical and Displays, Paper 17.7, pp. 312-314. 3 pages.
Yang et al., "Gigapixel Binary Sensing: Image Acquisition Using Oversampled One-Bit Poisson Statistics," Draft, May 17, 2011. 33 pages.
Yang et al., "Bits from Photons: Oversampled Image Acquisition Using Binary Poisson Statistics," IEEE Transactions on Image Processing, vol. 21, No. 4, pp. 1421-1436, Apr. 2012. 16 pages.

\* cited by examiner

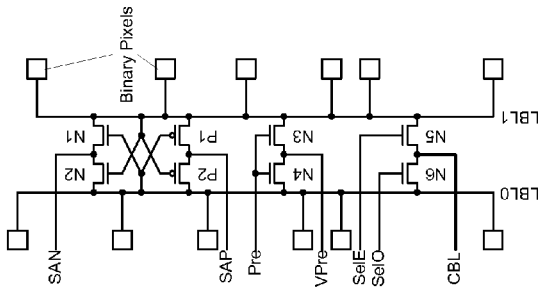
FIG. 4D
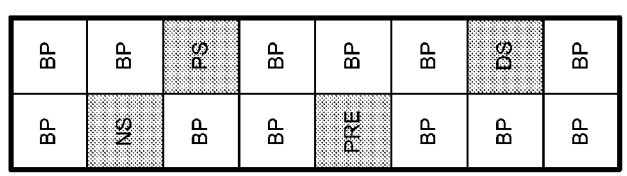
FIG. 4C
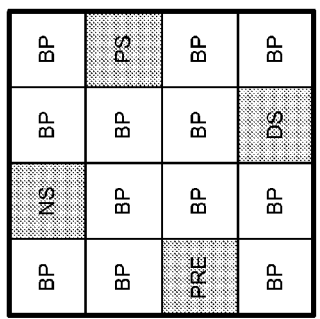
FIG. 4A
(4x4 SSP)
FIG. 4B
(8x2 SSP)

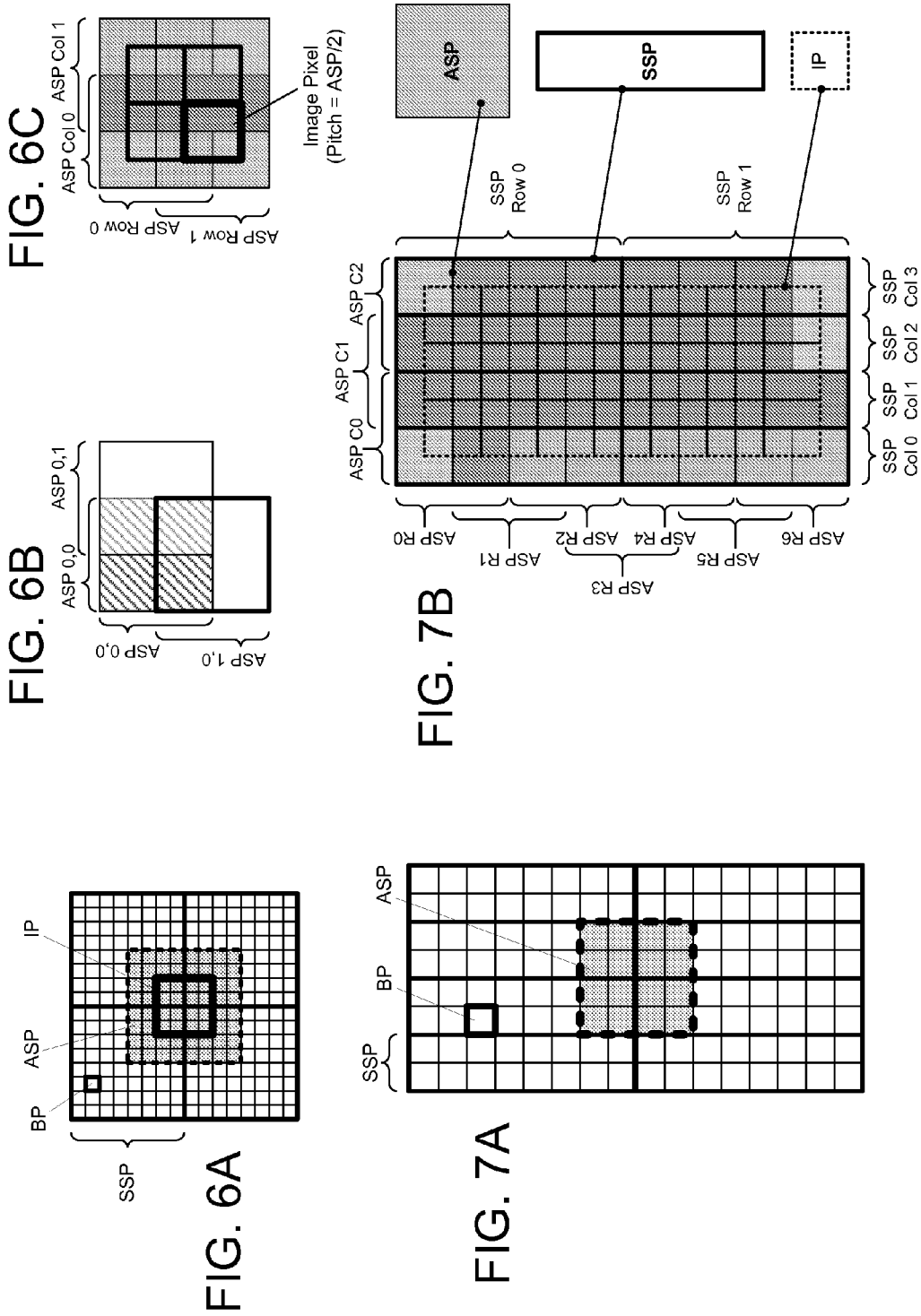

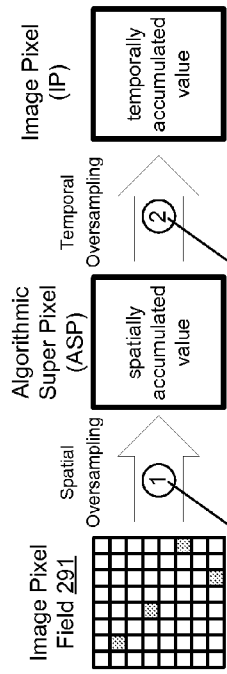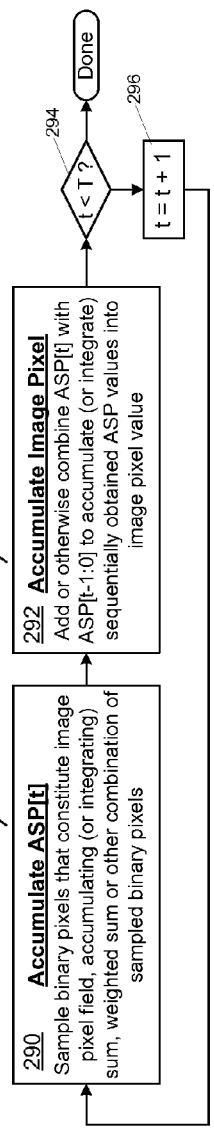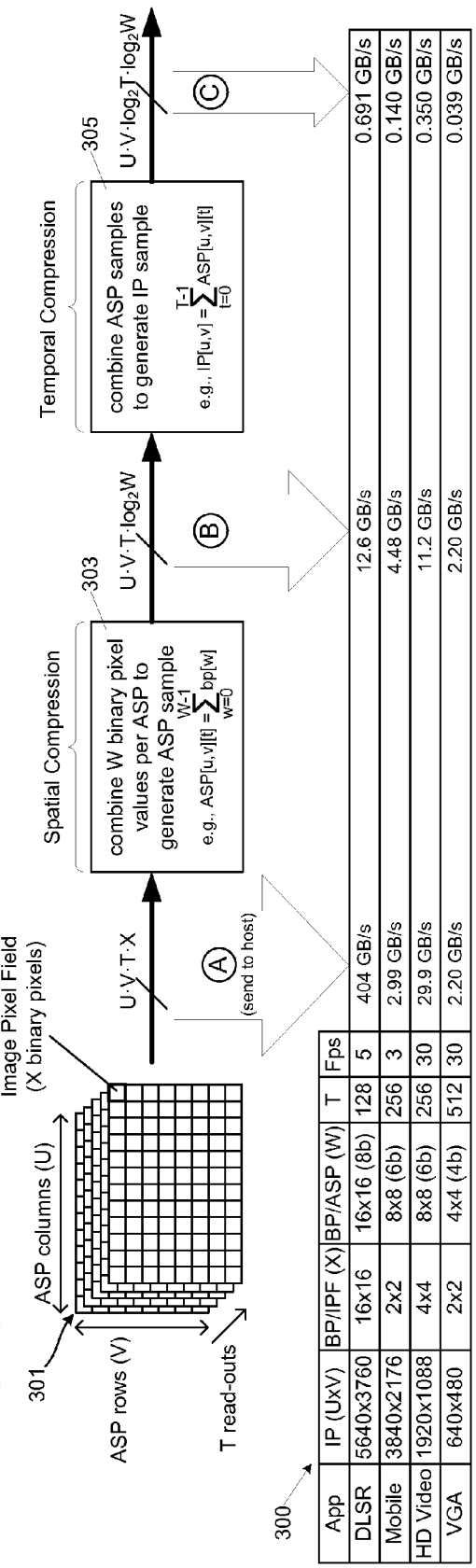
FIG. 8
Image Pixel Generation
FIG. 9

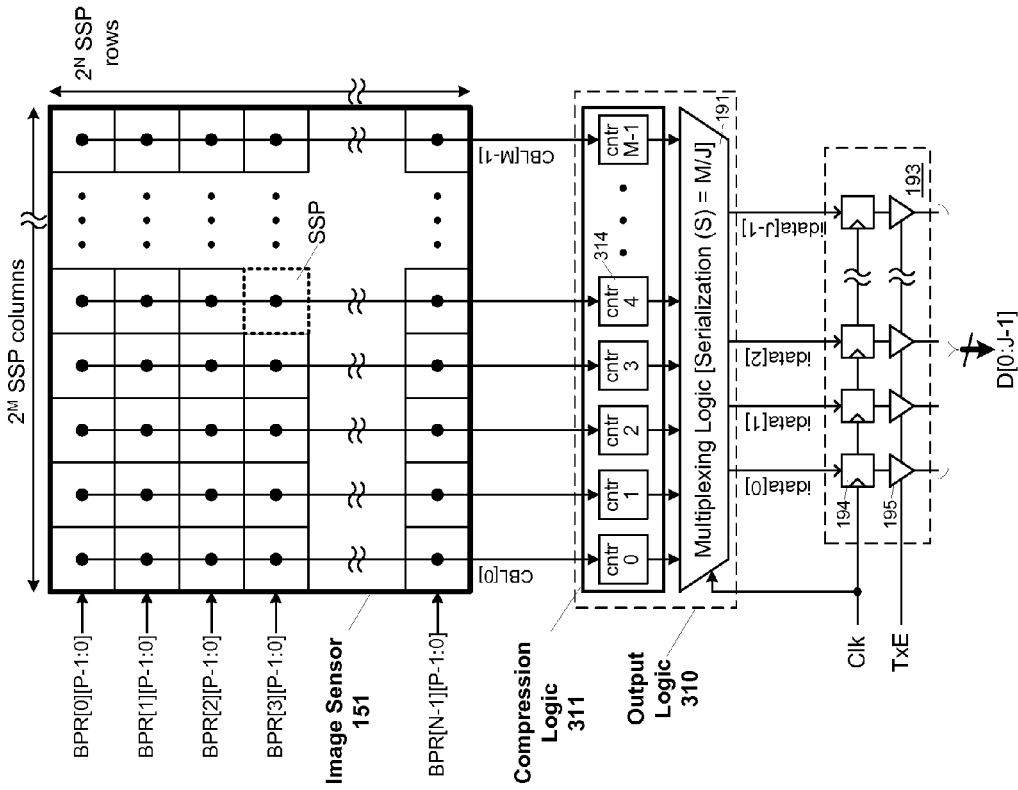

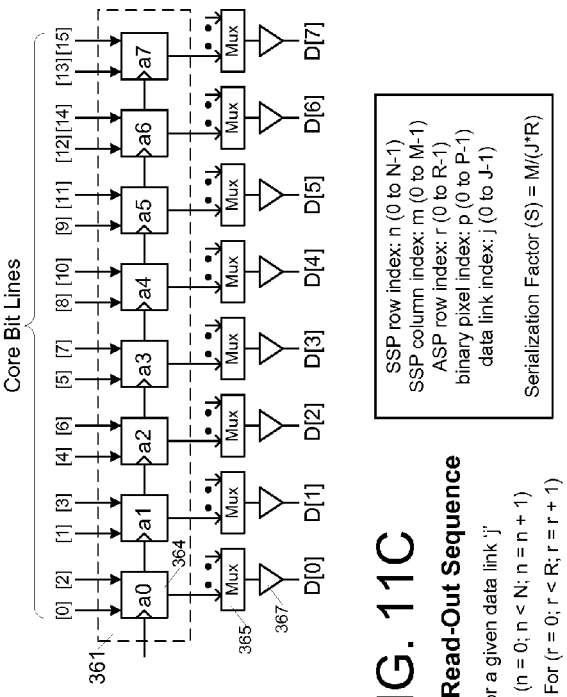

FIG. 11B

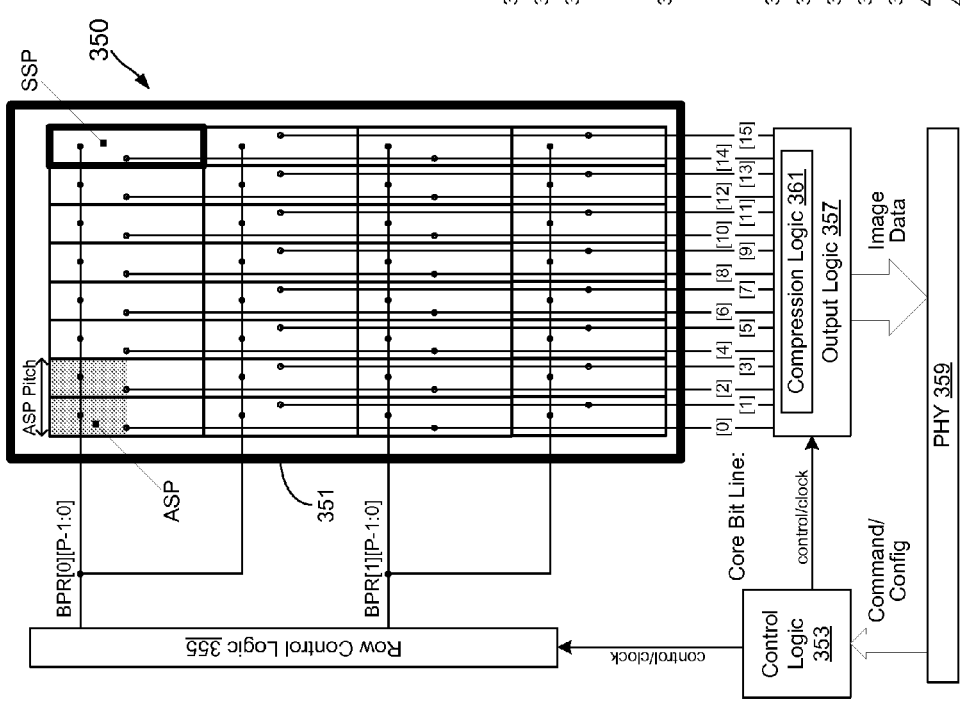

FIG. 11C

Pixel Read-Out Sequence

```
// for a given data link 'j'
382  For (n = 0; n < N; n = n + 1)
384    For (r = 0; r < R; r = r + 1)
386      For (p = r*P/2; p < (P/2+r*P/2); p = p + 1)
388        ASP[j] += pixel @ bpr[n][p], col[j]   + pixel @ bpr[n][p], col[j+1]
           ASP[j+J] += pixel @ bpr[n][p],col[j+J] + pixel @ bpr[n][p], col[j+J+1]
           ASP[j+2J] += pixel @ bpr[n][p],col[j+2J] + pixel @ bpr[n][p], col[j+2J+1]
           ...
           ASP[j+(S-1)*J] += pixel @ bpr[n][p],col[j+(S-1)*J] + pixel @ bpr[n][p],col[j+(S-1)*J + 1]
390      End For
392    For (m = j; m < M; m = m + R*J)
394      output ASP[m]
396      reset ASP[m]
398    End For
400  End For
402  End For
```

SSP row index: n (0 to N-1)
SSP column index: m (0 to M-1)
ASP row index: r (0 to R-1)
binary pixel index: p (0 to P-1)
data link index: j (0 to J-1)

Serialization Factor (S) = M/(J*R)

FIG. 11A

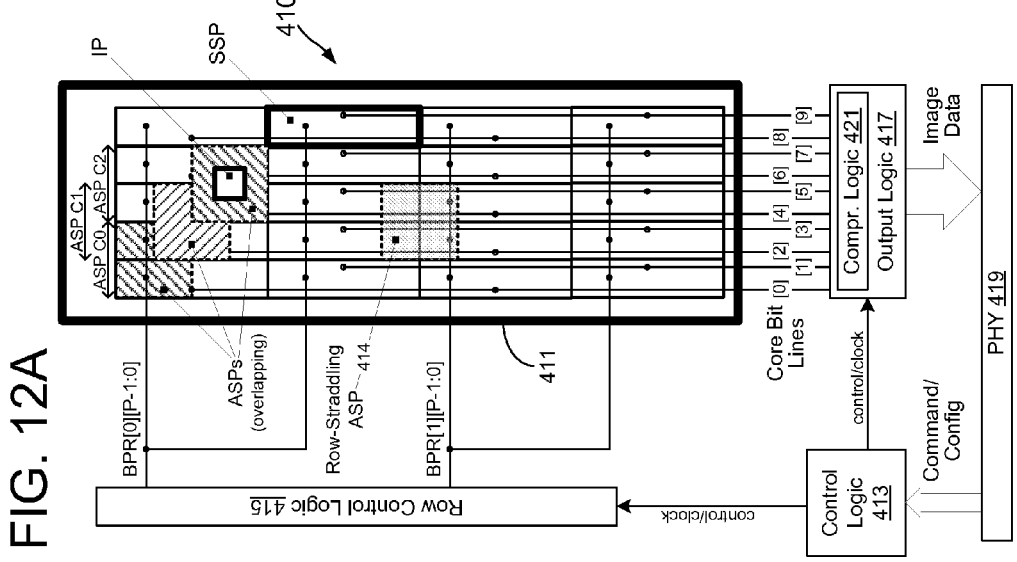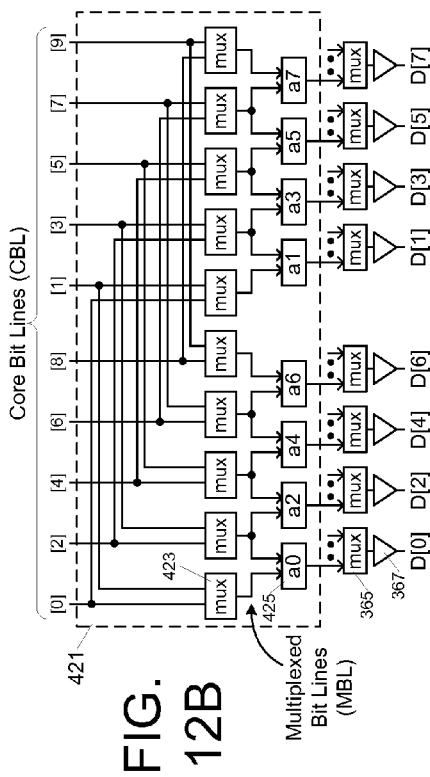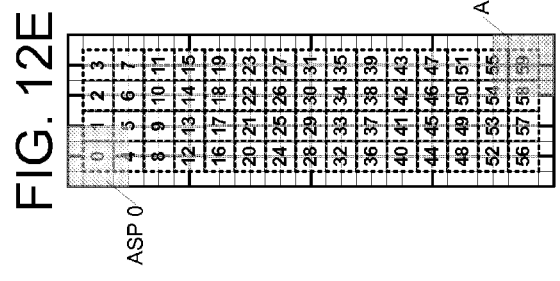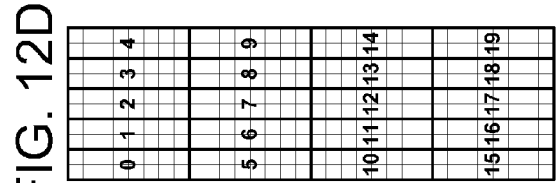

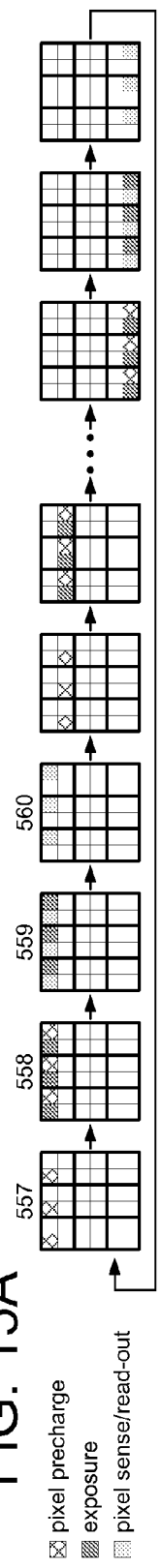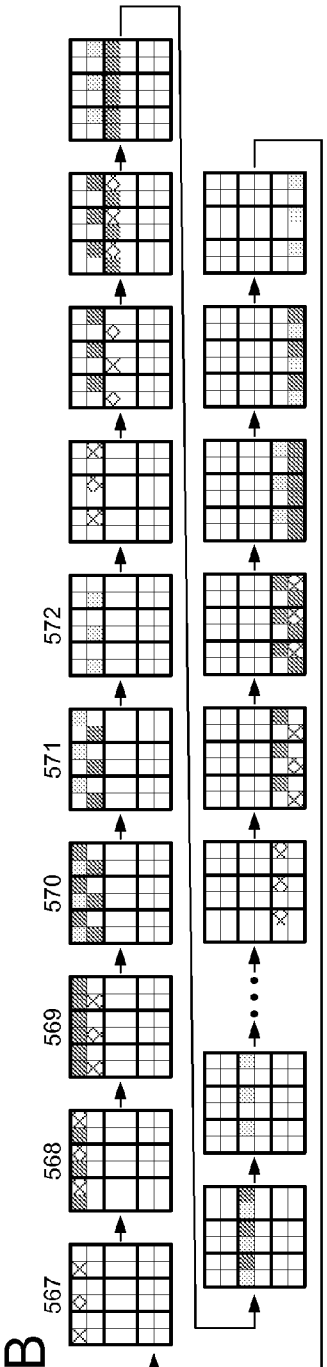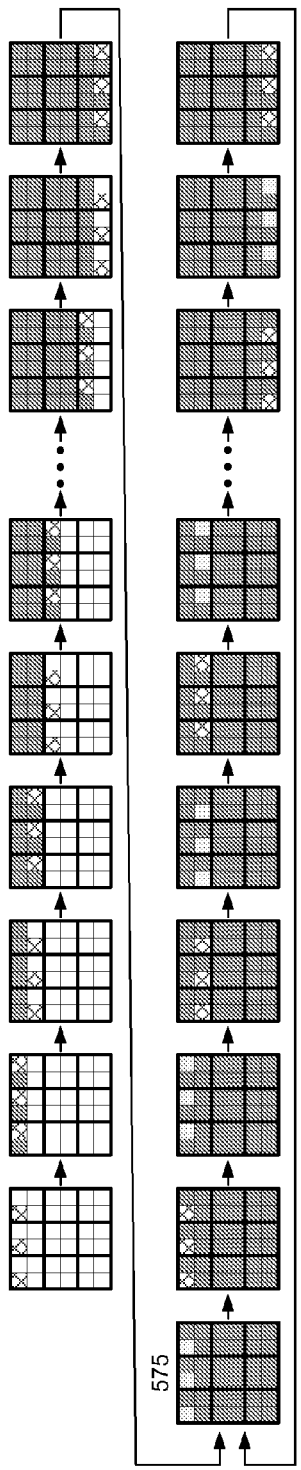
FIG. 15A
⊠ pixel precharge
▨ exposure
▦ pixel sense/read-out
FIG. 15B
FIG. 15C

FIG. 16

Pipeline-Depth Exposure Control

SSP row index: n (0 to N-1)   Exposure Interval: E
binary pixel index: p (0 to P-1)   Temporal Oversampling: T

```
581  For (i=0; i<(T*N*P)+E; i++)   // loop through array T times, with E extra
583      If (i<T*N*P)   // Precharge condition
585          n = (i mod T)/P
587          p = i mod P
589          precharge pixels @ bpr[n][p]
591      End If
593      If (i≥E)   // Read-out condition (lag precharge by E)
595          n = [(i-E) mod T]/P
597          p = (i-E) mod P
599          pixel sense/read-out @ bpr[n][p]
601      End If
603  End For
```

FIG. 17

Embodiment with active pixel, differential amplifier and global reset

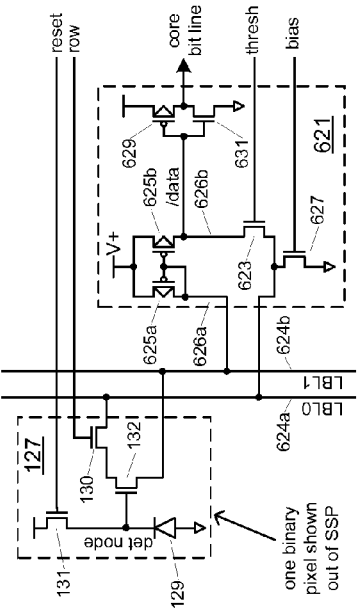

FIG. 18A

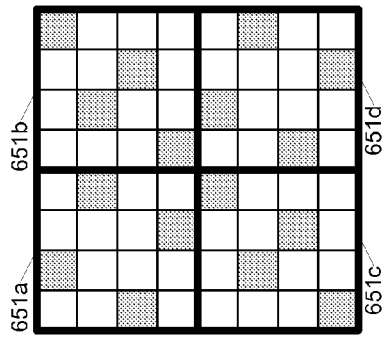

FIG. 18B

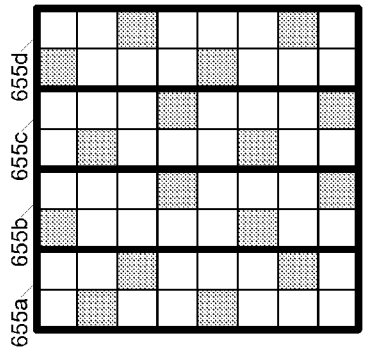

FIG. 19

Red (661)
Green (663)
Blue (665)

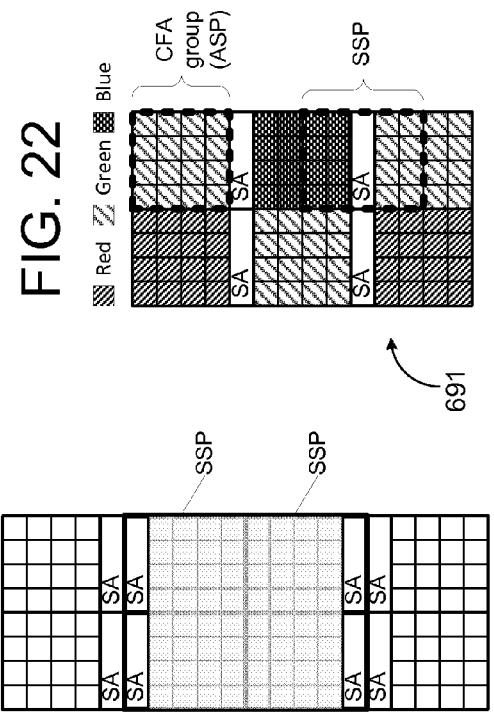
FIG. 22
FIG. 21
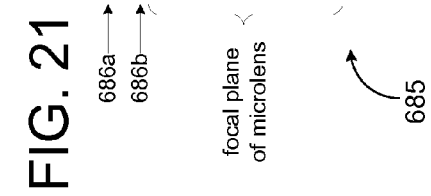
FIG. 20
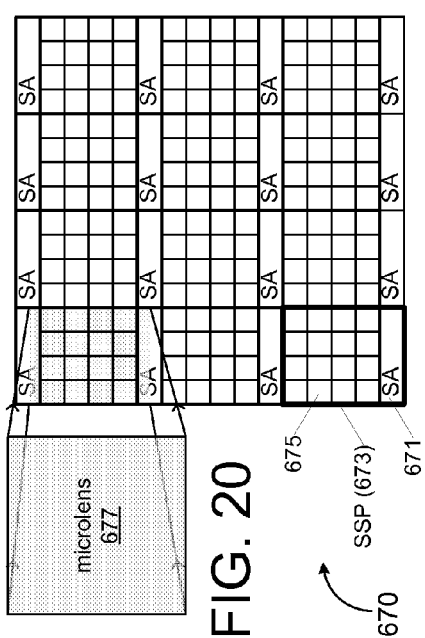
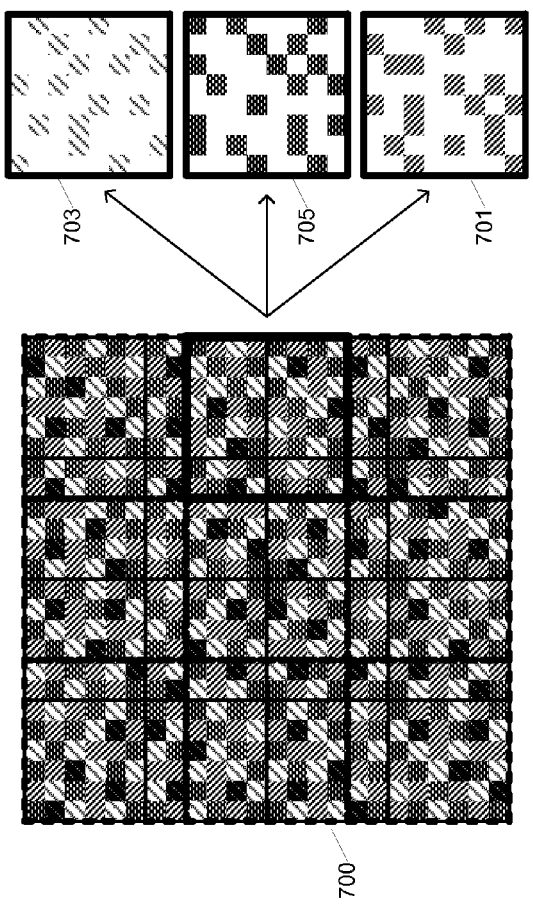
FIG. 23

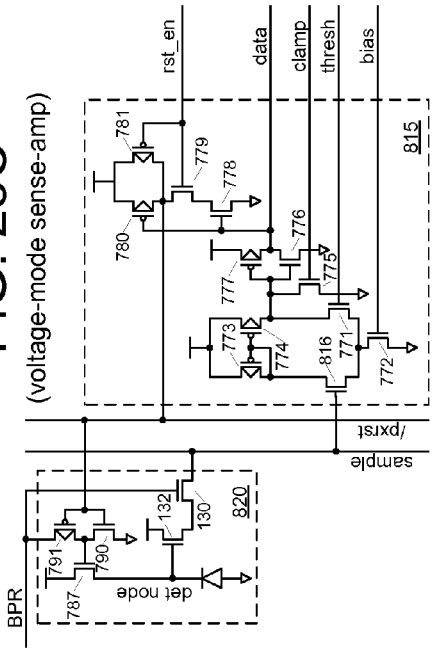
FIG. 28C (voltage-mode sense-amp)
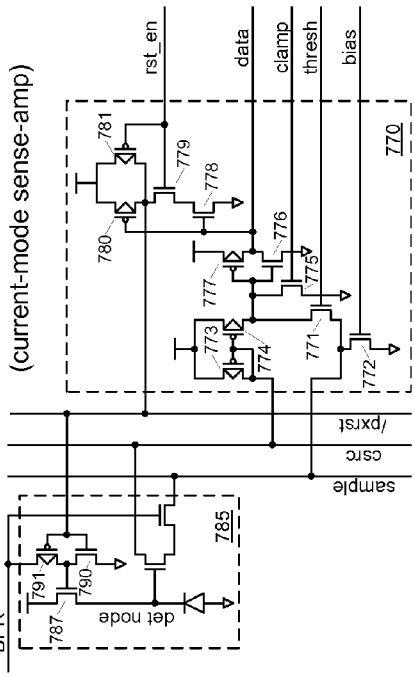
FIG. 28A (current-mode sense-amp)
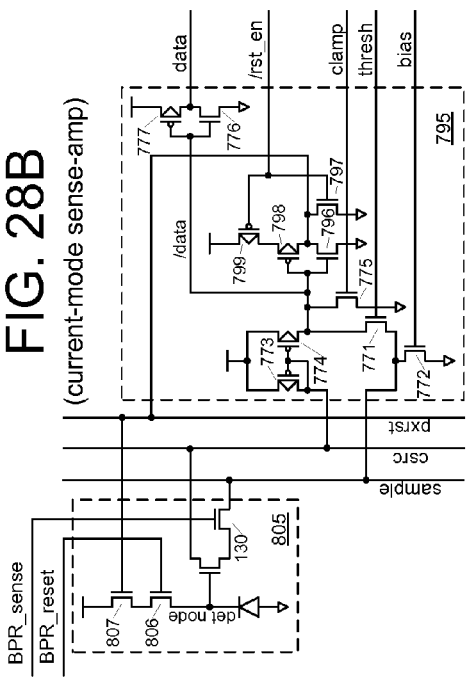
FIG. 28B (current-mode sense-amp)

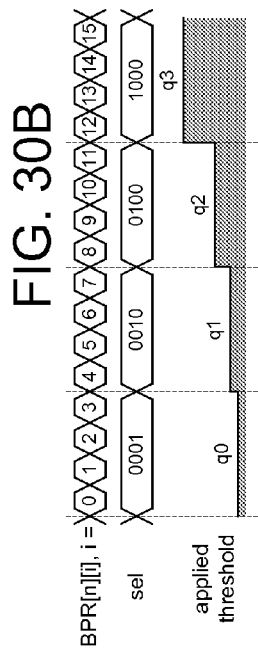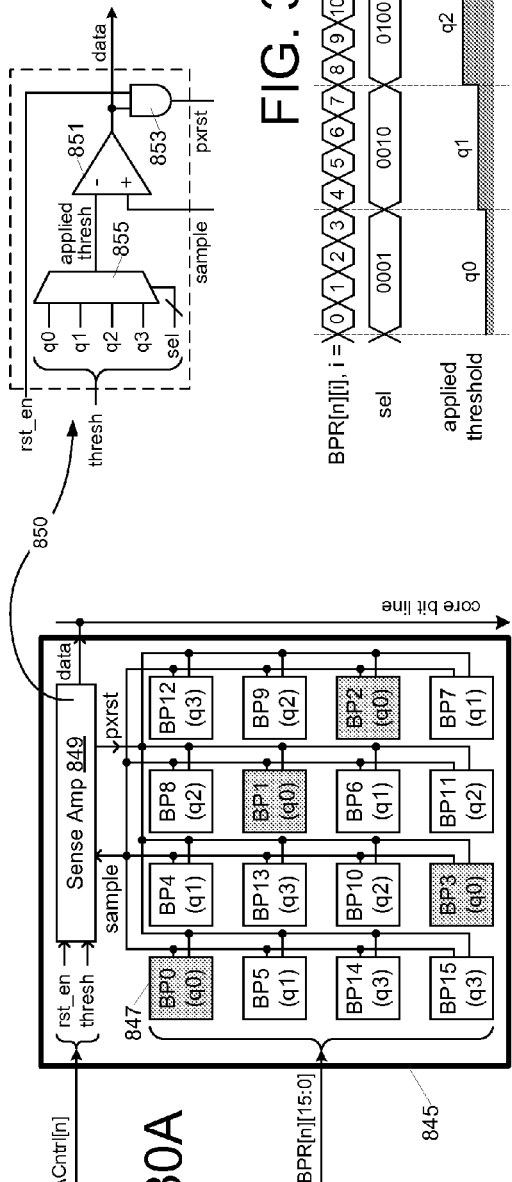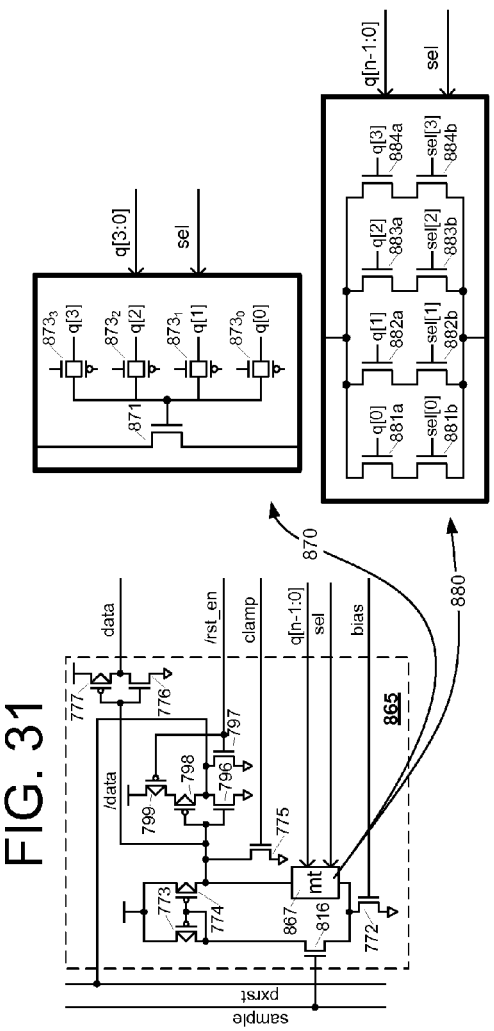
FIG. 30B
FIG. 30A
FIG. 31

CONDITIONAL-RESET, TEMPORALLY OVERSAMPLED IMAGE SENSOR

CROSS REFERENCE TO RELATED APPLICATIONS

Pursuant to 35 U.S.C. §§365 and 371, this application is a United States National Stage Application that claims priority to International Application No. PCT/US2012/064177 filed Nov. 8, 2012, which claims the benefit of each of the following U.S. Provisional Patent Applications: Application No. 61/557,364 filed Nov. 8, 2011; Application No. 61/557,368 filed Nov. 8, 2011; and Application No. 61/580,189 filed Dec. 23, 2011. Each of the above-identified patent applications is hereby incorporated by reference in its entirety.

INCORPORATION OF PRIORITY APPLICATIONS

This application hereby incorporates by reference the entirety of any and all patent applications to which priority is claimed, for example and without limitation, in a constituent PCT Request or Application Data Sheet.

TECHNICAL FIELD

The present disclosure relates to the fields of electronic image sensors and digital image processing.

BACKGROUND

Conventional digital image sensors are organized in rows and columns of pixels as shown in sensor cutaway 100 of FIG. 1. In a CMOS sensor, each pixel includes a photo diode 103 together with control elements that enable the photo diode to be precharged in preparation for exposure and then sampled after exposure. In the simple pixel shown at 101, transistor 109 is switched on to couple the cathode of the photo diode to a voltage source and thus "precharge" the cathode of the photo diode to a precharge voltage. Transistor 109 is switched off at or before the start of an exposure interval. With transistor 109 off, the cathode voltage incrementally discharges in response to photon strikes, lowering the photo diode potential, $V_{DET}$, in proportion to the amount of light detected. At the conclusion of the exposure interval, access transistor 105 is switched on to enable the photo diode potential be amplified/driven onto a column line via follower-transistor 107 and delivered to an analog-to-digital converter 111 (ADC) disposed at the edge of the pixel array. The ADC digitizes the incoming analog voltage ($V_{SAMP}$) to generate a multi-bit pixel value that ranges between minimum and maximum values corresponding to no-light and saturated conditions, respectively. These precharge and sample operations are conducted for each row of image sensor 100 to recover a digitized image.

Despite their ubiquitous application in modern imaging devices, conventional CMOS image sensors suffer from a number of limitations. First, conveying analog pixel voltages to the edge of the sensor array over long, high-capacitance column lines typically requires in-pixel amplification, increasing pixel complexity and size and limiting sensor sensitivity in low-light conditions. Also, the linear relationship between photon strikes and pixel value (shown at 114) yields a relatively small dynamic range in which a pixel quickly reaches saturation under brightening conditions. Perhaps more significantly, the maximum number of detectable photon strikes (i.e., pixel saturation point) is proportional to the capacitance of the photo diode and thus its physical size. Consequently, the photo diode footprint is dictated by the dynamic range required in a given application and does not scale with shrinking process geometries. In high-end digital cameras, like DSLRs (digital single-lens reflex) for example, the photo diode tends to be four or more micrometers at each edge in order to achieve a reasonable dynamic range, consuming an area hundreds or even thousands of times the minimum transistor size permitted by leading logic process geometries.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which:

FIGS. 4A and 4B illustrate respective quadrilateral embodiments of pixel regions referred to herein as sense-amp super pixels;

FIG. 4C illustrates a more detailed implementation of an oblong sense-amp super pixel that can be used to implement the sense-amp super pixel of FIG. 4B;

FIG. 4D illustrates the sense-amp super pixel of FIG. 4C in more schematic form;

FIG. 6A illustrates examples of an algorithmic super pixel, showing its binary pixel composition and corresponding image pixel;

FIGS. 6B and 6C illustrate exemplary relationships between sense-amp super pixels, algorithmic super pixels and image pixels;

FIGS. 7A and 7B illustrate further exemplary relationships between sense-amp super pixels, algorithmic super pixels and image pixels;

FIG. 8 illustrates an exemplary set of operations that can be used to generate an image pixel within an imaging system or component having a binary-pixel image sensor;

FIG. 9 illustrates exemplary data rates for selected imaging applications, together with compressed data rates that can be achieved by performing spatial and temporal compression operations within an image sensor IC instead of exporting (i.e., transmitting to another IC) the raw data needed to perform those operations;

FIG. 10A illustrates an embodiment of the generalized image sensor and data output architecture of FIG. 5A, but having output logic modified to include an exemplary compression logic circuit;

FIG. 10B presents a pseudo-code listing of an exemplary pixel read-out sequence executed within the image sensor and data output architecture of FIG. 10A to generate a spatially compressed data output at a given one of the J external data links;

FIG. 11A illustrates an alternative embodiment of an image sensor IC having a binary-pixel image sensor formed by an array of oblong sense-amp super pixels;

FIG. 11B illustrates an embodiment of a compression logic circuit that can be used to implement the compression logic shown in FIG. 11A;

FIG. 11C illustrates an exemplary pixel read-out sequence that can be executed within the image sensor and output architecture of FIGS. 11A and 11B to generate a spatially compressed data output at a given one of J external data links;

FIG. 12A illustrates an another embodiment of an image sensor IC having a binary-pixel image sensor 411 formed by an array of oblong sense-amp super pixels and branched binary-pixel-row lines, but which the algorithmic super pixel pitch is halved in both the row and column directions such that algorithmic super pixels spatially overlap one another;

FIG. 12B illustrates an embodiment of a compression logic circuit that can be used to implement the compression logic shown in FIG. 12A;

FIG. 12C illustrates an embodiment of an accumulator circuit that can be used to implement each of the accumulators shown within the compression logic of FIG. 12B;

FIGS. 12D-12G illustrate an exemplary algorithmic super pixel read-out sequence that can be executed within the image sensor IC of FIG. 12A;

FIGS. 13C-13G illustrate an exemplary algorithmic super pixel read-out sequence within the image sensor fragment of FIG. 13A;

FIGS. 15A-15C illustrate examples of pixel cycle pipelines having progressively greater depths to effect correspondingly longer exposure intervals within a binary-pixel image sensor;

FIG. 16 is an exemplary pseudo-code listing of operations that can be executed by the control logic within a binary-pixel image sensor to adjust the pixel cycle pipeline depth and thus vary the sensor exposure interval;

FIG. 17 illustrates an alternative embodiment of a sense-amplifier that can be embedded within a sense-amp super pixel;

FIG. 18A illustrates a group of four sense-amp super pixels having alternating sense-amp dispersion patterns;

FIG. 18B illustrates a set of four oblong sense-amp super pixels each having a different sense-amp dispersion pattern;

FIG. 19 illustrates an embodiment of a binary pixel image sensor having quasi-hexagonal sense-amp super pixels tessellated in row and column dimensions;

FIG. 20 illustrates an alternative embodiment of a binary pixel image sensor having embedded sense amplifiers disposed at edges of respective sense-amp super pixels;

FIG. 21 illustrates another alternative embodiment of a binary pixel image sensor having embedded sense amplifiers disposed at edges of respective sense-amp super pixels, but with sense amplifiers corresponding to respective physical rows of sense-amp super pixels disposed side by side instead of offset by the sense-amp super pixel pitch;

FIG. 22 illustrates an alternative embodiment of a binary pixel image sensor in which an embedded sense amplifier serves two different "color" ASPs;

FIG. 23 illustrates a red-green-blue color filter that can overlay a binary-pixel image sensor to enable color image acquisition;

FIGS. 28A-28C illustrate embodiments of conditional-reset sense amplifiers and corresponding binary pixels that may be employed to achieve variable temporal oversampling within a binary pixel image sensor;

FIG. 30A illustrates an embodiment of a conditional-reset sense-amp super pixel that applies multiple reference voltages to respective subsets of binary pixels to effect spatially-distributed, non-uniform thresholds;

FIG. 30B illustrates an exemplary read-out sequence that may be executed with respect to the conditional-reset sense-amp super pixel of FIG. 30A;

FIG. 31 illustrates an embodiment of a multi-thresholding, conditional-reset sense amplifier that may be employed within the SSP of FIG. 30A;

Figure 37:
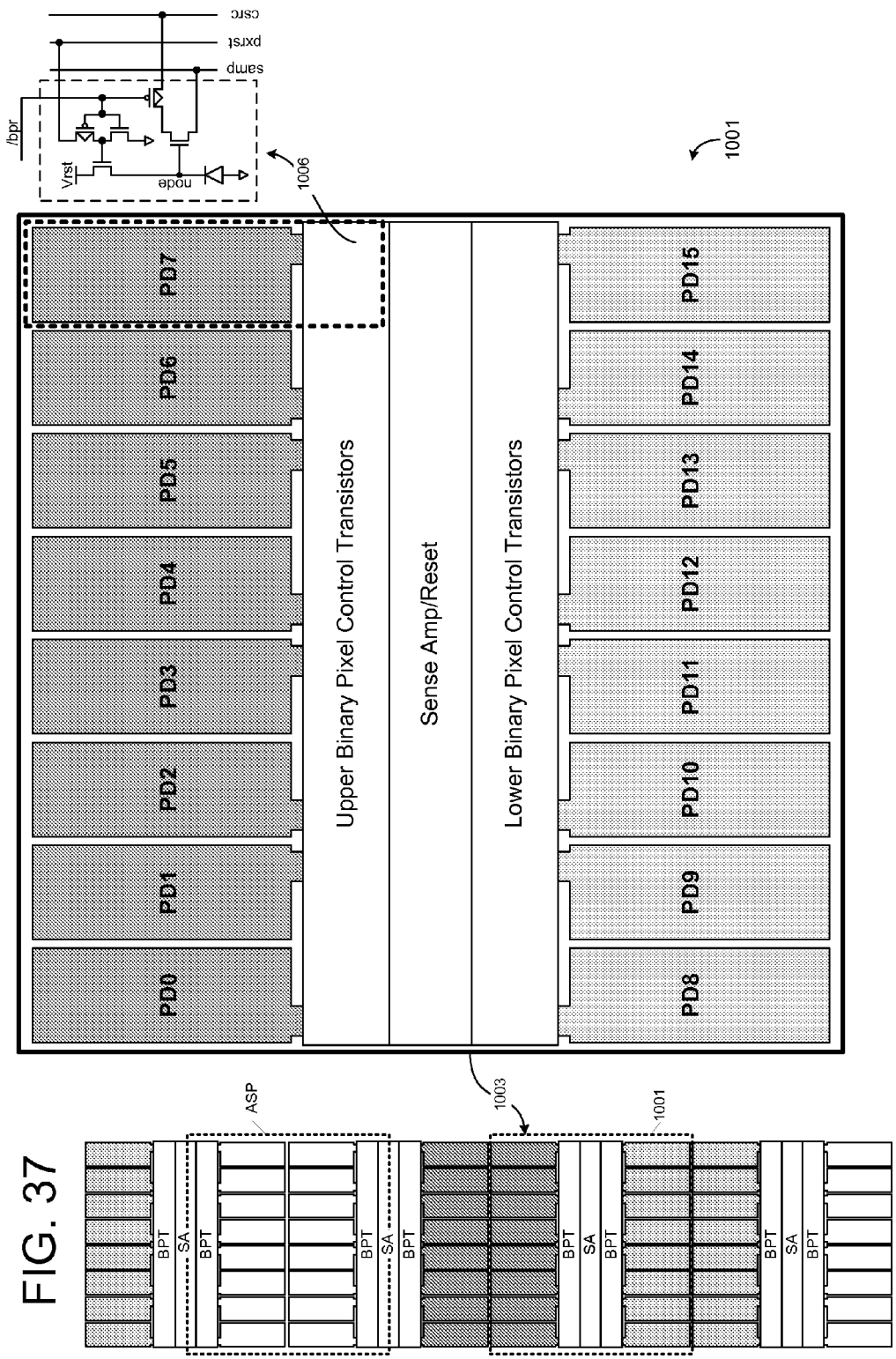
FIG. 37 illustrates an embodiment of a sense amp super pixel ## having spatially concentrated photodiodes.
Figure 41A:
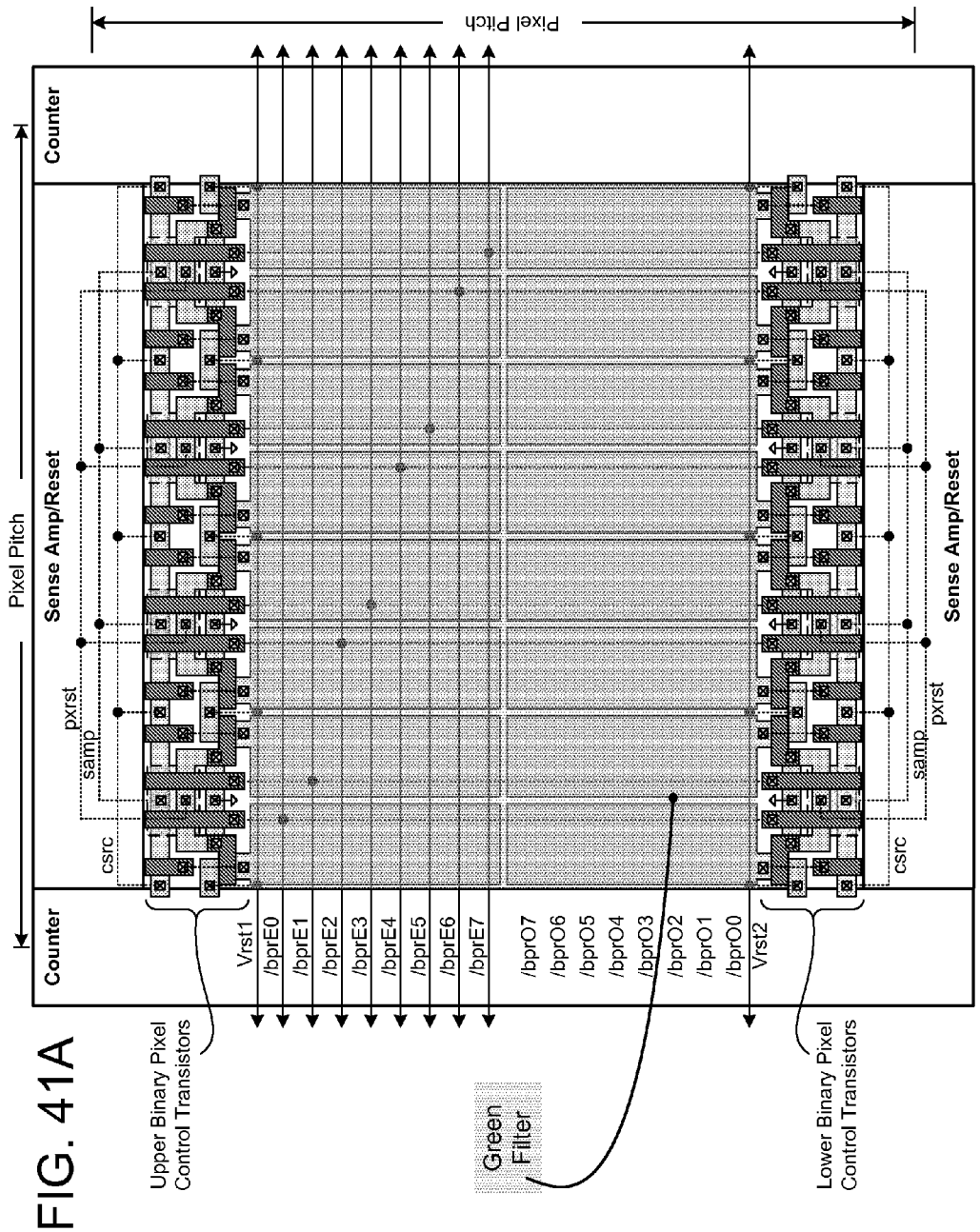
FIG. 41A illustrates an embodiment of a super pixel unit cell laid out with sixteen photodiodes.
Figures 41B, 41C:
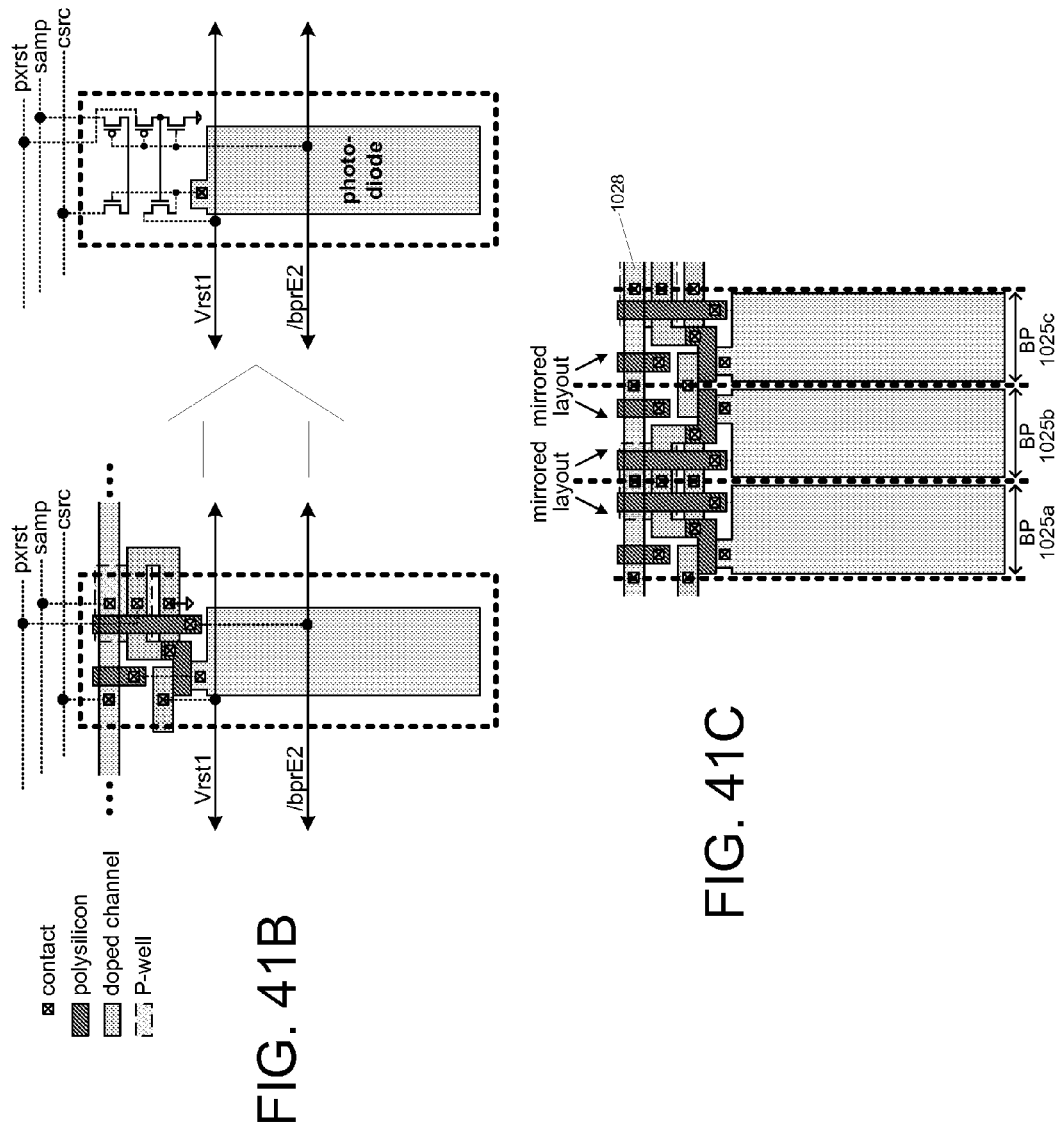
Figure 42:
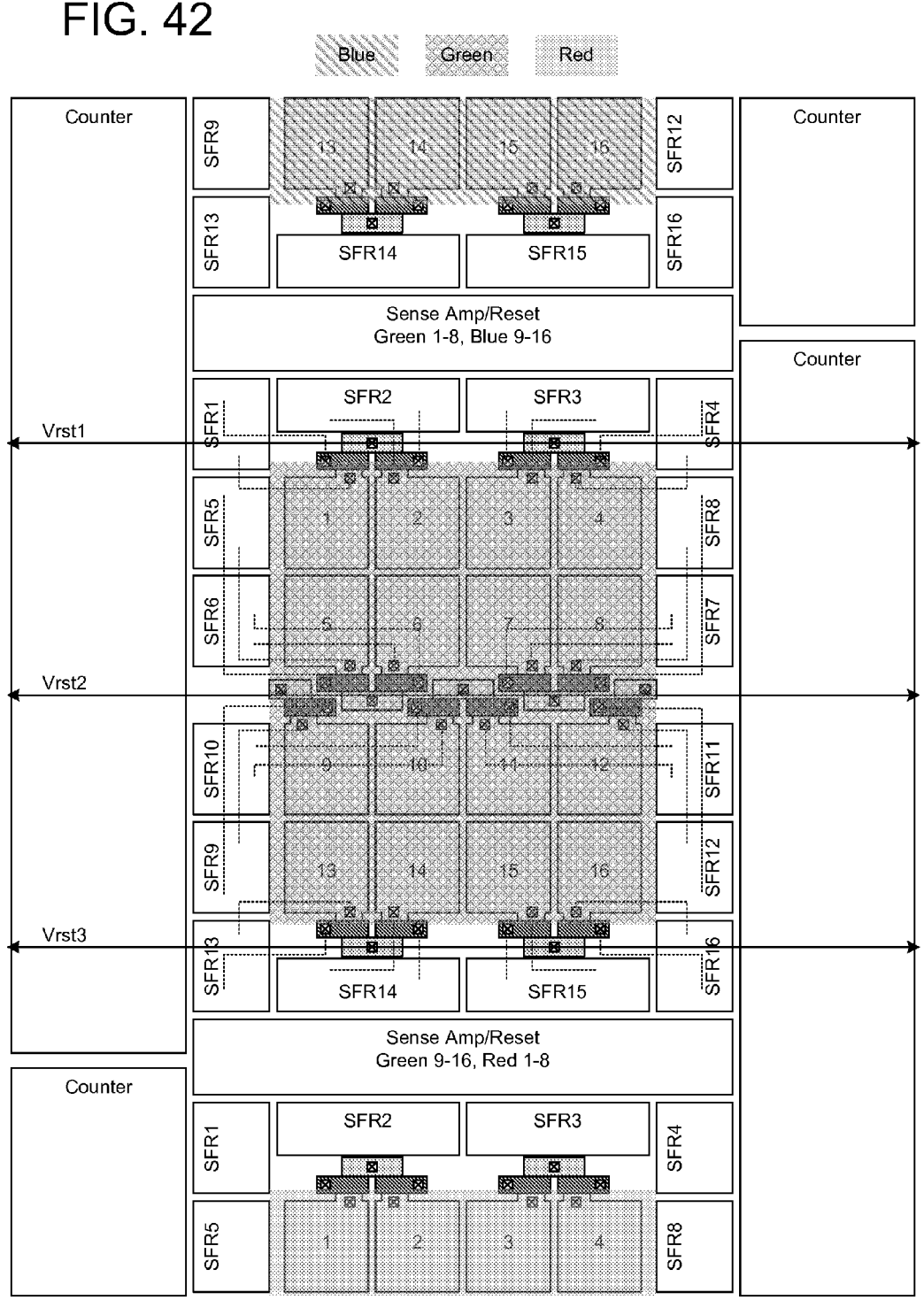

41B illustrates one of the exemplary binary pixels from FIG. 41A together with a corresponding schematic demonstrating the manner in which the doped channels, p-well and polysilicon structures form the five interconnected binary pixel transistors shown in FIG. 37;

FIG. 41C illustrates lines of symmetry about which adjacent binary pixels within the embodiment of FIG. 41A are mirrored to form a particularly compact binary pixel transistor implementation; and FIG. 42 shows an alternate embodiment of a super pixel cell layout.

DETAILED DESCRIPTION

In various digital image sensor embodiments disclosed herein, numerous sub-diffraction-limit (SDL) pixels are clustered about an embedded sense amplifier and sensed with respect to a binary threshold to yield a collection of single-bit pixel values that can be combined to form the output of an image pixel. Because integrated-circuit (IC) process geometries permit pixel sizes below the diffraction limit of visible light, a photon striking within a SDL cluster of such "binary" pixels may activate (i.e., be detected by and exceed the threshold of) one binary pixel but not others illuminated by the same blurred source, thus decreasing the number of non-activated pixels available to detect subsequent photons from the source. Consequently, when exposed to a stationary photon flux, the rate of pixel activation slows as the exposure interval transpires (i.e., due to photons striking activated pixels), thereby yielding a logarithmic rather than linear sensitivity profile and thus a potentially much higher dynamic range than achieved through prior-art techniques (in other embodiments disclosed herein this behavior is modified while still improving dynamic range). Further, because the pixels can be scaled with decreasing process geometries, pixel densities can increase freely with process improvement, thus overcoming physical impediments faced by conventional architectures and enabling dramatically higher performance in future generations of imaging devices. These and other advantages, features and embodiments are described below.

Overview of a Binary-Pixel Image Sensor

Figure 1:
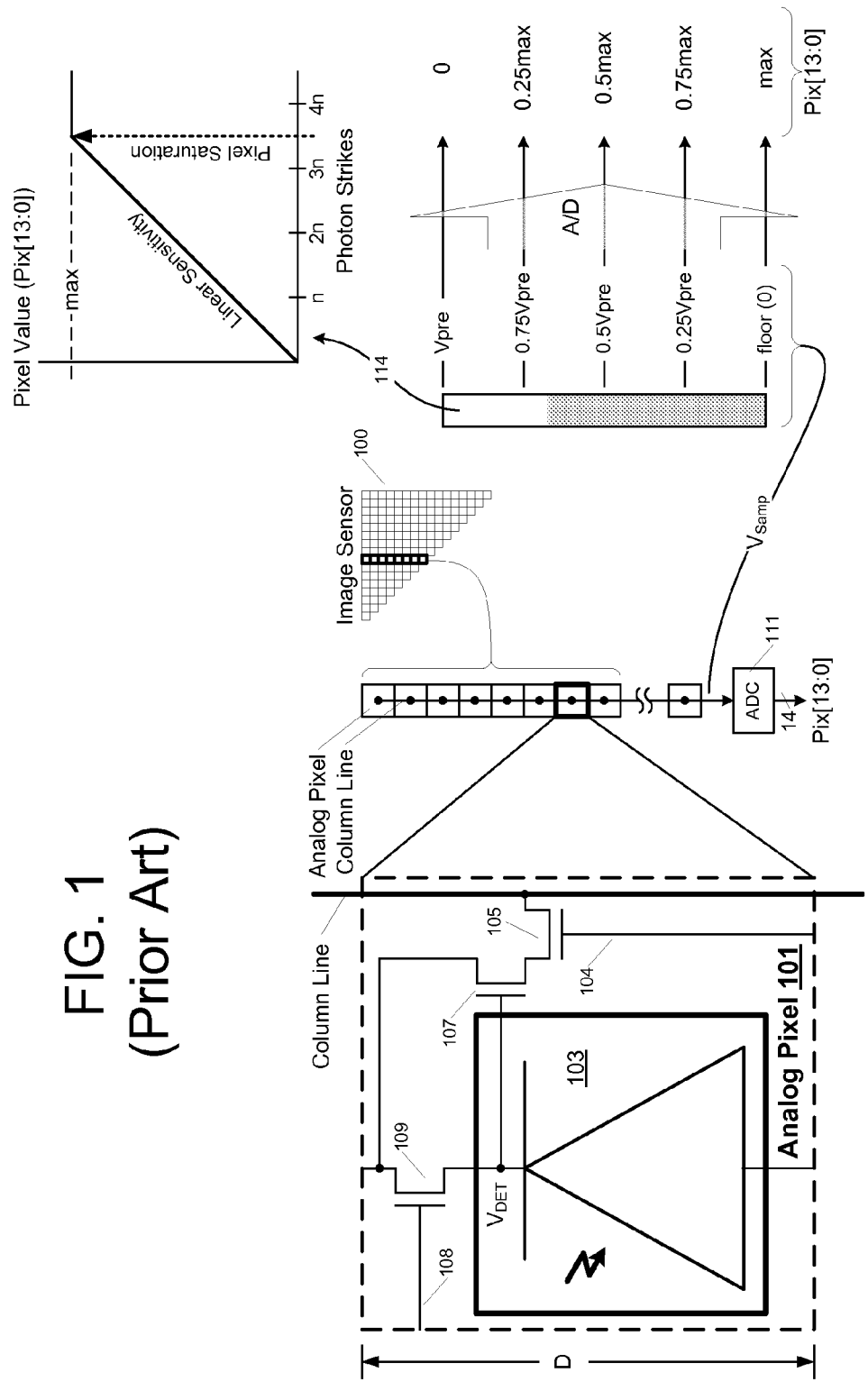
FIG. 1 illustrates a prior-art image sensor.
Figure 2:
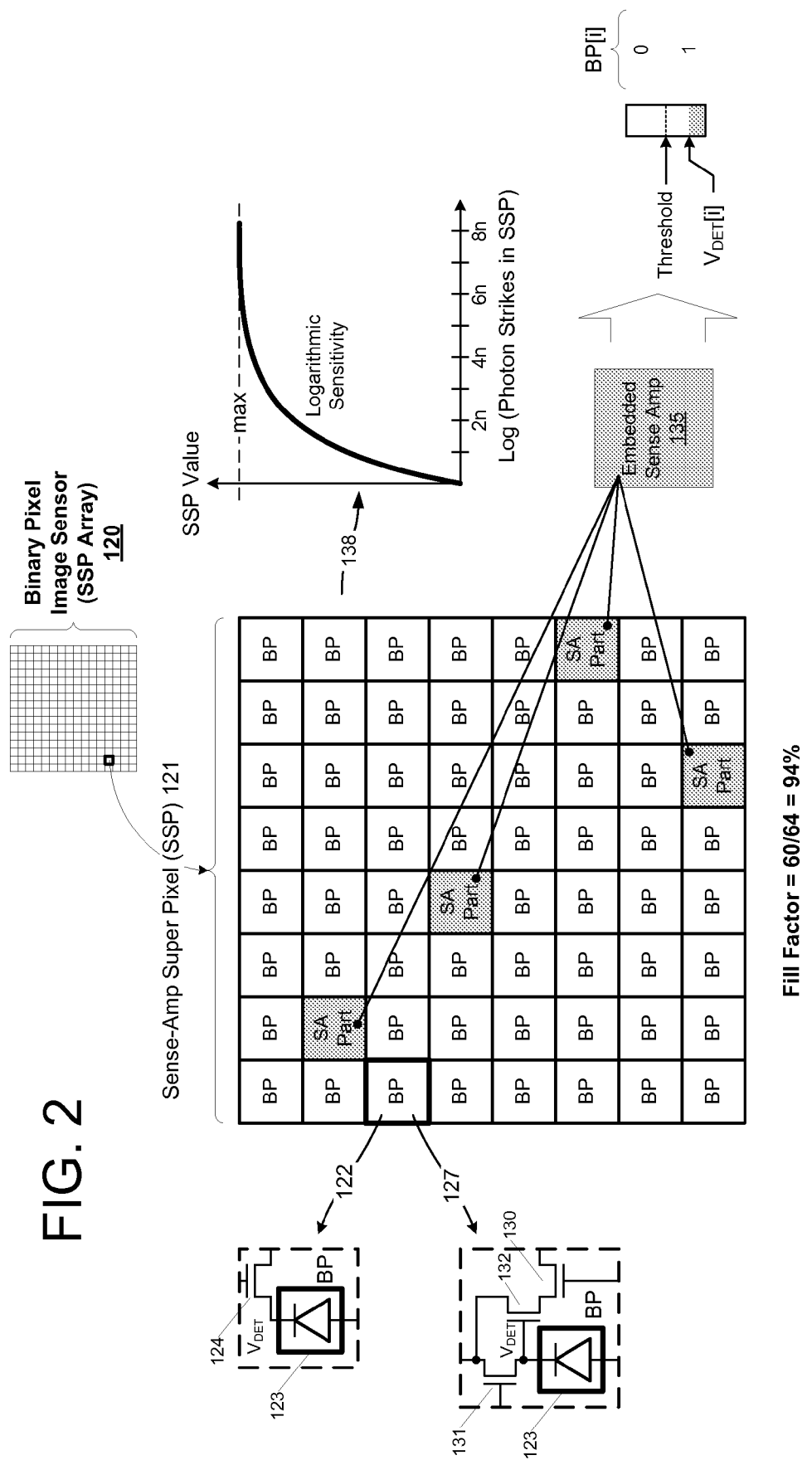
FIG. 2 illustrates an embodiment of a binary-pixel image sensor formed by an array of sub-diffraction-limit (SDL) pixels each of which is operated with respect to a binary detection threshold.

FIG. 2 illustrates an embodiment of an image sensor 120 formed by an array of sub-diffraction-limit pixels each of which is operated with respect to a binary detection threshold and thus as a "binary pixel." Although theorized, hardware implementations of SDL pixels have long been deemed impractical in part because their small output voltage falls well below the noise floor imposed by the relatively long, high-capacitance path (i.e., bit line) to sense circuitry at the edge of the array. By embedding sense amplifiers within respective clusters of SDL pixels, however, and sampling the pixels as digital rather than analog data sources (i.e., sampling the pixels with respect to a binary threshold and thus as binary pixels), such noise impediments can be overcome, enabling construction of image sensors having pixel densities that scale with process improvements and superlative dynamic range.

In the embodiment of FIG. 2 and a number of embodiments below, the pixel image sensor 120 is composed of elemental pixel regions referred to herein as sense-amp super pixel (SSPs), each of which includes an embedded sense amplifier and a cluster of binary pixels. In the SSP shown at 121, for example, a cluster of 60 binary pixels ("BP") is coupled to an embedded sense amplifier 135 formed by transistors that are dispersed within the overall footprint of the SSP. More specifically, assuming that each binary pixel consumes a predefined amount of die area, referred to herein as a "pixel cell," sense amplifier 135 is formed by elements within 4 out of 64 pixel cells within the 8-cell by 8-cell (8×8) SSP shown. In other embodiments, a number of which are discussed below, more or fewer binary pixels can be included within each SSP and more or fewer pixel cells can be required by the embedded sense amplifier, yielding a correspondingly higher or lower fill factor than that shown (i.e., higher or lower ratio of light detecting area to the total area occupied by the SSP). An SSP can also have an oblong rather than square aspect and more generally can have a non-quadrilateral footprint (e.g., a hexagonal footprint as discussed below).

In one embodiment, each binary pixel within SSP 121 is formed by a passive pixel (i.e., no amplification) as shown at 122 and thus with only one or two control transistors (e.g., a single transistor 124 to enable precharge and data access at different times) and a photo diode 123 or other light-detecting element. As a result, the overall pixel area is substantially smaller than a conventional analog pixel, ranging, for example, from roughly 25% of the area consumed by a conventional pixel having a moderate-dynamic-range to less than 1% of a higher dynamic-range conventional pixel.

In alternative embodiments, each binary pixel within SSP 121 can be an active pixel having one or more transistors to provide signal amplification and thus be slightly larger than passive pixel 122, though still substantially smaller than a conventional analog pixel. An embodiment of such an active pixel is shown at 127 with transistor 131 being switched on to couple the cathode of photo diode 123 (or other light-detecting element) to a precharge voltage source, transistor 132 operating as a follower-amplifier (e.g., providing unity gain, though the gain may be greater than or less than one) and transistor 130 enabling the output of the follower transistor, a representation of the photo diode voltage, to be output from the binary pixel. Note that follower transistor 132 presents a high-impedance load to the cathode of photo diode 123 so that the cathode voltage, $V_{DET}$, is undisturbed when access transistor 130 is turned on. By contrast, in passive binary pixel 122, the voltage on the cathode is discharged onto a bit line when access transistor 124 is switched on, thus destroying the binary pixel state. Accordingly, the active and passive binary pixels exhibit non-destructive and destructive sense characteristics, respectfully, and can be applied in different embodiments based on that distinction.

In other alternative embodiments, the photo-generated charge can be collected in the body region of a MOS (metal oxide semiconductor) transistor, changing its conductance and thus providing a single transistor pixel with amplification. More generally, various other photo-detection structures may be used instead of or in addition to the photo diodes shown within pixels 122 and 127.

While pixel operations can be executed in any order and degree of concurrency permitted by the underlying architecture, precharge, exposure and sense operations within the embodiment of FIG. 2 and a number of embodiments below are generally carried out sequentially with respect to the binary pixels within a given SSP and in parallel across rows of SSPs or even multiple rows of SSPs. Referring to the SSP shown, for example, the constituent pixels can be precharged one after another through assertion of respective row-control lines (e.g., coupling a precharge voltage present on a local bit line of the SSP to the cathode of photo diode 123 via transistor 124 within passive pixel 122, and coupling a precharge voltage source to the photo-diode cathode via dedicated precharge transistor 131 within active pixel 127), and then allowed to accumulate light over an exposure interval of variable duration. At the conclusion of the exposure interval, the photo diode voltages of respective binary pixels are sensed one after another within embedded sense amplifier 135. In each such sense operation, the embedded sense amplifier compares the selected cathode voltage (i.e., $V_{DET}[i]$, where 'i' is the index of the binary pixel within the SSP) with a predetermined threshold to obtain a one-bit binary pixel value BP[i]. As explained in detail below, individual binary pixel values sensed within one or more SSPs can be combined by logic circuitry on and/or off the image sensor IC to yield a multi-bit value that corresponds directly or approximately to the number of binary pixels that detected sufficient light to exceed the binary threshold (e.g., struck by a single photon or some number of photons) and thus a representative value for a selected collection of binary pixels within image sensor 120.

Over the course of an exposure interval, the number of undischarged binary pixels within a given area declines, diminishing the likelihood that a subsequent photon will strike an undischarged pixel and be detected. This dynamic contraction of the photon detection area yields a logarithmic sensitivity profile as shown at 138 and thus the potential for significantly broader dynamic range than achieved by the photon counting approach of conventional image sensors.

Overview of an Integrated Circuit Having a Binary-Pixel Image Sensor

Figure 3:
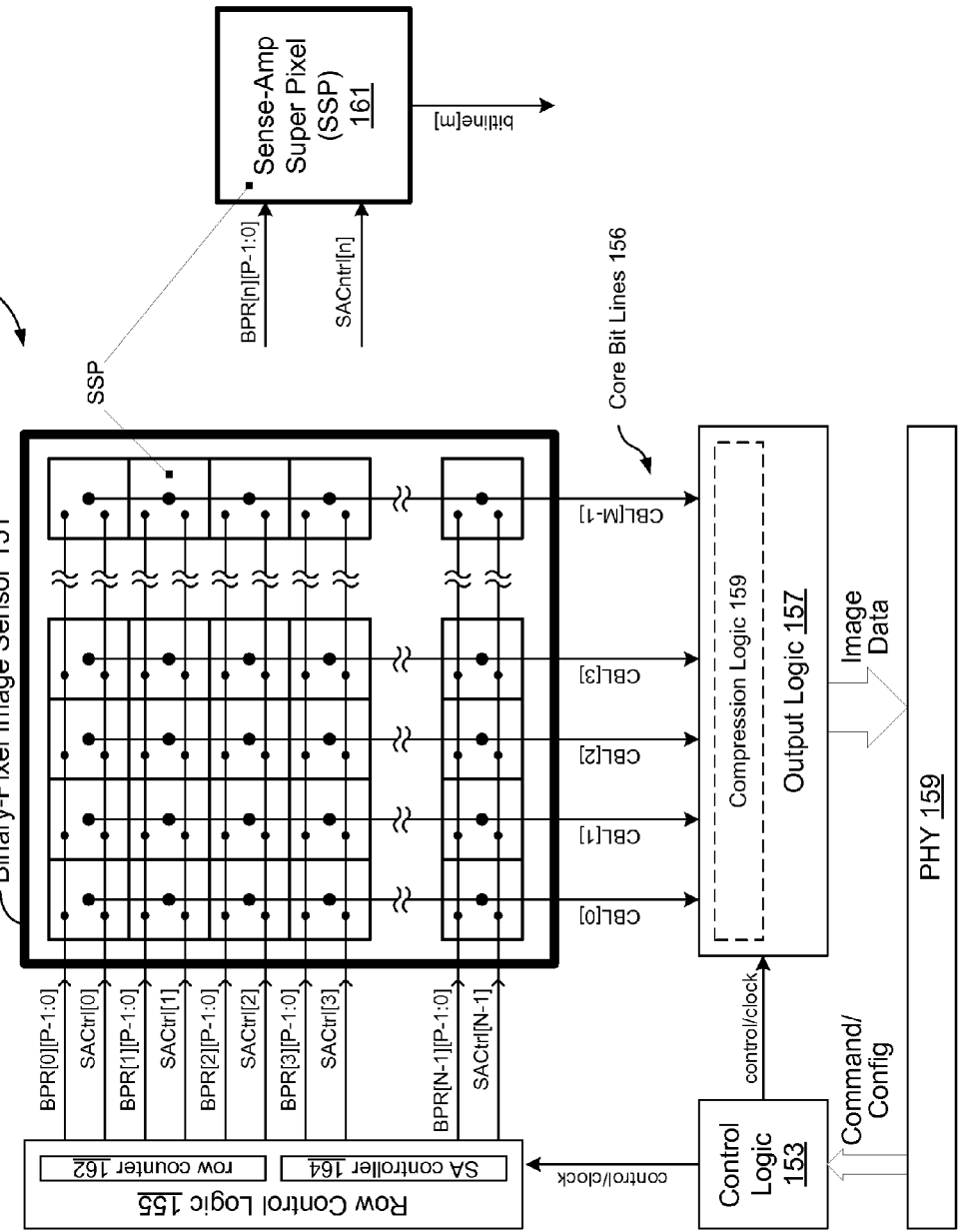
FIG. 3 illustrates an embodiment of an integrated-circuit image sensor (image sensor IC) having a binary-pixel image sensor together with circuitry to manage sensor operations and communicate with a host integrated circuit.

FIG. 3 illustrates an embodiment of a sensor IC 150 having a binary-pixel image sensor 151 together with circuitry to manage sensor operations and communicate with a host IC. More specifically, a physical signaling interface 159 is provided to receive commands and configuration information from a host IC (e.g., a general-purpose or special-purpose processor, application-specific integrated circuit (ASIC) or any other control component) and control logic 153 is provided to execute incoming commands within an operating configuration set in response to the configuration information. For purposes of example, the sensor IC and host IC are assumed to form the primary image acquisition components within a camera (e.g., a still-image or video camera within a mobile device, compact camera, digital SLR camera, stand-alone or platform-integrated webcam, high-definition video camera, security camera, automotive camera etc.). The sensor IC and host IC can be more generally deployed alone or together with like or different imaging components within virtually any imaging system or device including without limitation metrology instruments, medical instruments, gaming systems or other consumer electronics devices, military and industrial imaging systems, transportation-related systems, space-based imaging systems and so forth.

Continuing with FIG. 3, control logic 153 issues control and clock signals to row control logic 155 and output logic 157. As shown, the row control logic includes a row counter 162 to sequence through the rows of SSPs 161 within the image sensor during image acquisition and read-out operations, and a sense-amp controller 164 to control sense amplifiers embedded within respective SSPs during those operations. Output logic 157 serializes data read-out from image sensor 151 for transmission over a relatively narrow external signal path. As shown, the output logic can include compression logic 159 to compress the volume of data received from the image sensor and thus reduce signaling bandwidth requirements.

Still referring to FIG. 3, binary-pixel image sensor 151 is composed of N rows and M columns of sense-amp super pixels (SSPs), with each SSP including an embedded sense amplifier and P binary pixels. Row counter 162 outputs N sets of P row signals, with each set of P row signals coupled to the binary pixels that populate a logical or physical row of SSPs. More specifically, each signal within the set of P row signals is coupled to a respective one of the P binary pixels within each SSP of the row, thereby enabling M like-positioned binary pixels within respective SSPs of a given row to be selected as a group during precharge and sense operations. The logical collection of binary pixels selected in response to assertion of a given one of the row signals is referred to herein as a "binary pixel row" to distinguish it from the rows of SSPs themselves. The individual row signals are referred to accordingly as binary-pixel-row (BPR) signals with each set of P BPR signals being indexed by a respective SSP row index 'n' that ranges from 0 to N−1, and each BPR signal within a given set of P BPR signals being further indexed by a binary pixel index, 'p' that ranges from 0 to P−1.

In one embodiment, row control logic 155 includes state logic that sequences between states to control the operation of row counter 162 and sense amp controller 164, for example, incrementing row counter 162 to select the next binary pixel row in an incremental progression after enabling sense amp controller 164 to complete a sequence of operations with respect to the binary pixels of the currently indexed binary pixel row. The sense-amp controller itself outputs respective sets of sense amp control signals (SACtrl[N−1:0]) to the rows of SSPs with each set of sense-amp control signals including constituent signals to enable the embedded sense amplifiers within a selected SSP row to be operated in parallel, in one embodiment for example, sequencing as a unit through precharge, sense and read-out states as detailed below.

Reflecting on the image sensor architecture shown in FIG. 3, it can be seen that a significant number of conductors can overlay the image sensor to instantiate the BPR lines, sense-amp control lines and core bit lines shown. In one embodiment, the backside of the die on which the image sensor is formed is ground (or lapped or otherwise thinned) to a thickness that permits pixel exposure through the backside of the die, thereby enabling accumulation of light unimpeded by the image sensor wiring. In such an embodiment, the front-side of the ground die can be adhered to a substrate or to the die of another IC (e.g., a host IC) to provide mechanical stability.

Sense-Amplifier Super Pixels

FIGS. 4A and 4B illustrate respective quadrilateral embodiments 170 and 172 of sense-amp super pixels, one square and the other oblong. Despite their different layouts, each SSP includes twelve binary pixels (BP) and an embedded sense amplifier distributed over an area of four pixel cells (as shown by shading) and thus has a total footprint of 16 pixel cells. As explained, SSPs can be composed of more or fewer binary pixels and the embedded sense amplifier can be distributed in more or fewer cells than shown.

In each of the SSP embodiments shown in FIGS. 4A and 4B, the embedded sense amplifier is formed by four pairs of transistors disposed within respective pixel cells. In a CMOS (complementary metal oxide semiconductor) implementation, for example, the transistor pairs include a four-transistor (4T) latching circuit formed by a pair of N-type MOS transistors (NS) and a pair of P-type MOS transistors, a precharge circuit formed by a pair of precharge-enable transistors (PRE) and a data multiplexer formed by a pair of data-select transistors (DS). While such an 8T (8-transistor) sense amplifier is assumed in a number of embodiments disclosed herein, numerous other combinations of circuit components composed by more or fewer transistors can be used to implement the sense amplifiers embedded within a binary-pixel image sensor in alternative embodiments.

FIG. 4C illustrates a more detailed implementation of a 2×8 sense-amp super pixel 175 that can be used to implement SSP 170 of FIG. 4B. As shown, each of twelve binary pixels (BP) is implemented by a passive pixel 122 and two local bit lines (LBL0, LBL1) are coupled to respective sets of six binary pixels disposed on either side of the SSP. A total of sixteen binary-pixel row lines (BPR) traverse the SSP, and the access transistor within each binary pixel is coupled to a respective binary-pixel-row line, BPR[n][p], in accordance with its pixel cell position, where 'p' is the binary pixel index and 'n' is the SSP row index. Because four of the sixteen pixel cells are occupied by components of the embedded sense amplifier, the BPR lines corresponding to those pixel cell positions are not coupled to the SSP. As explained below, the pixel cell positions occupied by sense amplifier components can vary from SSP to SSP so that a BPR line uncoupled to a given SSP can nevertheless be coupled to binary pixels within neighboring SSPs. Alternately, twelve binary-pixel row lines can be used when the relative locations of sense amplifier components are fixed, or when SSP-specific routing differences allow the twelve lines to route to appropriate "live" pixels in each SSP configuration.

Still referring to FIG. 4C, N-type transistor pair N1|N2 and P-type transistor pair P1|P2 constitute a pair of inverters (i.e., an inverter formed by elements N1 and P1, and by N2 and P2) with each inverter being oppositely coupled between the local bit lines to form a latching structure. The drains of N-type pair N1|N2 are coupled in common to a low-potential sense-amp power source, SAN, and the drains of P-type pair P1|P2 are coupled in common to a high-potential sense-amp power source, SAP. By this arrangement, shown in more schematic form in FIG. 4D, the two pairs of transistors (N1|N2, P1|P2) form a latch that can be precharged to an equipotential state by assertion of the SAN and SAP signals (e.g., to mid-rail voltages such as VDD/2, or to any other practicable equipotential) and which, when placed in a set state (SAP high and SAN low, thus powering the inverters), enable the differential state of the local bit lines to be amplified and latched.

The precharge transistors N4 and N5 (marked "PRE" in FIGS. 4A and 4B) are coupled between a precharge voltage source, VPre, and respective local bit lines with their gate terminals coupled in common to receive a precharge-enable signal, "Pre." Accordingly, when the precharge-enable signal is asserted (i.e., raised in the example shown), the precharge transistors are switched on to couple the precharge voltage source to the local bit lines, thereby driving the local bit lines to an equipotential state. As discussed below, two different types of precharge operations can be carried out within the SSP of FIG. 4C: a pixel precharge operation and a sense-amp precharge operation. In a pixel precharge, the local bit lines are driven to a pixel precharge voltage (e.g., VPre driven to $V_{DD}$ or another charging potential) and one or more BPR signals are asserted to couple the detection nodes of corresponding binary pixels (i.e., the cathodes of the photo diodes therein) to the local bit lines, thereby precharging the selected binary pixel or pixels to the pixel precharge voltage. In a sense-amp precharge operation, the local bit lines are driven to a sense-amp precharge voltage nominally set to the midpoint between high and low states of the latching elements and thus nominally to the average of the high and low SAP and SAN voltages applied during a sense operation ((SAP+SAN)/2). By this operation, achieved by driving VPre to the sense-amp precharge voltage and asserting the precharge-enable signal, the latching circuit formed by the N-type and P-type transistor pairs N1|N2, P1|P2 is set to a balanced (equipotential) and unlatched state in preparation for a pixel sense operation.

After precharging a selected binary pixel and the sense amplifier, and after a desired exposure interval has transpired, a sense operation is initiated to sense the pixel state via the local bit line coupled to the selected pixel and to regeneratively latch the pixel state on the local bit line. In one embodiment, the sense operation is executed by lowering the precharge control signal to enable the local bit lines to float and then asserting the BPR signal corresponding to the selected binary pixel to enable the voltage at the detection node to appear on the even or odd local bit line (depending whether subject pixel is selected by an even-indexed or odd-indexed BPR signal). Shortly thereafter, the SAP and SAN signals are driven to high and low potentials, respectively, to enable a latching operation within the N-type and P-type transistor pairs. By this action, a differential sense operation is effected in which the voltage differential between the local bit lines (i.e., the potential created by coupling one bit line to the detection node of the selected binary pixel and allowing the other bit line to remain isolated at the precharged potential and thus establish a reference threshold) is reinforced by the cross-coupled transistor pairs. That is, driving the SAP and SAN signals high and low powers the back-to-back inverters formed by transistors N1/P1 and N2/P2, thus enabling the differential potential applied at the input/output nodes of the inverters (i.e., the local bit lines) to steer the inverters from their metastable state (established during precharge) to a latched and amplified state representative of the state of the selected binary pixel.

Still referring to FIGS. 4C and 4D, the data-select transistors are coupled between a core bit line (CBL) and respective local bit lines, LBL0 and LBL1, with their gate terminals coupled to receive even and odd data-select signals, respectively. Accordingly, when even data-select signal (SelE) or odd data-select signal SelO is raised, the pixel state latched on the corresponding local bit line LBL0 or LBL1 (i.e., the "even" local bit line or the "odd" local bit line) is driven onto the core bit line in a read-out operation and thus to the multiplexing logic at the edge of the image sensor. Alternatively, a single select line can be used to reduce wiring within the pixel array area, and the result appearing on the core bit line can be inverted or not inverted at the array edge, as appropriate for whether an even or an odd pixel is currently addressed.

In the architecture of FIGS. 4C and 4D, the pixel precharge, sense and read-out operations all engage the local bit lines and are thus carried out at different times. That is, during pixel precharge (or sense-amp precharge), the local bit lines are driven to a precharge voltage and are thus unavailable for sense or read-out operations with respect to other pixels within the SSP. Similarly, during pixel sense, the local bit lines are driven to a small potential difference by the relatively small signal output from the selected binary pixel and thus are unavailable for sense or read-out operations, and during pixel read-out, the local bit lines are latched at the state indicated by a sensed pixel (with a selected one of the local bit lines being used to drive the core bit line) and thus unavailable for pre-charging and sense operations. In alternative embodiments, additional sets of local bit lines and/or control elements can be provided within the SSP to enable pipelined (concurrent) operations with respect to individual binary pixels or groups of binary pixels, thus reducing the overall cycle time required to precharge, sense and read-out the contents of the SSP. Also, in other alternative embodiments, the precharge signal (Pre) used to select the local bit lines for precharge is supplied by two separate signals, Pre-even and Pre-odd, allowing the driver circuitry to precharge the local bit line that will be switchably coupled to a binary pixel and the local bit line that will act as a reference during sensing to different values, and thereby allow adjustment of the detection threshold.

Binary-Pixel Image Sensor Operation—Non-Compressed Pixel Read-Out

Figure 5A:
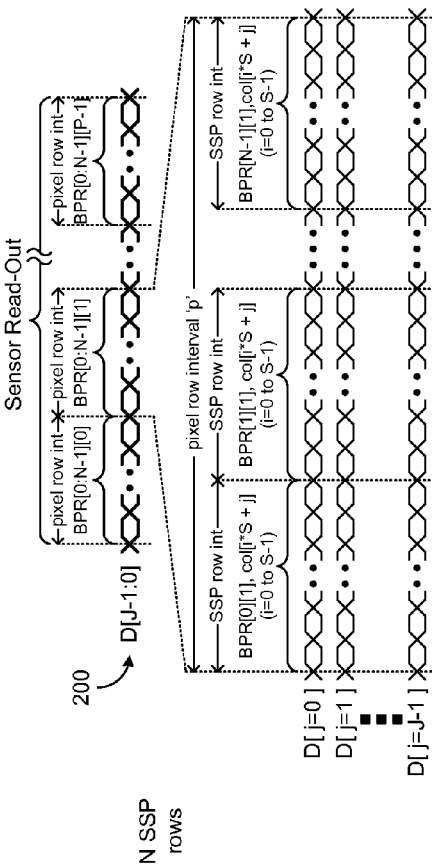
FIG. 5A illustrates an embodiment of the generalized binary-pixel image sensor of FIG. 3 together with a more detailed implementation of a physical signaling interface and multiplexing logic circuit.

FIG. 5A illustrates an embodiment of the generalized binary-pixel image sensor 151 of FIG. 3 together with a more detailed implementation of a physical signaling interface 193 and multiplexing logic 191. As shown, rows of pixel values read out of the sensor in parallel via M core bit lines are serialized (i.e., time-multiplexed) onto a narrower set of J internal data lines, idata[J−1:0]. The internal data lines are coupled to respective registers or latches 194, within physical signaling interface 193 (PHY), which latch respective groups of J pixel values in response to successive edges of a clock signal. By this operation, each register 194 delivers a sequence of 'S' pixel values to a respective transmit circuit 195 for each set of M pixel values read-out in parallel from the image sensor. Each transmit circuit 195, in turn, outputs the pixel values onto a respective one of J external data links (D[J−1:0]) as a burst of 'S' image bits. As shown, 'S' is the ratio of the number of core bit lines (or SSP columns in this example) to the number of external data links T and is referred to herein as the serialization factor. Overall, for each of N*P binary-pixel-rows (i.e., N SSP rows multiplied by P binary-pixel-rows per SSP row), M bits are read out of the image sensor and transmitted in S successive groups of J parallel bits.

Still referring to FIG. 5A, a clock signal, "Clk," is provided to the signaling interface 193 and multiplexing logic 191 to enable multiplexed selection of the S groups of J bits from each set of M bits read-out from binary-pixel image sensor 151. Because the image sensor itself operates with respect to M-bit wide units of pixel data and thus data S times as wide as physical signaling interface 193, the image sensor and associated control logic can be operated in a slower clock domain than the signaling interface. For example, in a single-data-rate (SDR) implementation of signaling interface 193 (transmit interval=1 cycle of Clk or $1/F_{CLK}$), image sensor 151 and sensor control logic can be clocked at $F_{CLK}/S$. More generally, assuming signaling interface 193 transmits k bits of pixel data via a given signaling link per Clk cycle, the image sensor and sensor control circuitry can be clocked at a more relaxed rate of $F_{CLK}/kS$.

Figure 5B:
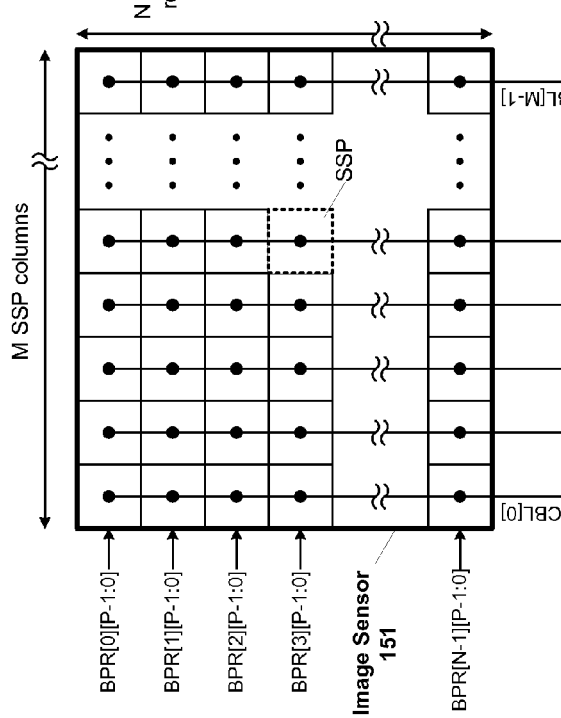
FIG. 5B illustrates an exemplary transmission of binary pixel data over the signaling interface shown in FIG. 5A.

FIG. 5B illustrates an exemplary transmission of binary pixel data over the J-bit signaling interface shown in FIG. 5A. As shown at 200, during each of P read-out intervals, referred to herein as pixel-row intervals, the binary pixel values that constitute a respective binary pixel row 'p' within each of the N rows of SSPs is read-out of the image sensor and transmitted via the J external data links. As shown by the expanded view of pixel-row interval 'p,' each pixel-row interval encompasses N SSP row intervals, with the M binary pixel values from a given SSP row being output in each SSP row interval. More specifically, respective bursts of S pixel values are output onto each of the J data links to effect transmission of each SSP row. Thereafter the SSP row index is incremented and the J-link-wide burst of S bits (thus S*J bits or M bits in total) is repeated for the next SSP row.

Figure 5C:
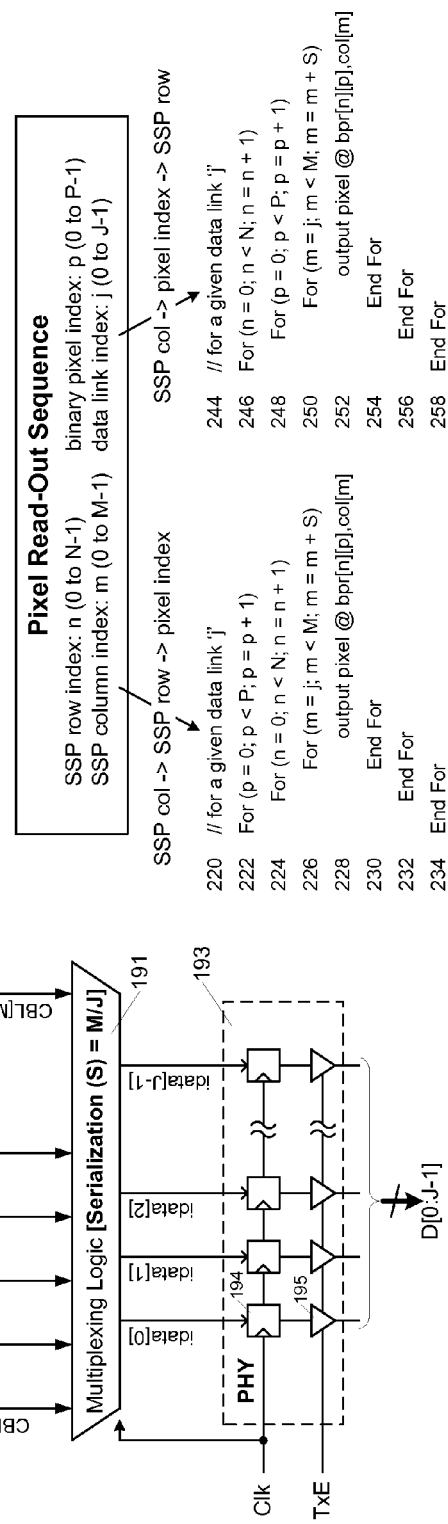
FIG. 5C illustrates exemplary pseudo-code listings of pixel read-out sequences that can be executed within the binary-pixel image sensor, output logic and signaling interface of FIG. 5A.

FIG. 5C illustrates exemplary pseudo-code listings of pixel read-out sequences that can be executed within the binary-pixel image sensor 151, output logic 191 and signaling interface 193 of FIG. 5A. The first read-out sequence, encompassed by pseudo-code line numbers 220-234, corresponds to the transmission diagram of FIG. 5B in which pixel values are read out column by column for a given SSP row and binary pixel index, then SSP row by SSP row for the binary pixel index, and finally binary pixel index by binary pixel index. Thus, for a given data link 'j,' an outer 'For' loop is initiated at line 222 to step through each binary pixel index (i.e., incrementing 'p' from 0 to P−1) and a first nested loop is initiated at line 224 to step through each SSP row index, incrementing 'n' from 0 to N−1. At 226, a second nested loop is initiated to increment SSP column index 'm' from an initial value corresponding to the bit position of the data link T in steps of 'S' SSP column positions, thus incrementing m by 'S' until the maximum column index (M−1) is exceeded. At line 228, within the second nested loop, the pixel value retrieved in response to assertion of binary-pixel-row signal BPR[n][p] and multiplexer selection of column line 'm' is output onto data link D[j]. In terms of operation timing, each execution of the output operation at 228 may be viewed as consuming a respective transmit interval so that the total number of transmit intervals required to transmit all binary pixels retrieved from the image sensor is N*P*M/J or N*P*S, where '*' denotes multiplication. Pseudo-code lines 230, 232 and 234 mark the ends of the loops initiated at lines 226, 224 and 222, respectively.

The second read-out sequence, encompassed by pseudo-code line numbers 244-258, represents an alternative to the transmission diagram of FIG. 5B in which pixel values are read out column by column for a given SSP row and binary pixel index, then binary pixel index by binary pixel index before incrementing to the next SSP row. Thus, for a given data link 'j,' an outer loop is initiated at line 246 to step through each SSP row (i.e., incrementing SSP row index 'n' from 0 to N−1) and a first nested loop is initiated at line 248 to step through each pixel index, incrementing 'p' from 0 to P−1. At 250, a second nested loop is initiated to increment SSP column index 'm' from an initial value corresponding to the bit position of the data link T in steps of 'S' SSP column positions, thus incrementing m by 'S' until the maximum column index (M−1) is exceeded. At line 252, within the second nested loop, the pixel value retrieved in response to assertion of binary-pixel-row signal BPR[n][p] and multiplexer selection of column line 'm' is output onto data link D[j]. As explained in reference to the exemplary read-out sequence at line numbers 220-234, each execution of the output operation at 252 may be viewed as consuming a respective transmit interval so that the total number of transmit intervals required to transmit all binary pixels retrieved from the image sensor is N*P*S. Pseudo-code lines 254, 256 and 258 mark the ends of the loops initiated at lines 250, 248 and 246, respectively.

Algorithmic Super Pixels and Image Pixels

Although the binary pixel values read out of a binary-pixel image sensor may themselves constitute a finalized image in some applications, in other applications spatially localized collections of binary pixels, referred to herein as "algorithmic super pixels," are combined to produce representative "image pixel" values. FIG. 6A illustrates examples of an algorithmic super pixel (ASP), showing its binary pixel composition and corresponding image pixel (IP). In the example shown, the ASP (marked by shaded binary pixels) includes an 8×8 collection of binary pixels drawn from four different SSPs. As explained below, ASPs can overlap one another and thus include binary pixels in common, or they can be formed by exclusive sets of binary pixels, a characteristic parameterized by the "ASP pitch", a measure of the spacing between ASP centers in units of pixel pitch. Because the image pixel is a representation of the ASP value (i.e., a combination of the values of the binary pixels that constitute the ASP), physical depiction of the image pixel is, to some extent, an abstraction. For purposes of explanation, however, image pixels are depicted herein as regions centered within the ASP and having a dimension equal to the ASP pitch. FIGS. 6B and 6C illustrate this relationship showing, in the first case, a set of three ASPs indexed by row and column (i.e., ASP 0,0; ASP 0,1; and ASP 1,0) and having a pitch equal to half the ASP edge dimension, and in the second case, a set of four such ASPs (i.e., having a pitch equal to half the ASP edge dimension) rendered in a transparent shade such that areas of overlap have proportionally darker shade than areas of non-overlap. As shown in FIG. 6C, conceptualizing the corresponding image pixels as regions centered within each ASP and having a dimension equal to the ASP pitch yields a group of non-overlapping image pixels abutting one another and respectively centered within the ASPs to which they correspond.

While the ASP shown in FIG. 6A has the same form-factor as an underlying SSP (i.e., matching the shape and dimension), this need not be the case. Referring to FIG. 7A, for example, square ASPs can be extracted from a sensor formed from an underlying set of oblong SSPs. In the example shown, the ASP and SSP each encompass 16 pixel cells (e.g., twelve binary pixels on average, assuming that the sense amplifier within each SSP consumes four pixel cells) with the ASP pitch equal to the SSP width. As shown in FIG. 7B, a 2×4 arrangement of such SSPs spans seven rows and three columns of whole ASPs (ASP R0-ASP R6, and ASP C0-ASP C2) and thus a quantum of binary pixel data sufficient to generate 21 complete image pixel values.

Spatial and Temporal Oversampling

FIG. 8 illustrates an exemplary set of operations that can be used to generate an image pixel within an imaging system or component having a binary-pixel image sensor. Initially, at 290, the binary pixels that constitute an image pixel field are sampled (i.e., sensed) and accumulated or integrated to form a sum, weighted sum or other combined value. This combined value constitutes an ASP sample at a given sampling interval, t, and is thus designated ASP[t]. In effect, the ASP sample constitutes a spatial oversampling of the underlying binary pixels, an oversampling that can be increased or decreased according to the degree of spatial overlap between ASPs and thus according to the ratio of the ASP size and pitch. As shown by the shaded pixel cells in the image pixel field 291, one or more cells within the image pixel field can be allocated to sense amplifier functions and thus contain null-data from the standpoint of the accumulated ASP sample.

Continuing with FIG. 8, at 292, the ASP sample generated at 290, ASP[t], is added or otherwise combined with previously acquired ASP samples (ASP[t−1:0]) to accumulate an image pixel (IP). If the ASP sample is the last in the temporal sequence (affirmative determination at 294), the image pixel is deemed to be complete. Otherwise, the temporal index, t, is incremented as 296, the next ASP sample is generated at 290 and combined with the partially accumulated image pixel value at 292. By iterating in this manner, T sequentially acquired ASP samples, ASP[0] through ASP[T−1], are combined to form the finalized image pixel, thus effecting a temporal oversampling of the spatially oversampled binary pixels that constitute the image pixel field.

In view of the potentially large number of binary pixel samples combined to form each image pixel, and the relatively high image resolution demanded in modern imaging applications, it follows that a voluminous quantum of image data can be retrieved from a binary-pixel image sensor per image frame. Multiplying the quantum of binary pixel data per image frame by the nominal frame rate for a given imaging application yields the overall data bandwidth requirement of the binary-pixel image sensor and, if all binary pixel data is to be exported to a host IC, the signaling bandwidth of the image sensor IC.

FIG. 9 illustrates exemplary data rates for selected imaging applications, together with compressed data rates that can be achieved by performing spatial and temporal compression operations within an image sensor IC instead of exporting (i.e., transmitting to another IC) the raw data needed to perform those operations. As shown at 301, the quantum of binary pixel data for a given image can be expressed as $U*V*T*X$, where '*' denotes multiplication and U and V are the numbers of columns and rows of image pixels, respectively (and thus the numbers of columns and rows of ASPs), X is the number of binary pixels per image pixel field (i.e., the number of binary pixels per ASP (W), divided by the product of the vertical and horizontal pitch of the ASP), and T is the temporal oversampling factor or number of read-outs. Assuming that the binary-pixel data is to be transmitted by the image sensor IC without compression, the peak signaling rate can be calculated by multiplying size of the binary pixel data volume by the number of image frames to be generated per second ("Fps"). The table at 300 presents exemplary values for the U, V, T, X and Fps parameters for a selected set of imaging applications. More specifically, for the exemplary DLSR, mobile-phone camera, high-definition (HD) video and video graphics adapter (VGA) image parameters shown, the data rate calculation yields signaling bandwidth requirements of 404 GB/s (gigabytes per second), 2.99 GB/s, 29.9 GB/s and 2.20 GB/s, respectively. Considering the DLSR example in particular, while the nearly half-terabyte per second raw data bandwidth is not infeasible, it does represent a significant overhead in terms of I/O circuitry and power consumption. Similarly, even though the signaling bandwidth requirements of the mobile and HD video imaging systems are more modest, those signaling bandwidths still represent a substantial die area and power overhead.

In a number of embodiments, on-chip spatial compression circuitry is provided to reduce the signaling bandwidth requirement of a binary-pixel image sensor IC. As shown in FIG. 9 at 303, for example, by generating ASP samples on chip and transmitting the ASP values in place of raw binary pixel data, bandwidth requirements can be lowered dramatically, particularly in applications that having image pixel fields larger than 2×2 binary pixels. In the exemplary imaging applications shown in table 300, the W binary pixels encompassed by each ASP are combined in accordance with the spatial oversampling operation described in reference to FIG. 8 (e.g., weighted or non-weighted summation) to yield $U*V$ ASP samples (one per image pixel) each of which can be represented by $\log_2 W$ bits. Thus, within the DLSR example shown in table 300, the values of the 256 binary pixels spanned by each ASP (i.e., W=256) can be counted to form an 8-bit ASP sample value (i.e., value ranging from 0 to 255)

with the 8-bit sample value being transmitted in place of the constituent pixel values of the image pixel field. The resulting data compression factor (256:8 or 32:1) in the DLSR example lowers the net bandwidth requirement from 404 GB/s to a much more manageable 12.6 GB/s. The data compression factor achieved within the HD Video camera example (16:6) is more modest due to the smaller image pixel field but still reduces the net signaling bandwidth by more than 50% from nearly 30 GB/s to 11.2 GB/s. In the VGA example, the spatial compression operation yields no net data compression as the image pixel field size matches the ASP sample size (i.e., four binary pixels and thus four bits). In the mobile-phone camera example, the spatial compression operation actually increases the volume of image data to be transmitted by 50%, as the six-bit ASP sample size is 50% larger than the four-bit image pixel field. Despite the lack of data compression (or even data expansion) in the mobile and VGA applications, it may still be beneficial to perform data compression on the image-sensor IC as the resulting signaling bandwidths remain well within the capabilities of modest signaling interfaces and the on-chip compression lowers the image processing burden of downstream components.

Continuing with FIG. 9, on-chip temporal compression circuitry can also (or alternatively) be provided to reduce signaling bandwidth requirements. As shown at 305, for example, such circuitry can combine a sequence of ASP samples obtained in respective read-out operations to form a corresponding image pixel sample, thus yielding a data compression factor of T:$\log_2$ T, where 'T' is the oversampling factor. The signaling bandwidth reduction that results from transmission of the image pixel samples in place of their constituent ASP samples thus varies according to the oversampling factor applied in a given application, but is more than 10:1 for each of the imaging applications shown in table 300.

Reflecting on FIG. 9 and the relative bandwidth requirements for the exemplary imaging applications shown at different points along the compression path (i.e., without compression at point A, after spatial compression at point B, or after spatial and temporal compression at point C), it can be seen that different data interface points (A, B or C) can be selected in accordance with the imaging application and the signaling bandwidth available. For example, despite the seemingly exorbitant signaling bandwidth required to output raw binary pixel data in the DSLR example shown (i.e., 404 GB/s), such signaling bandwidths can be readily achievable in three-dimensional IC applications in which an image sensor die is interconnected to a host IC die by way of a TSV array (offering hundreds or even thousands of data interconnects instead of the relatively narrow signaling interfaces detailed above). Conversely, in a mobile-phone camera application, despite the manageable bandwidth at interface point A (raw binary pixel export), it may be desirable to perform as much image processing on the image sensor die as possible to unburden the host IC.

In addition to the relatively static bandwidth considerations discussed above, there may be dynamic factors that favor selection of one data transmission strategy over another at different times or in different operating modes within an imaging application (e.g., enabling different post-processing of raw image data in certain operating modes). Accordingly, in one embodiment, the control logic of the image sensor IC (e.g., element 153 of FIG. 3) includes a programmable register or other configuration circuit that enables spatial and/or temporal compression circuitry in the data output path (e.g., within the multiplexing circuitry of FIG. 3) to be either bypassed or engaged, thereby enabling the image sensor IC to be operated in different data output modes (e.g., transmitting data at any of interface points A, B or C within the compression path shown in FIG. 9) within a given imaging application and/or to allow a general-purpose image sensor IC to be tailored during run-time or production-time for operation within one of various different imaging applications.

Binary-Pixel Image Sensor Operation—Spatially-Compressed Pixel Read-Out

FIG. 10A illustrates an embodiment of the generalized image sensor and data output architecture of FIG. 5A, but having output logic 310 modified to include an exemplary compression logic circuit 311. In the example shown, ASPs are assumed to match the SSPs in size and form factor and have a pitch equal to the ASP dimension. Under this assumption, the image pixel field encompassed by each ASP is confined to the binary pixel cluster of a respective SSP (i.e., ASPs and SSPs are constituted by the same sets of binary pixels). Accordingly, an unweighted sum of the binary pixel values for each ASP can be generated by counting the number of same-state binary pixel values (i.e., counting the '1's or counting the '0's) within the corresponding SSP, a function carried out by the M counters 314 (one counter per core bit line) within compression logic 311.

FIG. 10B presents a pseudo-code listing of an exemplary pixel read-out sequence executed within the image sensor and data output architecture of FIG. 10A to generate a spatially compressed data output at a given one of the J external data links. Between lines 327 and 345, an outer loop is executed to step through each SSP row index, incrementing 'n' from 0 to N-1. In each iteration of the row index loop, a nested loop is executed starting at 329 to iteratively read-out a respective set of P pixels from each SSP of the indexed row as shown in line 331, counting in parallel the M pixel values read-out from the selected row of M SSPs within respective counters 314 of compression logic 311. By this operation, a respective set of M ASP samples, each sample having $\log_2$ P constituent bits, are accumulated over each sequence of P read-out intervals before repeating the ASP sampling operation with respect to the next SSP row. Note that accumulation operations are shown in the pseudo-code listing only with respect to the S ASP samples to be output via data link 'j.' The remaining accumulation operations are executed in parallel with those shown, but with respect to the other J-1 data links.

Still referring to FIG. 10B, after each execution of the pixel read-out loop (lines 329-333), the accumulated ASP samples are output from the image sensor IC and then reset in preparation for a subsequent accumulation operation. These operations are shown by the loop starting at 335, in which column index 'm' is indexed from a starting value equal to the data link index, T, and incremented by J in each iteration, thus stepping 'm' through the indices of the S ASP samples accumulated in the loop at 329-333 and enabling each ASP sample to be output in turn at line 339 and then reset at 341 (note that ASP reset operations could alternatively be performed just prior to pixel value accumulation, and thus within the loop at 327 prior to the accumulation loop at 329). As explained with respect to the ASP sample accumulation (i.e., loop 239-333), the remaining groups of S ASP samples are output in parallel with those shown, but with respect to the other J-1 data links. Also, while the ASP output/reset loop 335-343 is shown sequentially with respect to the ASP accumulation loop at 329-333, the two loops can alternatively be executed concurrently (i.e., at least partly overlapping in time). In one embodiment, for example, ASP samples accumulated within respective ASP counters of the compression logic (i.e., counters 314 within logic 311 of FIG. 10) are transferred to holding buffers or registers to await multiplexed transmission, thus freeing the ASP counters to accumulate ASP samples from the n+1$^{th}$ row of SSPs concurrently with transmission of the ASP samples from the nth row of SSPs via the signaling interface (i.e., pipelining the ASP accumulation and ASP transmission operations).

FIG. 11A illustrates an alternative embodiment of an image sensor IC 350, in this case having a binary-pixel image sensor 351 formed by an array of oblong SSPs. Additionally, each binary-pixel-row (BPR) line is branched and coupled to two physical rows of SSPs, in effecting folding a single logical SSP row (i.e., the set of SSPs coupled in common to a BPR line) in half. By this arrangement, the BPR signal count is halved for a sensor having a given number of physical SSP rows. The image sensor IC additionally includes control logic 353, row control logic 355, output logic 357 (including compression logic 361) and physical signaling interface 359, each of which operate generally as described in reference to counterpart components of the image sensors described above to control image acquisition and read-out within binary-pixel image sensor 351. As with the image sensors shown in FIGS. 3, 5A and 10A, only a representative portion of binary-pixel image sensor 351 is depicted in FIG. 11A.

In the example presented, the SSP aspect ratio is 4:1 (length:width), the ASP aspect ratio is 1:1 (square) and the ASP area in binary pixels (i.e., image pixel field) is equal to the SSP area. Consequently, each ASP spans portions (halves) of two SSPs as shown, so that accumulation of an ASP sample involves combination of binary pixel values read-out from two SSPs. More specifically, numbering the core bit lines coupled to the upper and lower SSPs of a given folded SSP row with even and odd bit line indices as shown, an ASP sample from a pair of upper SSPs of the logical SSP row is accumulated by combining binary pixel values read-out via adjacent even-numbered core bit lines, and an ASP sample from a pair of lower SSPs of the logical SSP row is accumulated by combining binary pixel values read-out via adjacent odd-numbered core bit lines. This organization is reflected in the exemplary spatial compression logic 361 shown in FIG. 11B, as even numbered pairs of core bit lines are coupled to inputs of even-numbered accumulator circuits 364 (i.e., a0, a2, a4, a6), and odd-numbered pairs of core bit lines are coupled to inputs of a separate set of odd-numbered accumulator circuits (a1, a3, a5, a7). In one embodiment, each accumulator circuit includes circuitry to perform a non-weighted summation operation, adding each incoming pair of binary pixel values to the accumulated total and thus adding 0, 1 or 2 to the total depending on whether the binary pixel values are both '0', have different states, or are both '1.' As shown in FIG. 11B, multiplexing circuitry 365 is provided (e.g., within the output logic 357 of image sensor IC 350) to select between the accumulators 364 for the eight ASP columns shown (i.e., four ASP columns per half of each folded SSP row) and corresponding accumulators 364 for other sets of ASP columns not shown in the representative sample of the image sensor architecture. Accordingly, ASP samples accumulated within respective sets of eight accumulators 364 (i.e., for respective columns of ASPs) can be selected for transmission onto data links D[7:0] via transmit circuits 367 in successive transmit intervals.

FIG. 11C illustrates an exemplary pixel read-out sequence that can be executed within the image sensor and output architecture of FIGS. 11A and 11B to generate a spatially compressed data output at a given one of J external data links. Between lines 382 and 402, an outer loop is executed to step through a sequence of SSP row indices, incrementing 'n' from 0 to N−1, where N is the number of folded SSP rows (and thus half the number of physical SSP rows). In each iteration of the row index loop, a first nested loop is executed between lines 384 and 398 to step an ASP row index 'r' from 0 to R−1 and thus through each of the R ASP rows encompassed by a given SSP row. In the particular embodiment of FIG. 11A, for example, R is 2 as two ASPs span respective halves of each SSP. Moreover, assuming that the number of SSP columns per ASP column matches the number ASP rows per SSP row as in FIG. 11A (i.e., ASP and SSP have equal areas), then the serialization factor S is reduced by the factor R and is thus M/(R*J). Other serialization factors can apply in embodiments where the ASP and SSP areas are non-equal.

Continuing with the read-out sequence of FIG. 11C, a second nested loop is executed between lines 386 and 390 to iteratively read-out a respective set of P/R pixels from each SSP of the indexed SSP row, counting in parallel groups of R (coded for R=2 in the example shown) the pixel values read-out from the selected row of M SSPs within respective counters of the compression logic. By this operation, shown at 388, a respective set of M/R ASP samples, each sample having $\log_2 P$ constituent bits, are accumulated over each sequence of P/R pixel read-out intervals before repeating the ASP sampling operation with respect to the next ASP row. Note that accumulation operations are shown in the pseudo-code listing only with respect to the S ASP samples to be output via data link 'j.' The remaining accumulation operations are executed in parallel with those shown, but with respect to the other J−1 data links. Also, the accumulation notation 'ASP[ ]+=' is used in place of 'ASP[ ]=ASP[ ]+' for compactness.

Still referring to FIG. 11C, after each execution of the pixel read-out loop (lines 386-390), the accumulated ASP samples are output from the image sensor IC and then reset in preparation for a subsequent accumulation operation. These operations are shown by the loop at lines 392-398, in which column index 'm' is indexed from a starting value equal to the data link index, T, and incremented by R*J in each iteration, thus stepping 'm' through the indices of the S ASP samples accumulated in the loop at 386-390 and enabling each ASP sample to be output in turn at line 394 and then reset at 396 (note that ASP reset operations could alternatively be performed just prior to pixel value accumulation, and thus within the loop at 382 prior to the accumulation loop at 386). As explained with respect to the ASP sample accumulation, the remaining groups of S ASP samples are output in parallel with those shown, but with respect to the other J−1 data links. Also, while the ASP output/reset loop 392-398 is shown sequentially with respect to the ASP accumulation loop at 386-390, the two loops can alternatively be executed concurrently and thus pipelined as explained in reference to FIG. 10B.

FIG. 12A illustrates another embodiment of an image sensor IC 410 having a binary-pixel image sensor 411 formed by an array of oblong SSPs and branched BPR signal lines, but in which the ASP pitch is halved in both the row and column directions (i.e., to half the length and half the width of the ASP) such that ASPs spatially overlap one another as shown. The effect of this reduced ASP pitch, aside from increased spatial oversampling, is to increase the number of ASPs within the array from M*N to (2M−1)*(2N−1) and to shrink the image pixel to one fourth the size of the ASP (i.e., the product of the ASP pitch in the row and column dimensions). This arrangement is illustrated by the overlapping ASPs shown by different hash patterns and in which each such ASP is disposed within a respective ASP column (i.e., ASP C0, ASP C1, ASP C2) and within a respective ASP row. The image sensor IC additionally includes control logic 413, row control logic 415, output logic 417 (including compression logic 421) and physical signaling interface 419, each of which operate generally as described in reference to counterpart components of the image sensors described above to control image acquisition and read-out within binary-pixel image sensor 411. As in FIGS. 3, 5A, 10A and 11A only a representative portion of the binary-pixel image sensor is shown.

As in the preceding example, the SSP aspect ratio is 4:1, the ASP aspect ratio is 1:1 (square) and the ASP area in units of binary pixels (i.e., image pixel field) is equal to the SSP area. Because of the 50% ASP pitch, however, each ASP can span fractions of up to four SSPs, a circumstance illustrated by the transparently shaded ASP at 414, which straddles a pair of SSPs from each of two different folded SSP rows. Accordingly, in one embodiment, the inputs to each ASP accumulator (or counter) are supplied by multiplexers that select between two pairs of bit lines coupled to the different SSPs spanned by the corresponding ASP column. Thus, as shown in the exemplary embodiment of compression logic 421 presented in FIG. 12B, accumulator a0 (425) is coupled to receive pixel values from even bit line pair 0 and 2 and from odd bit line pair 1 and 3, depending on the state of multiplexer 423, thus enabling accumulation of pixel values from an ASP that straddles SSPs in different physical or logical rows. Each of the other accumulators 425 are likewise coupled via multiplexers 423 to receive pixel values from an even bit line pair and odd bit line pair for their respective ASP columns. As in the preceding example, multiplexing circuitry 365 is provided (e.g., within the output logic 417 of image sensor IC 410) to select between the accumulators 425 for the eight ASP columns shown (i.e., four ASP columns per half of each folded SSP row) and corresponding accumulators 425 for other sets of ASP columns not shown in the representative sample of the image sensor architecture. Accordingly, ASP samples accumulated within respective sets of eight accumulators 425 (i.e., for respective columns of ASPs) can be selected for transmission onto data links D[7:0] via transmit circuits 367 in successive transmit intervals.

Figure 12F:
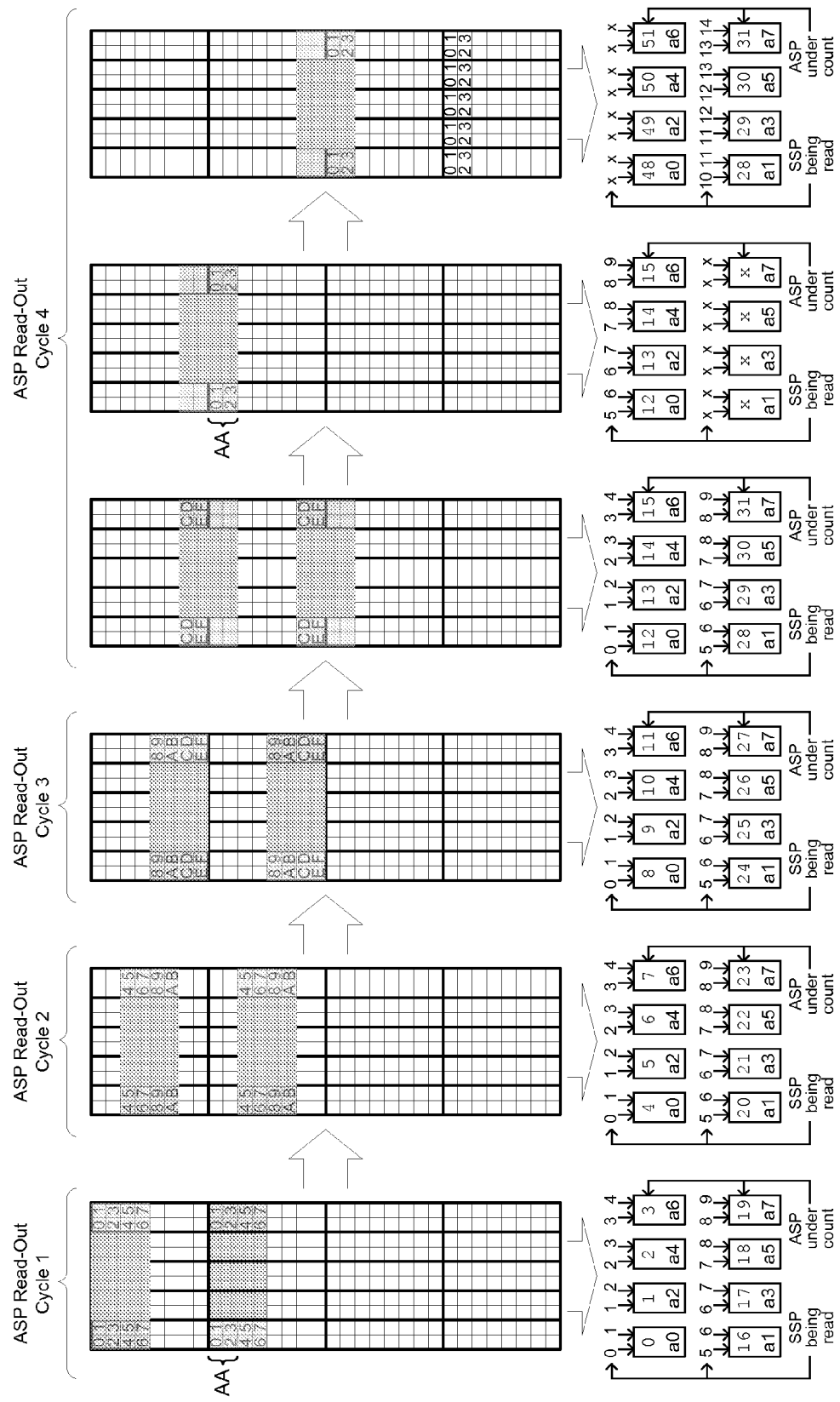

FIG. 12C illustrates an embodiment of an accumulator circuit 450 that can be used to implement each of the accumulators 425 shown in FIG. 12B. As shown, accumulator 450 includes two sub-accumulators 451 and 453 ('x' and 'y' accumulators), each of which is alternately enabled to accumulate pairs of binary pixel values provided via the multiplexed bit lines (MBL[i] and MBL[i+1]) as binary pixel values corresponding to each new row of ASPs are read-out. That is, AND gates 456 and 457 have respective non-inverting and inverting inputs coupled to receive a row-state signal 456 that is toggled (i.e., by toggle flip-flop 455) in response to assertion of an ASP row advance signal ("row-adv"). In one embodiment, the ASP row advance signal is asserted at (or just prior to) the commencement of binary-pixel readout for each successive row of ASPs, thereby toggling the row-state signal and thus reversing the operation of the demultiplexer formed by AND gates 456 and 457, passing a count-enable signal (e.g., a stream of pulses signaling respective binary pixel read-out intervals) to an alternate one of the two sub-accumulators 451, 453 to enable pixel value accumulation therein. By this operation, each sub-accumulator tallies a respective half of the binary pixels read-out for a given ASP so that the sum of the outputs of the sub-accumulators, generated by summing circuit 459, constitutes the ASP sample. As explained further in reference to FIGS. 12F and 12G, because half the binary pixels of a given ASP row are shared with a preceding ASP row, splitting the total ASP sample between two fractional accumulations enables last-generated fractional accumulation to be used as the first fractional accumulation for a subsequent ASP row, thereby avoiding re-reading and re-accumulating shared pixels.

Figure 12G:
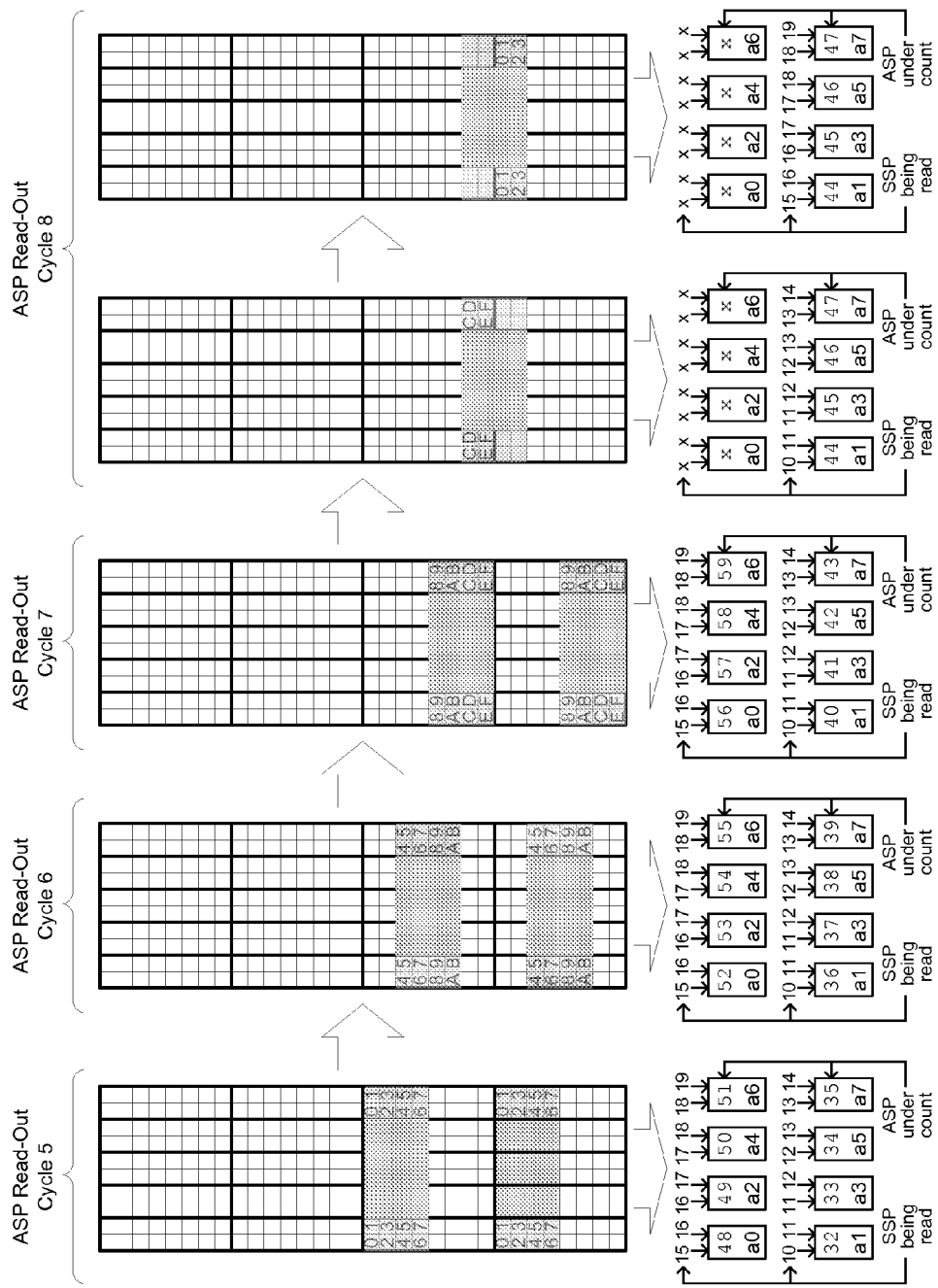

FIGS. 12D-12G illustrate an exemplary ASP read-out sequence that can be executed within the image sensor IC of FIG. 12A. More specifically, FIGS. 12D and 12E illustrate an exemplary numbering of SSPs (0-19) and image pixels (0-59), respectively, and FIGS. 12F and 12G illustrate examples of pixel-readout and ASP accumulation operations referencing the SSP and image pixel numbering shown in FIGS. 12D and 12E. Because each image pixel corresponds to a respective ASP, the image pixel numbering is also used to refer to the corresponding ASP.

The ASP read-out sequence shown in FIGS. 12F and 12G is presented as a succession of ASP read-out cycles, each of which spans the simultaneous read-out of pixel values within a pair of ASP rows disposed within adjacent physical rows of SSPs. Thus, during ASP read-out cycle 1, even numbered accumulators a0, a2, a4, a6 receive pixel values read-out from respective pairs of SSPs in a first physical row (i.e., 0|1, 1|2, 2|3 and 3|4 as shown below the sensor image, where '#|#' denotes the numbers of the two SSPs contributing pixel values in parallel to a given accumulator) to accumulate ASP samples 0-3, while odd-numbered accumulators a1, a3, a5, a7 receive pixel values read-out from respective SSP pairs in a second physical row (i.e., 5|6, 6|7, 7|8 and 8|9) to accumulate ASP samples 16-19. After the read-out cycle is complete, the ASP samples can be transferred from the accumulators to buffers within the multiplexing logic, thus enabling the accumulators to be applied in ASP read-out cycle 2 while ASP samples 0-3 and 16-19 are transmitted (or accumulated with like-numbered ASP samples within temporal compression logic).

In the example shown, the image pixel field spanned by each ASP is assumed to include 16 binary pixels. For ASP rows that do not straddle two physical SSP rows, this means that eight binary pixel values are read-out from each of two successively numbered SSPs. These binary pixels are numbered hexadecimally according to their SSP cell position. Thus, ASP read-out cycle 1, each accumulator receives two sets of eight pixel values from neighboring SSPs, with each set of eight pixel values being read-out from binary pixels 0-7 within a respective one of the SSPs. For ASP rows that straddle two physical rows (e.g., ASPs 12-15 and 28-31), four binary pixel values are read-out from each of four SSPs, an operation discussed below.

In ASP read-out cycle 2, even numbered accumulators a0, a2, a4, a6 again receive respective sets of pixel values from the first physical row of SSPs (i.e., 0|1, 1|2, 2|3 and 3|4), but in this case accumulate pixel values 0x4-0xB (where '0x' denotes hexadecimal numbering) and thus ASP samples 4-7; the second row of ASPs within the first physical row of SSPs. Similarly, odd-numbered accumulators accumulate pixel values 0x4-0xB from the second physical row of SSPs and thus ASP samples 20-23; the second row of ASPs within the second physical row of SSPs.

Reflecting on ASP read-out cycles 1 and 2, it can be seen that, due to the spatial overlap between adjacent rows of ASPs, each binary pixel within the image sensor (except for those at the upper and lower boundaries of the sensor) contributes to two different ASP samples. Further, the last half of the accumulated total for a given ASP row constitutes the first half of the accumulated total for the subsequent ASP row. Accordingly, by accumulating the spatial halves of the image pixel field for a given ASP separately (e.g., within the sub-accumulators shown in FIG. 12C), the fractional accumulations can be summed to generate the ASP sample, and the last-generated of the fractional accumulations reused in the determination of the ASP sample for the subsequent ASP row, thereby avoiding the need to re-read and re-accumulate shared binary pixel values.

Continuing with FIG. 12F, in ASP read-out cycle 3, even numbered accumulators a0, a2, a4, a6 again receive respective sets of pixel values from the first physical row of SSPs, but in this case accumulate pixel values 0x8-0xF (where '0x' denotes hexadecimal numbering) and thus ASP samples 8-11, the third row of ASPs within the first physical row of SSPs. Similarly, odd-numbered accumulators accumulate pixel values 0x8-0xF from the second physical row of SSPs and thus ASP samples 24-27; the third row of ASPs within the second physical row of SSPs.

As mentioned, the two rows of ASPs accumulated during ASP read-out cycle 4 each straddle two physical rows of SSPs. Because the SSPs in each physical row are coupled to distinct data lines, this means that, after the first half of the spanned pixel values have been read-out (i.e., pixel values C-F), the states of the accumulator-input multiplexers (e.g., elements 423 of FIG. 12B) are switched to select the SSPs on the other half of the divide as the source of the remaining pixel values to be accumulated. Accordingly, the pixel read-out sequence for ASP read-out cycle 4 is illustrated in three parts, the first of which shows read-out of the first-half of the spanned pixels. Note that this read-out operation is presented for purposes of example only, as the 0xC-0xE pixel values can be present in the accumulators as a fractionally accumulated value generated within the latter half of read-out cycle 3, thus avoiding the need to re-read those pixel values. Continuing with ASP read-out cycle 4, because the second half of the pixel values spanned by the lower row of ASPs being accumulated (i.e., ASPs 28-31) extends into a different logical row of SSPs than the upper half of the pixel values (i.e., image pixel field spans two different folded SSP rows), the two logical SSP rows are accessed one after another to avoid contention on the core bit lines that they share. That is, in the read-out sequence of FIGS. 12F and 12G (and corresponding accumulator embodiment of FIG. 12B) only one folded row of SSPs is accessed during any given read out interval so that the binary pixel read out sequences with respect to the latter half of ASP rows 12-15 and with respect to the latter half of ASP rows 28-31 are executed sequentially and depicted separately. As shown, the odd-numbered accumulators can remain unused (indicated by 'x' in the SSP being read and the ASP under count fields) during the accumulation of the last half of ASPs 12-15. Also, while the even-numbered accumulators can remain unused during the accumulation of the last half of ASPs 28-31, those accumulators can alternatively be used to accumulate the first half of ASPs 48-51 as shown.

FIG. 12G illustrates ASP read-out cycles 5-8, which progress in generally the same manner as read-out cycles 1-4, except that the even-numbered accumulators are applied to accumulate ASP samples for the lower of the two physical rows of ASPs and, conversely, the odd-numbered accumulators are applied to accumulate ASP samples for the upper of the two physical ASP rows. Also, though read-out cycle 5 illustrates a read-out of both halves of the ASP rows under count, the fractional accumulation of the first halves of those rows can be resident within the accumulator following their read-out in ASP read-out cycle 4 and thus need not be read-out or accumulated again (i.e., assuming a pipelined accumulator as, for example, in FIG. 12C). Assuming that read-out cycle 8 corresponds to the final ASP row accumulation in the sensor, then no SSP-straddling ASP row need be accumulated by the even-numbered ASP accumulators during the accumulation of the final SSP-straddling ASP row (i.e., ASP rows 44-47) within the odd-numbered accumulators.

While a particular ASP read-out sequence has been described in reference to FIGS. 12F and 12G, numerous alternative sequences and/or optimizations to the sequence shown can be carried out in alternative embodiments or configurations. For example, noting that the binary pixel values read out in the second half of an ASP accumulation for an ASP row that straddles physical SSP rows within the same folded SSP row are the same as those read out by the counterpart accumulators (odd-numbered or even-numbered accumulators as the case may be) in a preceding ASP read-out cycle, it follows that the initial fractional accumulation of those values can be buffered to avoid redundant read-out. Referring to FIG. 12F, for example, instead of re-reading and re-accumulating pixel values "AA" to obtain the second half of ASP samples 12-15 in ASP read-out cycle 4, the accumulation value for pixels "AA" can instead have been buffered following their read-out during ASP cycle 1. In such an embodiment, the buffered accumulation value can be combined with the pixel values accumulated during the initial phase of ASP read-out cycle 4 to complete ASP samples 12-15, thereby avoiding the redundant pixel read-out operations and shortening the overall ASP read-out time.

Figure 13B:
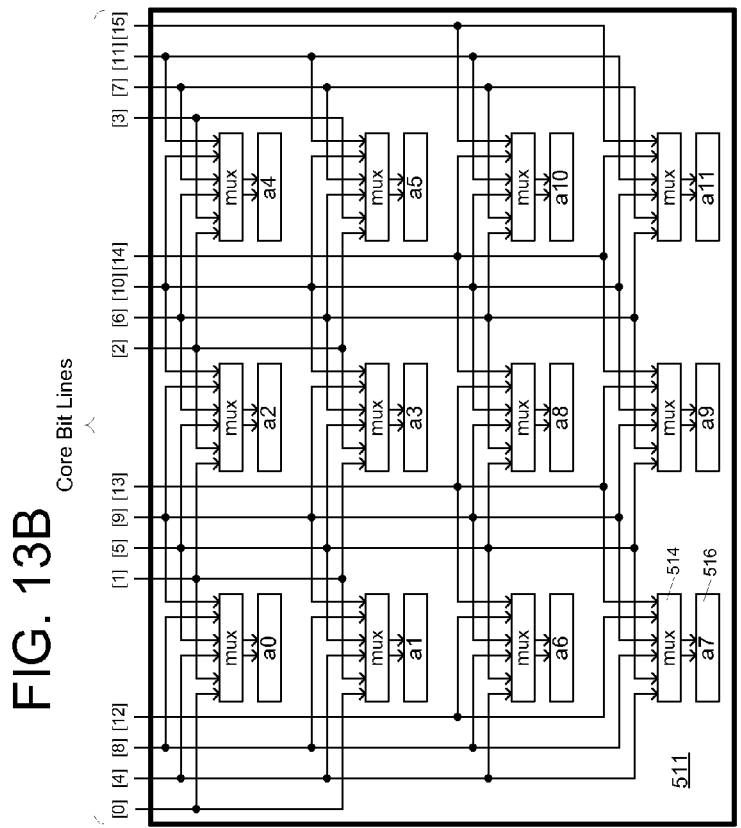
FIG. 13B illustrates an embodiment of a compression logic circuit that can be used to implement the compression logic shown in FIG. 13A.
Figure 13A:
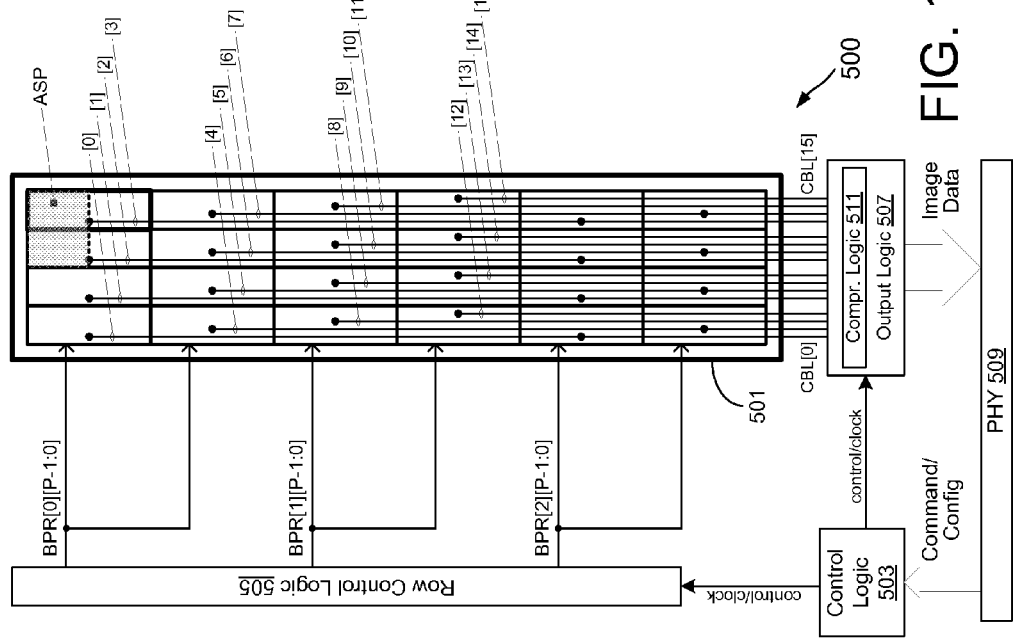
FIG. 13A illustrates an another embodiment of an image sensor IC having a binary-pixel image sensor formed by an array of oblong sense-amp super pixels and branched binary-pixel-row lines as in FIG. 12A, but having twice the core bit line density.

FIG. 13A illustrates an another embodiment of an image sensor IC 500 having a binary-pixel image sensor 501 formed by an array of oblong SSPs and branched BPR signal lines as in FIG. 12A, but having twice the core bit line density. More specifically, instead of coupling a core bit line (CBL) to an SSP within each folded SSP row, each core bit line is coupled to an SSP within every other folded SSP row so that each physical column of four SSPs is coupled to a respective core bit line. As explained below, this configuration permits increased read-out pipelining as pixel values from two adjacent folded SSP rows can be read-out and accumulated simultaneously. As shown, image sensor IC 500 additionally includes control logic 503, row control logic 505, output logic 507 (including compression logic 511) and physical signaling interface 509, each of which operate generally as described in reference to counterpart components of the image sensors described above to control image acquisition and read-out. As in FIGS. 3, 5A, 10A, 11A and 12A only a representative portion of the binary-pixel image sensor is shown.

As in the preceding example, the SSP aspect ratio is 4:1 (length to width) and the ASP aspect ratio is 1:1 (square as shown by shaded region—not to scale) and the ASP area in binary pixels (i.e., image pixel field) is equal to the SSP area. Also, a 50% ASP pitch is applied so that each ASP can span fractions of up to four SSPs as explained in reference to FIG. 12A. Further, because of the increased number of core bit lines, the inputs to ASP accumulators within compression logic 511 are more extensively multiplexed. In the embodiment shown in FIG. 13B, for example, a respective six-input multiplexer 514 is associated with each of twelve ASP accumulators 516 to enable reception of pixel values from one of three different pairs of core bit lines. Note that the twelve ASP accumulators shown represent a fraction of the total number of counters within a complete image sensor. Assuming a generalized number 'M' of SSP columns, for example, then an embodiment of compression logic 511 implemented following the approach shown in FIG. 13B will include (M−1)*4 ASP accumulators 516. In the embodiment shown, each of the ASP accumulators 516 is implemented by a logic circuit that increments a count value by one for each incoming pixel value having an asserted logic state (e.g., '0' or '1'), thus either holding the count value steady, or incrementing the count value by 1, or 2 in each pixel read-out interval, depending on the number of pixel values in the asserted logic state.

Figures 13C, 13D, 13E:
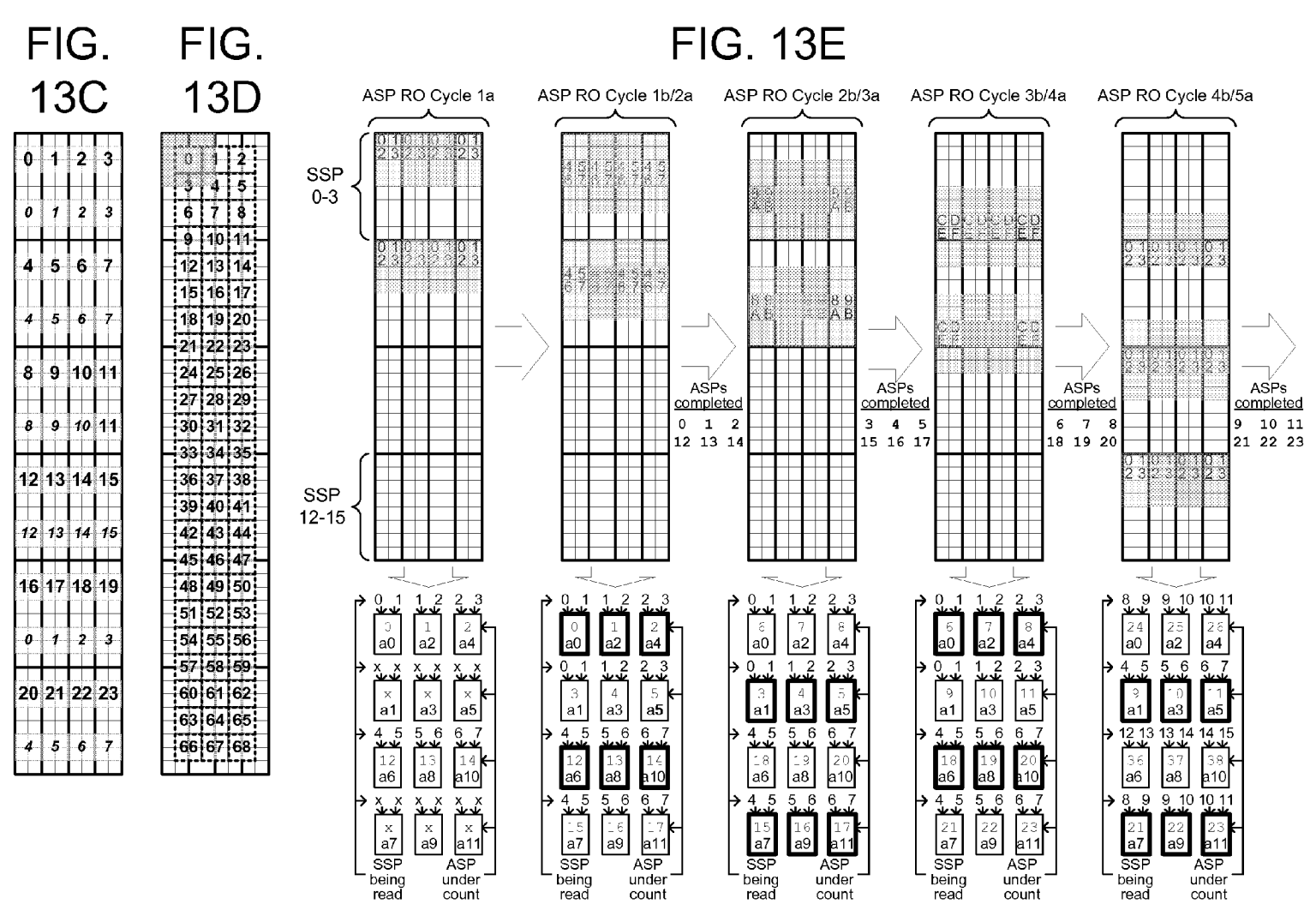
Figure 13F:
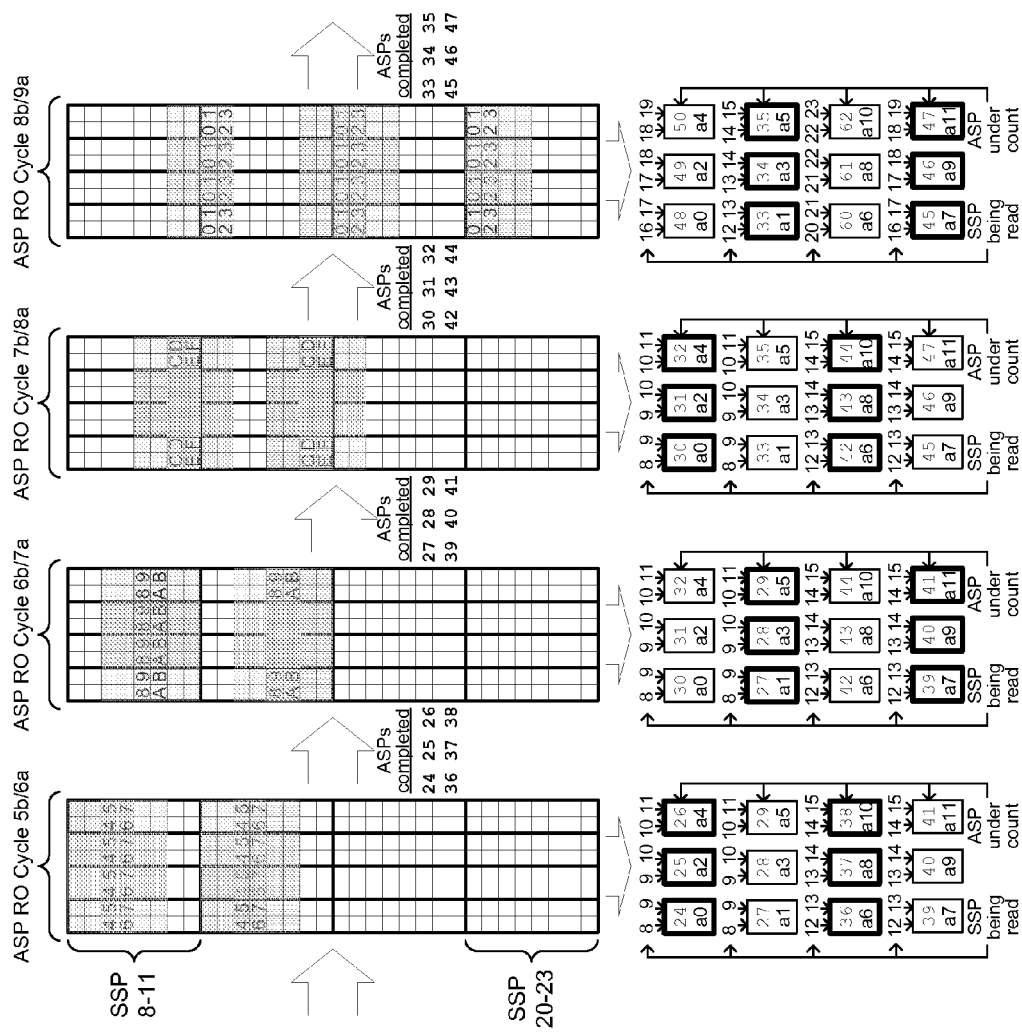
Figure 13G:
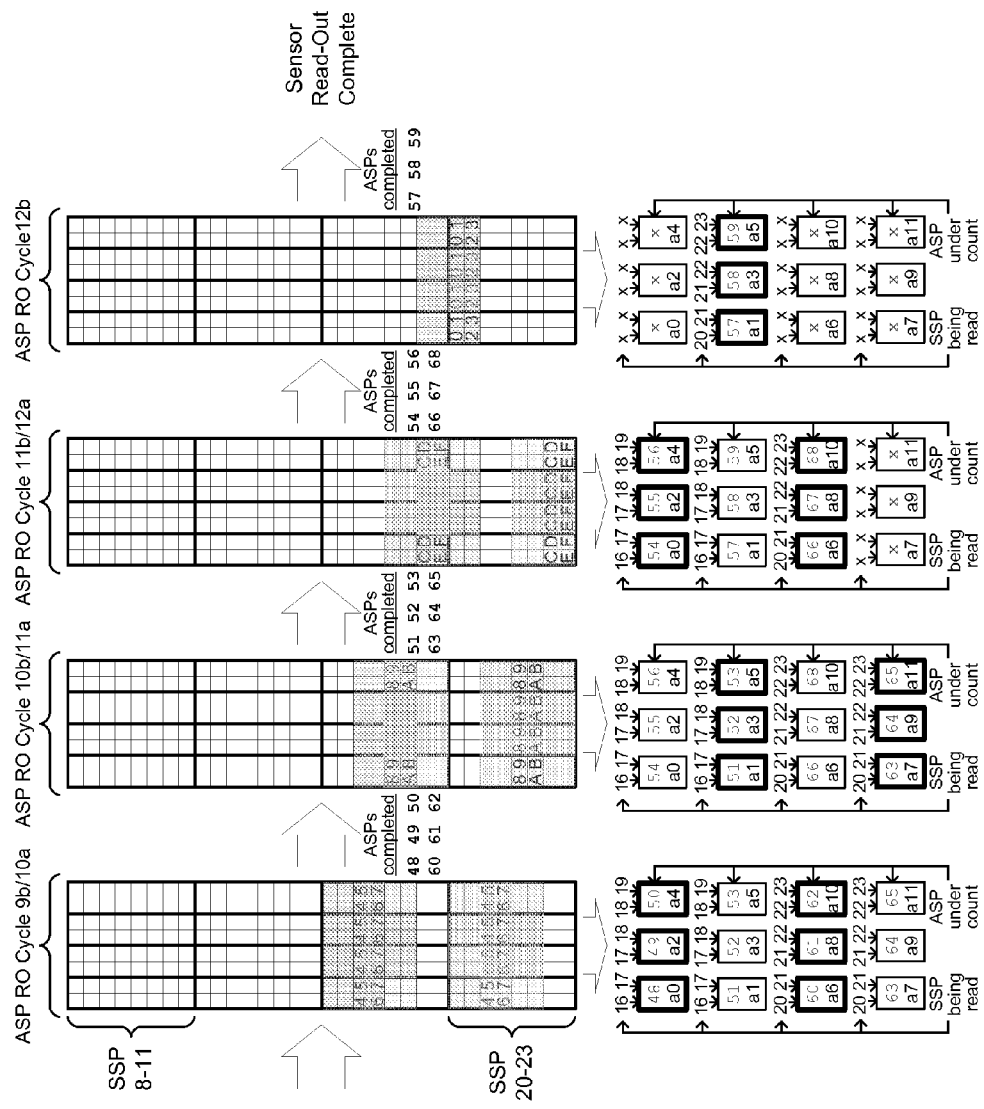

FIGS. 13C-13G illustrate an exemplary ASP read-out sequence within the image sensor fragment of FIG. 13A. More specifically, FIGS. 13C and 13D illustrate an exemplary numbering of SSPs and image pixels, respectively, and FIGS. 13E-13G illustrate pixel read-out and ASP accumulation operations referencing the SSP and image pixel numbering. Because each image pixel corresponds to a respective ASP, the image pixel numbering is also used to refer to the corresponding ASP.

In contrast to FIGS. 12F and 12G which depict whole ASP read-out cycles, FIGS. 13E-13G present an exemplary read-out sequence as a succession of fractional ASP read-out cycles, each numbered according to the half of the ASP read-out cycle completed during a given interval. Thus, starting with FIG. 13E, the pixel values corresponding to the first half of ASPs 0-2 and ASPs 12-14 are read-out from respective physical SSP rows and accumulated during ASP read-out cycle 1a, and the pixel values corresponding to the remaining half of those ASPs are read-out and accumulated in ASP read-out cycle 1b (i.e., with the entire ASP sample accumulation interval thus spanning cycles 1a and 1b). Because the pixel values read-out and accumulated during ASP read-out cycle 1b also constitute the first half of the pixel values to be read-out and accumulated for ASPs 3-5 and 15-17, ASP read-out cycle 1b is effectively carried out in parallel with ASP read-out cycle 2a, thus pipelining the sample accumulation operations with respect to successive rows of ASPs.

Referring specifically to ASP read-out cycle 1a, it can be seen that even-numbered accumulators (a0, a2, a4, . . . , a10) receive pixel values read-out from respective pairs of SSPs in a first logical row (i.e., from SSP pairs 0|1, 1|2, 2|3, 4|5, 5|6, and 6|7, with each SSP delivering pixel values 0-3), thus accumulating fractions of ASP samples 0-2 and 12-14. The odd-numbered accumulators (a1, a3, a5, . . . , a11) remain unused during ASP read-out cycle 1a. During ASP read-out cycle 1b/2a, the second half of the pixel values corresponding to ASP samples 0-2 and 12-14 are read-out and accumulated within the even-numbered counters. Because those same pixel values constitute the first half of the pixel values to be accumulated within ASP samples 3-5 and 15-17, the pixel values can be accumulated within odd numbered counters (a1, a3, a5, . . . , a11) to complete the first-half accumulation of those ASP samples. Thus, the pixel values read-out during ASP read-out cycle 1b/2a are simultaneously accumulated within even-numbered and odd-numbered accumulators, in the even case completing the set of ASP samples half-accumulated in the prior fractional ASP-readout cycle, and in the odd case starting the set of ASP samples to be completed in the subsequent fractional ASP-readout cycle. Because the ASP samples within the even-numbered accumulators are complete (i.e., samples for ASPs 0, 1, 2, 12, 13 and 14), they can be latched within downstream logic (e.g., buffers) for output from the sensor IC or further compression activity, thus freeing the even-numbered accumulators to accumulate another set of ASP samples in the subsequent ASP read-out cycle. The ASP sample output operation is indicated in FIG. 13E by the listing of ASPs completed, and the accumulators freed for re-assignment in the next ASP read-out cycle are indicated by bold outline. This convention is followed for each of the ASP read-out cycles shown in FIGS. 13E-13G.

ASP read-out cycle 2b/3a follows the same pattern as cycle 1b/2a, but with the roles of the even- and odd-numbered accumulators reversed. That is, both sets accumulators receive the same pixel values from the image sensor (i.e., accumulator a0 receives the same pixel values as accumulator a1, a2 receives the same pixel values as a3, etc.), but the odd-numbered accumulators accumulate those pixel values to complete the ASP samples begun in prior ASP read-out cycle (i.e., completing ASP samples 3, 4, 5, 15, 16, 17), while the even-numbered accumulators simultaneously accumulate the first-half of ASP samples 6-8 and 18-20. Because the ASP samples 3-5 and 15-17 are completely accumulated within the odd-numbered accumulators following ASP read-out cycle 2b/3a, they can be latched within downstream logic, freeing the odd-numbered accumulators to accumulate another set of ASP samples in the subsequent ASP read-out cycle.

In ASP read-out cycle 3b/4a the roles of the even-numbered and odd-numbered accumulators revert to those in cycle 1b/2a, with the even-numbered accumulators accumulating the pixel values shown (C-F from each SSP) to complete the ASP samples partially accumulated in the prior ASP read-out cycle (6, 7, 8, 18, 19, 20), and the odd-numbered accumulators accumulate those same pixel values within the first half of the ASP samples to be output in the next ASP read-out cycle (9, 10, 11, 21, 22, 23). Accordingly, the completely accumulated ASP samples are output from the even-numbered accumulators following the completion of ASP read-out cycle 3b/4a, freeing those accumulators to accumulate subsequent rows of ASPs in the next ASP read-out cycle.

Upon completion of ASP read-out cycle 3b/4a, all ASPs that include binary pixels within the first logical row of SSPs (SSPs 0-7) have been completely or partially accumulated so that the ASP samples to be initially accumulated within the even-numbered accumulators during ASP read-out cycle 4b/5a are those that span the first half of the next logical row of SSPs (8-15) and thus ASPs 24-26 and 36-38. At the same time, the odd-numbered accumulators require the remaining pixel values from a row of ASPs that straddle physical SSP rows (i.e., ASPs 9-11) and from a row of ASPs that straddle logical SSP rows (i.e., ASPs 21-23), so that, absent prior buffering of the pixel values required by ASPs 9-11, pixel values are needed from two different logical SSP rows. The additional data line density provided in the embodiment of FIG. 13A makes it possible to read-out the pixels from the two different logical rows simultaneously as the data lines used to read-out pixel values from SSP rows 4-7 (for ASPs 9-11) are distinct from those used to read-out pixel values from SSP rows 8-11 and 12-15 (i.e., for ASPs 24-26 and 36-38, respectively). Accordingly, as shown in ASP read-out cycle 4b/5a, the two sets of odd-numbered accumulators (a1, a3, a5 and a7, a9, a11) receive and accumulate respective sets of pixel values 0-3 from SSP rows 4-7 and 8-11 to complete the ASP samples partially accumulated in the prior ASP read-out cycle (9, 10, 11, 21, 22, 23). During that same interval, the first set of even-numbered accumulators (a0, a2, a4) accumulates the same pixel values as the latter set of the odd-numbered accumulators to generate the first half of ASP samples 24, 25 and 26, and the second set of even-numbered accumulators (a6, a8, a10) accumulates pixel values 0-3 from SSP rows 12-15 to generate the first half of ASP samples 36, 37 and 38. The completely accumulated ASP samples are output from the odd-numbered accumulators following the completion of ASP read-out cycle 4b/5a, freeing those accumulators to accumulate subsequent rows of ASPs in the next ASP read-out cycle.

FIG. 13 F continues the exemplary sensor read-out sequence started in FIG. 13E. Thus, during ASP read-out cycle 5b/6a even-numbered accumulators receive and accumulate the pixel values shown (i.e., pixel values 4-7 from each of SSPs 8-15) to complete the ASP samples partially accumulated in the prior ASP read-out cycle (24, 25, 26, 36, 37, 38), and the odd-numbered accumulators accumulate those same pixel values within the first half of the ASP samples to be output in the next ASP read-out cycle (27, 28, 29, 39, 40, 41). Accordingly, the completely accumulated ASP samples are output from the even-numbered accumulators following the completion of ASP read-out cycle 5b/6a, freeing those accumulators to accumulate subsequent rows of ASPs in the next ASP read-out cycle.

During ASP read-out cycle 6b/7a odd-numbered accumulators receive and accumulate the pixel values shown (i.e., pixel values 8-B from each of SSPs 8-15) to complete the ASP samples partially accumulated in the prior ASP read-out cycle (27, 28, 29, 39, 40, 41), and the even-numbered accumulators accumulate those same pixel values within the first half of the ASP samples to be output in the next ASP read-out cycle (30, 31, 32, 42, 43, 44). Accordingly, the completely accumulated ASP samples are output from the odd-numbered accumulators following the completion of ASP read-out cycle 6b/7a, freeing those accumulators to accumulate subsequent rows of ASPs in the next ASP read-out cycle.

During ASP read-out cycle 7b/8a the even-numbered accumulators receive and accumulate pixel values C-F from each of SSPs 8-15 to complete the ASP samples partially accumulated in the prior ASP read-out cycle (30, 31, 32, 42, 43, 44), and the odd-numbered accumulators accumulate those same pixel values within the first half of the ASP samples to be output in the next ASP read-out cycle (33, 34, 35, 45, 46, 47). Accordingly, the completely accumulated ASP samples are output from the even-numbered accumulators following the completion of ASP read-out cycle 7b/8a, freeing those accumulators to accumulate subsequent rows of ASPs in the next ASP read-out cycle.

The pixel read-out and accumulation pattern in ASP read-out cycle 8b/9a matches that of read-out cycle 4b/5a. More specifically, the two sets of odd-numbered accumulators (a1, a3, a5 and a7, a9, a11) receive and accumulate respective sets of pixel values 0-3 from SSP rows 12-15 and 16-19 to complete the ASP samples partially accumulated in the prior ASP read-out cycle (33, 34, 35, 45, 46, 47), the first set of even-numbered accumulators (a0, a2, a4) accumulates the same pixel values as the latter set of the odd-numbered accumulators to generate the first half of ASP samples 48, 49 and 50, and the second set of even-numbered accumulators (a6, a8, a10) accumulates pixel values 0-3 from SSP rows 20-23 to generate the first half of ASP samples 45, 46, 47. The completely accumulated ASP samples are output from the odd-numbered accumulators following the completion of ASP read-out cycle 8b/9a, freeing those accumulators to accumulate subsequent rows of ASPs in the next ASP read-out cycle.

FIG. 13G shows the completion of the exemplary sensor read-out sequence started in FIGS. 13E and 13F. Thus, during ASP read-out cycle 9b/10a the even-numbered accumulators receive and accumulate the pixel values 4-7 from each of SSPs 17-23 to complete the ASP samples partially accumulated in the prior ASP read-out cycle (48, 49, 50, 60, 61, 62), and the odd-numbered accumulators accumulate those same pixel values within the first half of the ASP samples to be output in the next ASP read-out cycle (51, 52, 53, 63, 64, 65). Thereafter, the completely accumulated ASP samples are output from the even-numbered accumulators, freeing those accumulators to accumulate subsequent rows of ASPs in the next ASP read-out cycle.

During ASP read-out cycle 10b/11a odd-numbered accumulators receive and accumulate pixel values 8-B from each of SSPs 20-23 to complete the ASP samples partially accumulated in the prior ASP read-out cycle (51, 52, 53, 63, 64, 65), and the even-numbered accumulators accumulate those same pixel values within the first half of the ASP samples to be output in the next ASP read-out cycle (54, 55, 56, 66, 67, 68). The completely accumulated ASP samples are output from the odd-numbered accumulators, freeing those accumulators to accumulate subsequent rows of ASPs in the next ASP read-out cycle During ASP read-out cycle 11b/12a the even-numbered accumulators receive and accumulate pixel values C-F from each of SSPs 20-23 to complete the ASP samples partially accumulated in the prior ASP read-out cycle (54, 55, 56, 66, 67, 68), and the first set of odd-numbered accumulators (a1, a3, a5) accumulate those same pixel values within the first half of the ASP samples to be output in the next ASP read-out cycle (57, 58, 59). Assuming that the bottom SSP row of the image sensor has been reached, the second set of odd-numbered accumulators (a7, a9, 11) remain unused as there is no SSP-straddling row of ASPs at the bottom of the sensor. The completely accumulated ASP samples are output from the even-numbered accumulators following the completion of ASP read-out cycle 11b/12a, thus completing operations within those accumulators for the current sensor read-out sequence.

In read-out cycle 12b, the first set of odd-numbered accumulators receive and accumulate pixel values 1-3 from SSPs 20-23 to complete the ASP samples partially accumulated in the prior ASP read-out cycle (57, 58, 59), thereby concluding the sensor read-out sequence. At this point, the accumulators can be cleared in preparation for a subsequent sensor read-out, for example, to support temporal oversampling of a particular image frame, or to capture a new image frame.

Exposure Control

In a number of embodiments, the exposure interval within a binary-pixel image sensor is controlled by the order in which pixel precharge and sense operations are executed within different binary pixel rows. More specifically, by varying the number of binary pixel rows that are operated as a group, sequentially precharging more or fewer binary pixel rows in sequence before returning to sequentially sense the pixel values developed within those rows, the exposure interval for the binary pixels in a given binary pixel row can be varied. An example of this approach is presented below, following a description of exemplary pixel precharge, sense and read-out operations that can be executed with respect to a selected binary pixel row.

Figure 14:
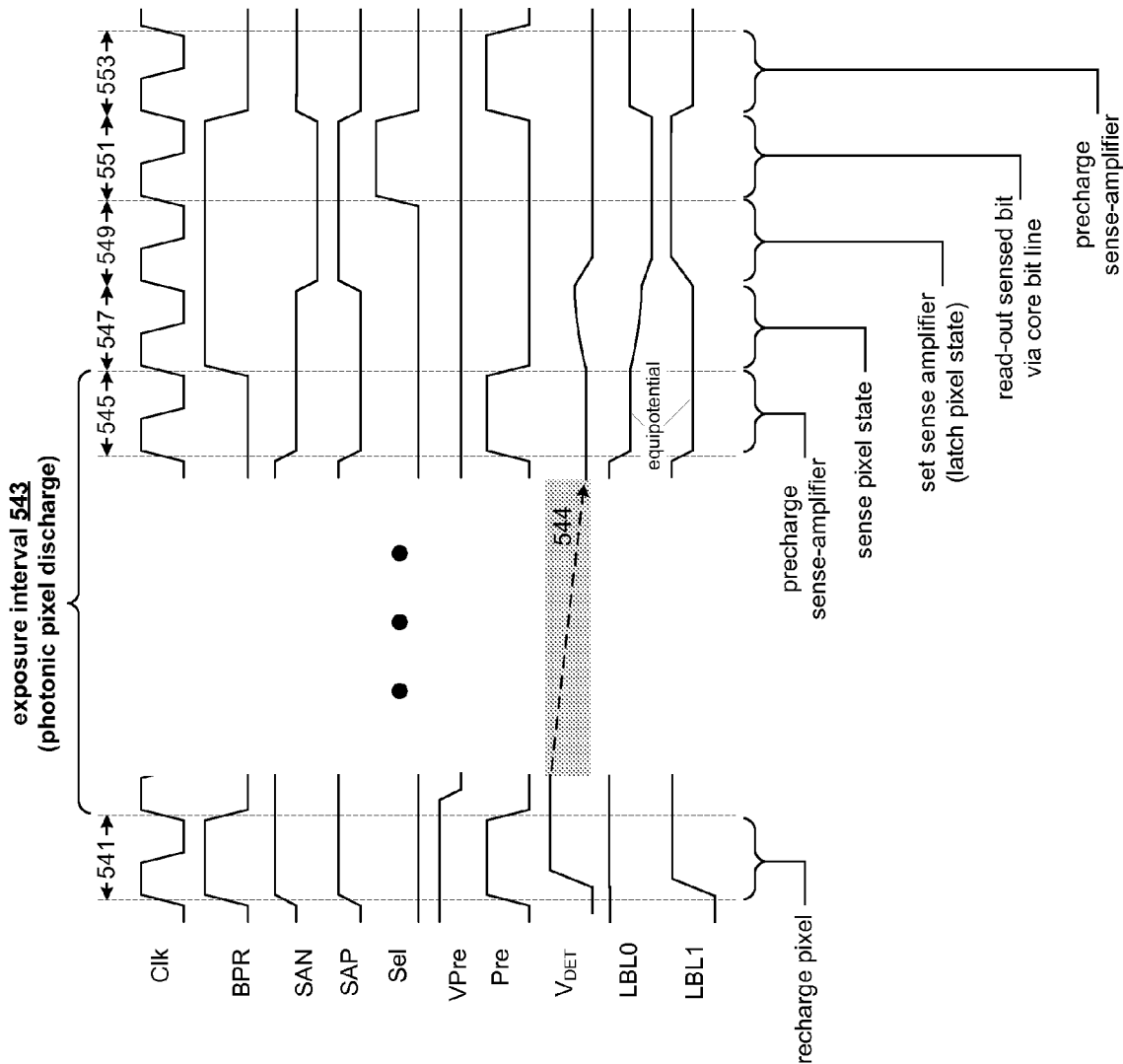
FIG. 14 illustrates an exemplary sequence of operations that can be performed within the sense-amp super pixel of FIG. 4C to precharge, sense and read-out the constituent binary pixels.

FIG. 14 illustrates an exemplary sequence of operations that can be performed within the sense-amp super pixel of FIG. 4C to precharge, sense and read-out the constituent binary pixels. At the start of a pixel precharge interval shown at 541 and commenced by a rising edge of clock signal "Clk," a binary-pixel-row signal (BPR) is raised to switchably couple detection node $V_{DET}$ (e.g., cathode of a photo diode) of a selected binary pixel to the corresponding one of local bit lines LBL0 and LBL1. At roughly the same time, a precharge voltage, VPre, is applied to the local bit lines of the SSP via transistors N3 and N4 (i.e., VPre is raised and control signal Pre is asserted), raising the potential of both local bit lines as shown and thereby charging the detection node of the selected binary pixel to the precharge voltage. In the example shown, the SAN signal is also raised to avoid drawing current from the bit lines via transistors N1 and N2. Transistors P1 and P2 are switched off due to the charged state of the local bit lines, but the SAP signal can also be raised as shown.

In one embodiment, the pixel precharge operation is completed in a single clock cycle, with the BPR signal lowered to decouple the precharged binary pixel from the local bit line, and the precharge signal and precharge voltage both lowered. In alternative embodiments, the pixel precharge operation or any other of the operations shown can be executed in a shorter or longer amount of time than depicted. Also, instead of executing pixel precharge operations sequentially, all binary pixels within a given SSP can be precharged at once (simultaneously) in some embodiments. In any case, after the BPR signal is lowered (concluding the pixel precharge interval), an exposure interval 543 is begun as the charge trapped on the detection node of the precharged binary pixel (i.e., the precharge potential) begins to dissipate or leak in response to one or more photon strikes, thereby developing a detection voltage ($V_{DET}$) indicative of the accumulated light (or photon flux) as shown at 544. The exposure interval transpires over a variable but controlled time (as indicated by the ellipsis in FIG. 14) during which pixel precharge operations can be executed with respect to other binary pixels within the SSP, for example, by repeating the signal states shown in interval 541 with assertion of a different BPR line.

During interval 545, just prior to the conclusion of the exposure interval, the sense amplifier is precharged in preparation for a sense operation. In the embodiment shown, the sense-amp precharge is effected by lowering VPre, SAP and SAN all to a voltage between the precharge voltage and a fully discharged detection node voltage (e.g., to a midpoint voltage or any other practicable equipotential), and asserting the precharge signal, Pre. By this operation, the local bit lines are set to an equipotential state in preparation for sensing the binary pixel output, and the potential across the two inverters (N1, P1 and N2, P2) that form the back-to-back-coupled inverters of the differential latch is neutralized, thus rendering the latch to an unlatched, transparent state.

At the clock edge that concludes the sense-amp precharge interval 545 (and the exposure interval 543), the precharge control signal is lowered and the BPR signal is raised, thus decoupling the precharge voltage from the bit lines and coupling the detection node of the selected pixel to the corresponding one of the local bit lines, which is assumed to be LBL0 in this example (note that a brief delay can be imposed between lowering Pre and raising BPR to avoid a race condition). By this operation, the residual charge on the detection node (i.e., the pixel voltage) is enabled to drive local bit line LBL0, pulling it down or up according to whether the pixel voltage is above or below the nominal midpoint to which the local bit lines were charged during the sense-amp precharge interval. Thus, during pixel-sense interval 547, the pixel state is "sensed" by developing a differential voltage between the local bit lines (one of which is effectively floated at the midpoint potential, and the other of which is influenced by the pixel voltage). Accordingly, in the example shown, local bit line LBL0 is pulled down (while $V_{DET}$ rises somewhat in the charge transfer) while local bit line LBL1 remains at or approximately at the level established during sense-amplifier precharge interval 545. Note at this point that the level of the equipotential voltage to which the local bit lines were charged determines the polarity of the differential voltage developed during pixel sense for a given pixel voltage and thus may be viewed as establishing the decision threshold between logic '1' and logic '0' states of the binary pixel. At the conclusion of pixel-sense interval 547 SAN is lowered and SAP is raised to power the back-to-back inverters that form the differential latch, thereby enabling the inverters to respond to the differential voltage present on the local bit lines and latch the pixel state, regeneratively driving the local bit lines to a full rail potential (i.e., to the potential difference between SAP and SAN) corresponding to the pixel state. Thus, at the conclusion of pixel-state latching interval 549, the state of the selected pixel value has been sensed, latched and amplified on the local bit lines in preparation for read-out so that the sense operation, deemed to span the pixel-sense and pixel-state latching intervals 547 and 549, is complete. Accordingly, during the ensuing read-out interval 551, one of the select signals (SelE or SelO) is raised to enable the sensed pixel bit to be driven onto a core bit line (CBL), thereby reading-out the binary pixel value. During interval 553, the sense-amp precharge operation is repeated in preparation for sensing, latching and reading-out the state of another binary pixel within the SSP (e.g., a binary pixel precharged during exposure interval 543).

Considering the pixel operation sequence shown in FIG. 14 (i.e., pixel precharge, exposure and sense), it can be seen that, by overlapping two such "pixel cycles," precharging a first binary pixel row and then precharging a second binary pixel row before returning to sense the first binary pixel row, the precharge interval in the second pixel row occurs in parallel with the exposure interval in the first pixel row thus effecting a pixel cycle pipeline. Further, the number of binary pixel rows precharged in sequence (or in parallel) before sense operations are executed with respect to those rows, a measure of the pipeline depth, effectively defines the exposure interval. Accordingly, by dynamically adjusting the depth of the pixel cycle pipeline in response to input from a host IC and/or ambient conditions detected by the sensor itself, different exposure intervals can be achieved within the binary-pixel image sensor.

FIGS. 15A-15C illustrate examples of pixel cycle pipelines having progressively greater depths to effect correspondingly longer exposure intervals within a binary-pixel image sensor. For ease of understanding, a small binary-pixel image sensor having a three-by-three array of SSPs, each having four binary pixels is shown. Also, each binary pixel row is assumed to include one binary pixel within a physical row of three SSPs so that respective groups of three binary pixels are cycled in parallel. An actual image sensor will, in most cases, have many more SSPs, more binary pixels per SSP and can also have folded binary pixel rows and/or multiple core bit lines per physical SSP column as discussed above.

Referring specifically to FIG. 15A which shows progressive states of the binary-pixel image sensor in a minimal-exposure pixel cycle pipeline, a first binary pixel row is precharged during the pixel precharge interval shown in state 557 and exposed during the ensuing pixel precharge interval shown in state 558 in which a pixel precharge operation is executed within a second binary pixel row. In state 559, following the brief exposure that occurred concurrently with the precharge operation in state 558, the first binary pixel row is sensed and read out concurrently with exposure of the second binary pixel row. In state 560, after the second binary pixel row has been exposed, the second binary pixel row is read-out. The four state, one-deep pixel cycle pipeline sequence (precharging, exposing and sensing/reading-out a pair of binary pixel rows as shown in states 557-560) is then repeated for each successive pair of binary pixel rows of the sensor, thus completing the sensor exposure cycle, before repeating the precharge, exposure and sense/read-out operations with respect to the first two binary pixel rows. In the embodiment shown, the precharge interval and sense/read-out interval are matched (e.g., intentionally extending one interval to match the minimum time required to complete the other) to ensure equal exposure times of the first and second binary pixel rows. In alternative embodiments, where the precharge and sense/read-out intervals are different, the minimal exposure sequence can be achieved by completing the precharge, exposure and read-out of one binary pixel row before beginning the next (i.e., no pipelining).

FIG. 15B illustrates exemplary states of the binary-pixel image sensor in a "x2" exposure pipeline. In effect, the sequence of states is the same as shown in FIG. 15A except that three binary pixel rows are precharged in sequence in states 567, 568, and 569 before corresponding sense/read-out operations are executed in states 570, 571 and 572. The pixel cycle pipeline depth is thus increased by a precharge interval relative to that shown in FIG. 15A, effecting a correspondingly longer exposure interval within each binary pixel of the array. The six-state sequence (i.e., encompassing states 567-572) is repeated for the remaining binary pixel rows of the image sensor to complete the sensor exposure cycle before repeating with the first three binary pixel rows as shown.

In one embodiment, the pixel cycle pipeline depth can be increased incrementally in pixel precharge intervals from the x1 and x2 depths shown in FIGS. 15A and 15B, respectively, to a maximal pipeline depth corresponding to the number of binary pixel rows in the image sensor. FIG. 15C illustrates such a maximal pipeline depth in which N*P (number of SSP rows times number of binary pixel rows per SSP row) precharge operations are executed in sequence before performing corresponding sense/read-out operations, thus exposing each binary pixel row over the cumulative interval required to pixel-precharge the entire image sensor, before repeating the sequence starting at state 575. This exposure interval can be extended further by introducing one or more dead cycles (i.e., no-operation intervals having a duration corresponding to the pixel precharge interval) following the precharge of the final binary pixel row.

FIG. 16 is an exemplary pseudo-code listing of operations that can be executed by the control logic within a binary-pixel image sensor to adjust the pixel cycle pipeline depth and thus vary the sensor exposure interval. In the example shown, pixel precharge, exposure, sense and read-out operations are repeated T times for each binary pixel within an image sensor having N rows of SSPs, each encompassing P binary pixel rows. The exposure interval is controlled by increasing or decreasing exposure variable 'E' which, in effect, increases or decreases the lag, in binary pixel rows, between the binary pixel row being precharged and the binary pixel row being read-out. The loop established between 581 and 603 increments a precharge index, 'i' from 0 to the total number of pixel cycles to be executed (N*P*T) plus an additional 'E' read-out-only cycles to account for the pipeline depth (i.e., reading out those pixels precharged during the N*P*T loop traversals, but not yet read-out). For each of the first N*P*T loop traversals, the binary pixels within the binary pixel row corresponding to the precharge index are precharged. In the example shown, the SSP row index ('n') and the binary pixel index ('p') are derived from the pixel cycle index at 585 and 587 and then applied in the precharge operation at 589. Instead of being derived from the precharge index, the SSP row index and binary pixel index may be incremented following each precharge operation (and used to derive the precharge index if necessary) in an alternative embodiment.

If the precharge index matches a pipeline depth established by the exposure variable (i.e., E binary pixel rows have been precharged, yielding an affirmative determination at 593), then the binary pixel row corresponding to a readout index that lags the precharge index by E binary pixel rows (i.e., 'i–E') is sensed and read-out at 599. As in the precharge operation, a SSP row index and binary pixel index are derived from the read out index at 595 and 597, though those indices could instead be incremented in each loop iteration (or derived from the SSP row index and binary pixel index applied in the precharge operation) in alternative embodiments.

As shown by the operations at 581-603, by increasing or decreasing the exposure variable, the lag between binary pixel precharge and sense/read-out operations is correspondingly increased or decreased, thus effecting a longer or shorter exposure time according to the depth of the pixel cycle pipeline. In alternative embodiments, delay may be imposed within the control loop (i.e., 581-583) to effect exposure intervals longer than the interval corresponding to the maximum pipeline depth (i.e., E=N*P) and various other changes may be made with respect to individual operations performed within the loop (e.g., incrementing binary pixel row indices instead of deriving those indices as shown at 585, 587, 595 and 597).

Reflecting on the pixel cycle pipelines shown in FIGS. 15A-15C and pseudo-code listing of FIG. 16, it can be seen that the incremental pipeline depths are adjusted in units of pixel precharge intervals and thus based on time intervals that can vary according to the underlying binary pixel and sense-amplifier architectures. Further, in some embodiments, pixels can be precharged on a sensor-wide basis, or at least in larger groups than those of the binary pixel rows described above, thus altering the manner in which exposure times are to be controlled. FIG. 17, for example, illustrates an alternative embodiment of a sense-amplifier 621 that can be employed, together with multiple instances of the active binary pixel shown, to form a sense-amp super pixel. In contrast to the embodiment of FIG. 4C, the pixel reset (precharge) operation is executed in response to a global reset signal that is coupled to reset transistors within all the binary pixels of an SSP, thus enabling all the pixels of the SSP (or those of an entire row of SSPs or even all SSPs in the image sensor) to be precharged simultaneously. In such an embodiment, exposure control can be carried out with SSP row granularity instead of the binary pixel row granularity shown in FIGS. 15A-15C.

Still referring to FIG. 17, the sense amplifier is formed by a differential amplifier instead of the back-to-back inverters shown in FIGS. 4C and 4D. Thus, no latching operation occurs, avoiding the need for a sense amp precharge operation. Also, the amplification transistor 132 within active binary pixel 127 operates as the input transistor of the differential pair, in effect distributing a portion of the differential amplifier within the binary pixels of the SSP. Due to the potentially imbalanced legs of the differential amplifier (i.e., one effected through the binary pixel and local bit lines 624*a* and 624*b* (LBL0 and LBL1) and thus through a longer signal path than the other which is confined within the locale of the sense amplifier), transistors 625*a* and 625*b* are coupled in a current mirror configuration to establish matching current sources for the two legs. Accordingly, when a bias voltage is applied to transistor 627, powering the sense amplifier, a differential voltage is developed on differential nodes 626*a*, 626*b* according to whether the pixel voltage (i.e., the voltage at the detection node of binary pixel 127) is greater or less than a threshold voltage applied to the gate of transistor 623. More specifically, complement-data node 626*b* drops to a lower potential than counterpart node 626*a* if the pixel voltage is below the threshold (i.e., transistor 132 will exhibit a lower transconductance (higher resistance) than transistor 623 due to the difference in their gate voltages and thus effect a higher IR drop than transistor 623) and conversely rising to a higher potential than node 626*a* if the pixel voltage is above the threshold. An inverter, formed by transistors 629 and 631 amplifies the potential on complement-data node 626*b*, outputting a data signal representative of the binary pixel state to a core bit line as shown. Although not specifically shown, sense amplifier 621 may also include circuitry to disable current flow through the differential pair formed by transistor 623 and pixel transistor 132 when not sensing (e.g., by grounding the bias input or decoupling the sense amplifier from the V+ supply) and also to clamp/data node 626*b*. Also, the bias voltage itself can be implemented in a global current mirror circuit that is shared by the sense amplifiers within all or a subset of the SSPs in an image sensor. Note also that by providing a counterpart to transistor 623 within the sense amplifier, a single bit line connection to the binary pixel may be used (instead of the two connections shown) and a passive pixel can be used instead of the active pixel shown.

SSP Variants and Color Image Acquisition

As explained in reference to FIGS. 4A and 4B, SSPs can have various form factors and sense-amp component distributions. Further, while the SSP layouts depicted in those figures can be stepwise repeated in the row and column directions to complete a given image sensor, it may be desirable to vary the sense-amp component dispersion patterns between adjacent SSPs, for example, to avoid regular patterns of dark regions (i.e., cells having no light detecting ability). FIG. 18A, for example, illustrates a group of four SSPs 651a-651d having alternating sense-amp dispersion patterns (or sense-amp component distribution patterns). More specifically SSP 651a has the sense-amp dispersion pattern shown in FIG. 4A, while neighboring SSPs 651b and 651c each have a second sense-amp dispersion pattern. This same alternation can be repeated (e.g., neighbors to the north, south, east and west of an SSP having the first dispersion pattern all have the second dispersion pattern as shown) by a step and repeat of the four SSP arrangement shown, or additional sense-amp dispersion patterns can be applied to further spatially randomize (or spatially spread) the sense amplifier components within a given region of the image sensor.

FIG. 18B illustrates a set of four oblong (2×8) SSPs 655a-655d each having a different sense-amp dispersion pattern. As in FIG. 18A, the SSPs shown can be step and repeated as a group to form a larger image sensor, or SSPs having additional sense-amp dispersion patterns can be provided to further randomize the sense amplifier components within a given region of the image sensor.

As mentioned briefly above, sense-amp super pixels are not limited to quadrilateral form factors. FIG. 19, for example, illustrates an embodiment in which quasi-hexagonal SSPs, each having 30 binary pixels (or 30 pixel cells a fraction of which are allocated to an embedded sense amplifier) are tessellated in the row and column dimensions of a binary-pixel image sensor. In the example shown, the image sensor is color-filtered along SSP boundaries, thus establishing the pattern of red, green and blue SSPs (665, 663, 661). The pixel cells allocated to the embedded sense amplifiers within the SSPs are not specifically shown, but can be distributed according to a uniform pattern from SSP to SSP or according to patterns that vary between neighboring SSPs as in FIGS. 18A and 18B.

Still referring to FIG. 19, ASPs can also be hexagonally tessellated over rows and columns of binary pixels regardless of the form factor of the underlying SSPs. That is, while advantages may inhere in establishing quasi-hexagonal ASPs that are coextensive with the quasi-hexagonal SSPs shown (i.e., encompassing the same collections of binary pixels), the SSPs can alternatively have other form factors (e.g., the square or oblong form factors described above), with multiple such SSPs being accessed to read-out constituent pixels of hexagonal ASPs.

FIG. 20 illustrates an alternative embodiment of a binary pixel image sensor 670, in this case having sense amplifiers 671 embedded within the pixel array, but disposed at edges of respective sense-amp super pixels 673 rather than distributed among the SSP's binary pixels 675. As shown, this architecture results in a sense-amp stripe extending parallel to the row lines of the sensor (or to the bit lines of the sensor in an alternative embodiment). To avoid artifacts in the sensed image, microlenses 677 or other light-focusing or light-directing structures can be disposed over the sensor array to direct light onto the binary pixels of a given SSP and away from the sense amp stripes. To enlarge the focal plane of each microlens and thus reduce the number of microlenses required, sense amp stripes 686a, 686b corresponding to different physical rows of SSPs may be disposed side by side (i.e., in contiguous or abutting regions) as shown by sensor architecture 685 in FIG. 21. As mentioned in reference to FIG. 20, the sense amplifier stripes may alternatively extend in a column direction, parallel to and potentially disposed beneath the bit lines extending across the sensor array FIG. 22 illustrates an alternative embodiment of a binary pixel image sensor 691 in which an embedded sense amplifier ("SA") serves two different "color" groups of binary pixels, each of which forms part of a respective ASP. A respective color filter for a Bayer or other CFA (color filter array) is applied to the group of pixels that constitute a given ASP. Accordingly each CFA group is split between neighboring SSPs and is thus served by an upper sense amplifier and a lower sense amplifier. Within a given SSP, the lower half of a first CFA group is served by a sense amplifier below the CFA group and the upper half of a second CFA group, located below the sense amplifier, is also served by the sense amplifier. Thus each CFA group relies on two sense amplifiers to sense the values developed within the binary pixels in that CFA group.

FIG. 23 illustrates a red-green-blue (RGB) color filter 700 that can overlay a binary-pixel image sensor to enable color image acquisition. In one embodiment, the filter granularity is fine enough to establish a variegated color field for constituent binary pixels of an SSP with the color pattern repeated across SSP rows, so that red, green and blue image information (701, 703, 705, respectively) can be read-out from a row of SSPs in accordance with the binary-pixel-row line asserted. In alternative embodiments, the filter granularity corresponds to the SSP granularity and/or to the ASP granularity so that the binary pixels that constitute a given SSP (and/or a given ASP) deliver red, green or blue binary pixel data uniformly.

Noise Considerations and Sampling Thresholds

In embodiments discussed thus far, the value of an image pixel within a completed image frame is determined by over-sampling with respect to a binary threshold both in space (breaking up the image pixel field into a large number of SDL pixels) and in time (sensing and reading out each SDL pixel multiple times per image frame) and then mathematically reconstructing the incoming photon flux. That is, instead of using a multi-bit ADC to digitize an analog value as in conventional image sensors, the photo-generated charge in each binary pixel is compared to a sampling threshold, the output of the binary pixel being '0' if the charge is below the threshold and '1' if it is above.

Analysis shows that the dynamic range of a sensor populated by such binary pixels can be made arbitrarily large with a logarithmic response to light intensity, limited only by the amount of oversampling. Unfortunately, the signal-to-noise ratio (SNR) drops off rapidly for sampling thresholds above single-photon sensitivity—a difficult threshold to implement within a practical image sensor.

Figure 24:
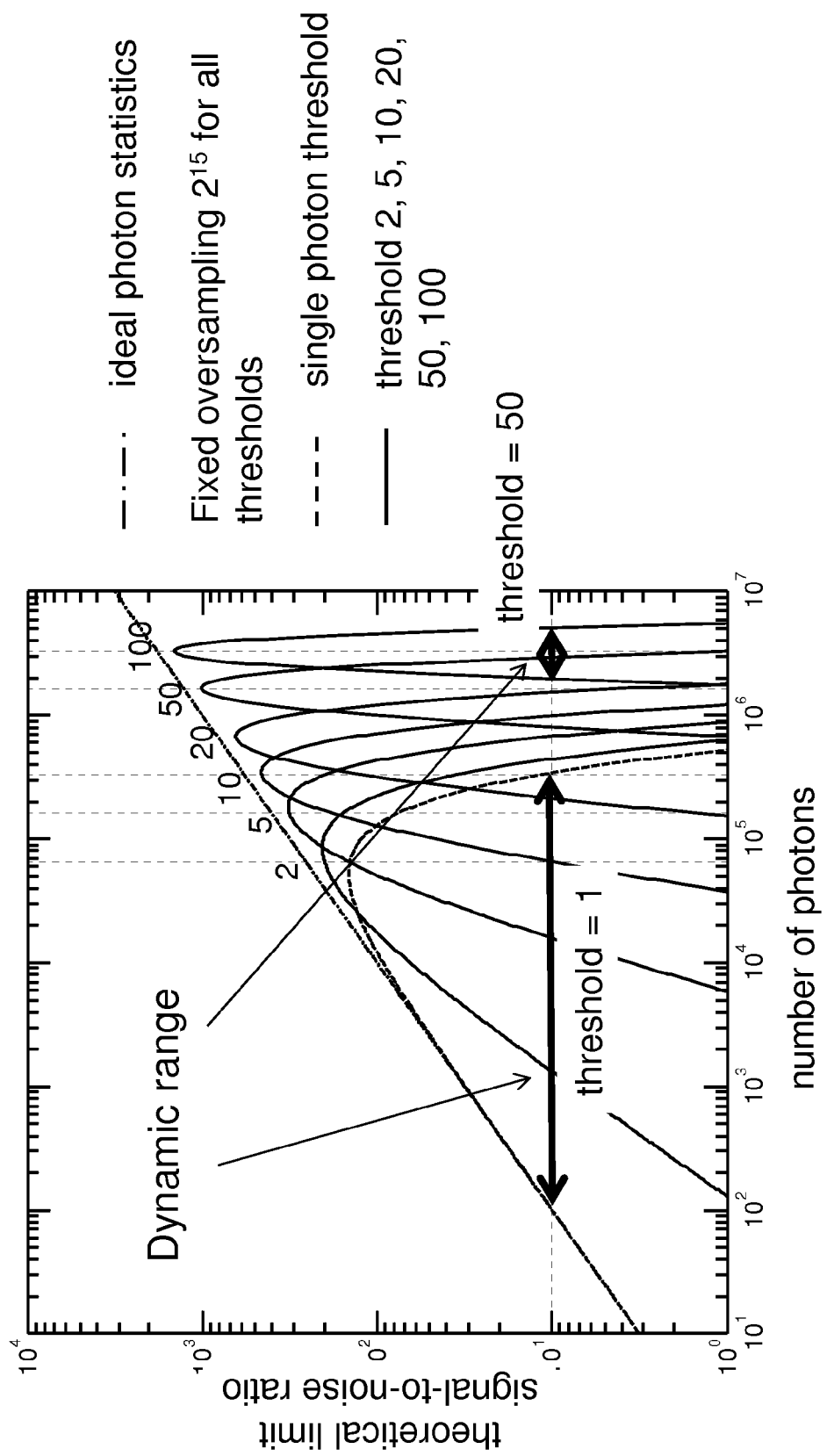
FIG. 24 is an exemplary log-log plot of signal-to-noise verses photon flux showing theoretical dynamic ranges for different binary thresholds.

Calculating the SNR as defined by the Cramer-Rao lower bound (CRLB) for different sampling thresholds other than single-photon shows that the limitation is not that the SNR is generally too low at all photon fluxes, but that the useable dynamic range of photon fluxes becomes narrower and narrower and the lower end of the useable dynamic range becomes unacceptably high with increasing threshold. This loss of dynamic range and low-light sensitivity is illustrated in FIG. 24 where the solid curves show the theoretically optimum SNR for sampling thresholds of 2, 5, 10, 20, 50 and 100 photons respectively and the dashed curve shows the single-photon threshold (the linear ceiling corresponds to ideal photon statistics). The curves for all sampling thresholds are calculated for an oversampling of $2^{15}$ in the example shown.

Figure 25:
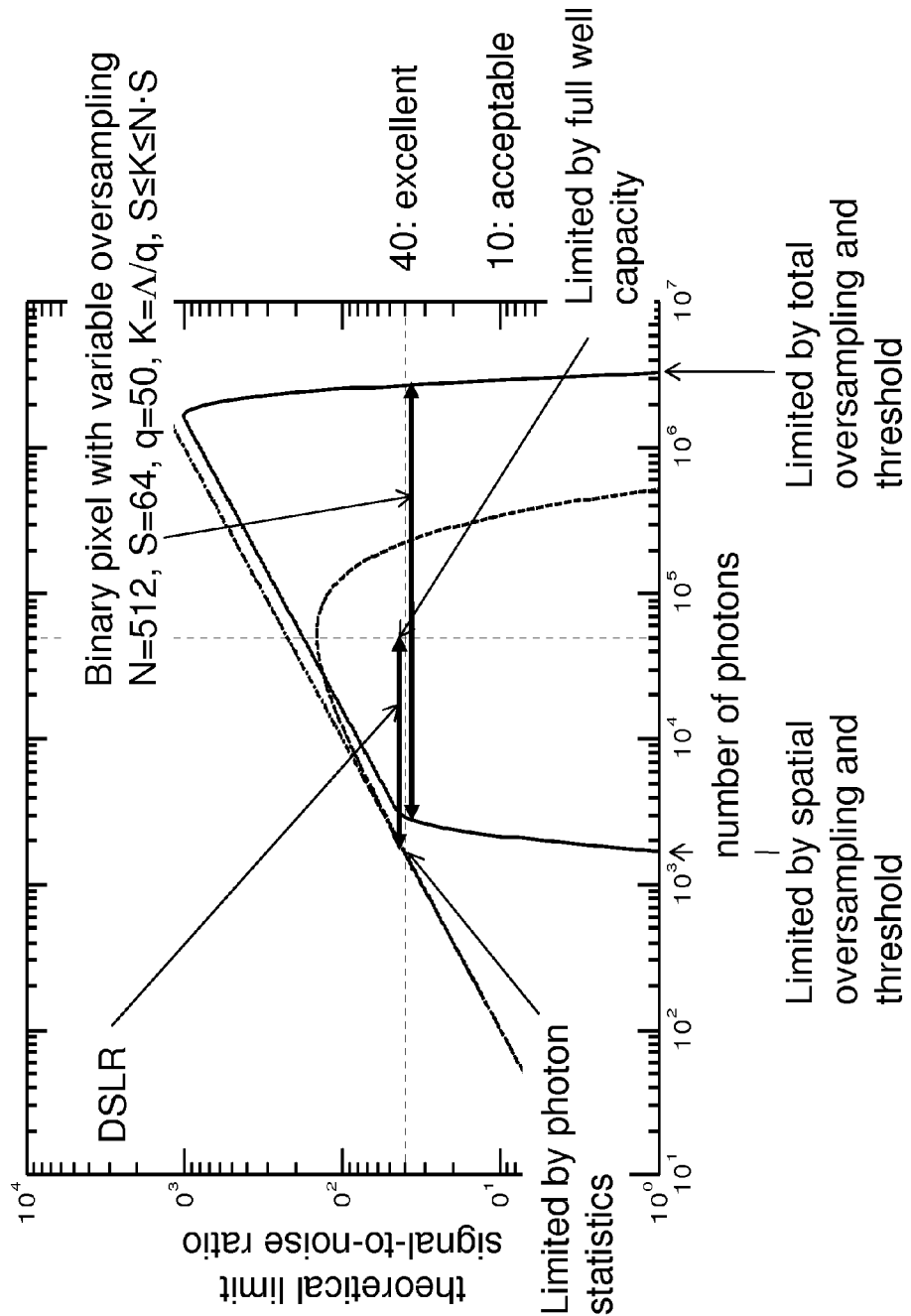
FIG. 25 is an exemplary log-log plot of signal-to-noise verses photon flux showing theoretical dynamic range achieved by dynamically varying the temporal oversampling factor.

It is recognized herein that according to FIG. 24, if each binary pixel could always be sampled at the optimum temporal sample rate for any given combination of light intensity and sampling threshold (e.g., such that at each sample time there was a 50% chance the pixel registers a '1'), an excellent SNR could be achieved, even for high threshold values. The result of such an approach is shown in FIG. 25 where the total oversampling, K, is set to A/q as long as the condition S≤Λ/q≤N*S is fulfilled, where 'Λ' is the number of photons impacting an ASP over the total image frame exposure interval), 'q' is the sampling threshold of a binary pixel expressed as a number of photons, 'N' is the number of temporal samples and thus the temporal oversampling factor and 'S' is the number of pixels per ASP and thus the spatial oversampling factor. For very low light intensities no temporal oversampling is used ($K_{low}$=S), while for very high light intensities the maximum possible oversampling is applied ($K_{high}$=N*S). As shown, the result is a high SNR and a large dynamic range. As discussed below, a technique referred to herein as variable temporal oversampling is employed to build an image sensor that approaches the maximum SNR as defined by this CRLB. Since the lower limit is defined by the spatial oversampling, the dynamic range will be larger for a given total oversampling if there is more temporal and less spatial oversampling.

Variable Temporal Oversampling

The above discussions of binary pixel image sensors have assumed that a precharged binary pixel is discharged in response to photon strikes over a exposure interval defined as the image frame exposure time divided by the temporal oversampling factor. The resulting charge level is then compared to the sampling threshold and the binary pixel is reset (i.e., precharged). This means that all photons which reach a binary pixel but do not add up to a number above the threshold are lost, the intuitive reason for the narrow dynamic range of higher thresholds in FIG. 24. In alternative embodiments, loss of these photons is avoided by sampling all binary pixels at a high temporal sampling rate, but resetting each binary pixel only when the threshold has been surpassed. Applying this approach, the number of exposure intervals over which a given photon count is accumulated is dependent on the photon flux itself, effectively lowering or raising the oversampling of each binary pixel according to the light intensity it perceives and thus effecting a variable temporal oversampling. At very high light intensities there will be enough photons to trigger pixel reset nearly every sampling interval, so the response will approximate that of the sensor with pixel reset after every sampling interval (i.e., maximum oversampling). Conversely, at low light intensities, pixel reset will occur less frequently (i.e., only after multiple sampling intervals have transpired) thus effecting reduced oversampling.

Figure 26:
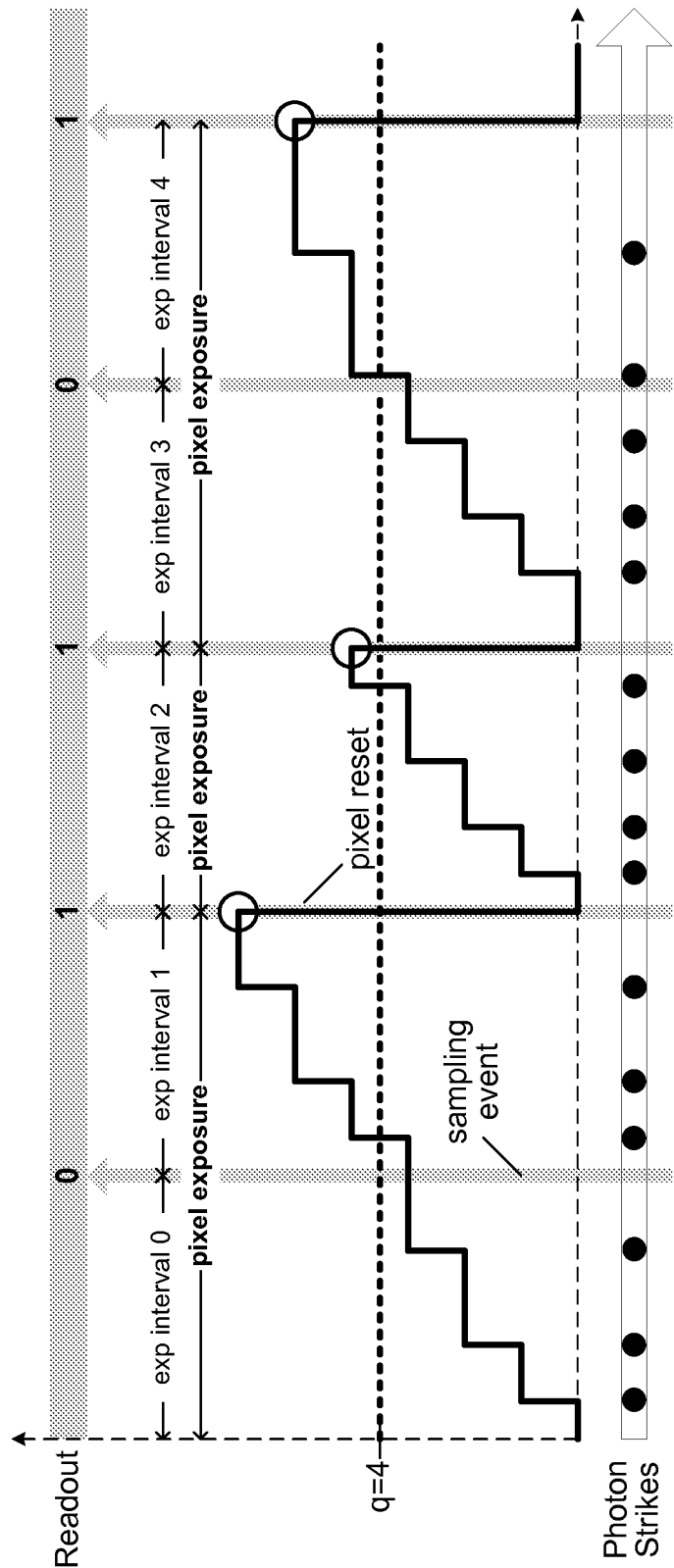
FIG. 26 illustrates an example of variable temporal oversampling of a binary pixel having a sampling threshold corresponding to four photons.

FIG. 26 illustrates an example of variable temporal oversampling of a binary pixel having a sampling threshold ('q') corresponding to four photons. Photons strike the binary pixel randomly over the five exposure intervals shown (e.g., established by a sampling clock signal) triggering corresponding pixel voltage transitions, shown as positive steps in the pixel state for purposes of example. Because the binary pixel is reset only in response to sampling events that yield cumulative photon strikes above the threshold, photon strikes are effectively counted over a varying number of exposure intervals, thus yielding a varying time between binary pixel reset events. For example, the binary pixel voltage corresponding to the first three photon strikes does not exceed the four-photon count threshold, so that no pixel reset occurs during the sampling event that concludes exposure interval 0 ("exp interval 0"). Instead, those three photon strikes remain reflected in the binary pixel voltage at the start of exposure interval 1, in effect, carrying the pixel count over from exposure interval 0 to exposure interval 1 and thereby extending the effective exposure interval of the binary pixel over a combination of the two clocked exposure intervals shown. Thus, the three additional photon strikes during exposure interval 1 combine with the three strikes from exposure interval 0 to produce a logic '1' readout and a pixel reset at the end of exposure interval 1. Photon strikes occur more frequently during exposure interval 2, exceeding the threshold and thus triggering a reset (and a logic '1' readout) at the conclusion of that interval. The photon flux slows in exposure interval 3 so that no pixel reset occurs at the conclusion of that interval and the photon count instead is carried over to exposure interval 4, yielding a logic '1' readout and pixel reset at the conclusion of that interval. Reflecting on the operation shown, it can be seen that the effective exposure interval varies in duration according to the photon flux, extending from a minimum time corresponding to a single clocked exposure interval to a maximum time corresponding to the total number of clocked exposure intervals per image frame period (i.e., T clocked exposure intervals). Because the number of binary pixel exposure intervals determines the degree of temporal oversampling within a given image frame period, the variable effective exposure interval yields a correspondingly variable temporal oversampling. Viewed in the context of FIG. 24, the effective threshold at which the binary pixel yields a logic '1' sample varies according to the photon flux, tracking the photon flux to establish a threshold within a corresponding one of the threshold curves shown and thus a net SNR profile as shown in FIG. 25; limited at a lower photon flux by the spatial oversampling factor and minimum practicable sampling threshold, and at an upper photon flux by the total oversampling factor (i.e., the variable temporal oversampling and the spatial oversampling) and the sampling threshold. A Monte Carlo simulation applying modest oversampling (i.e., $2^9$ temporal oversampling and $2^6$ spatial oversampling) and a sampling threshold corresponding to 50 photons yields a good to excellent SNR—at least above 10:1 and over predominantly over 40:1—over a photon flux range that approximately matches the theoretical dynamic range shown in FIG. 25.

Figure 27:
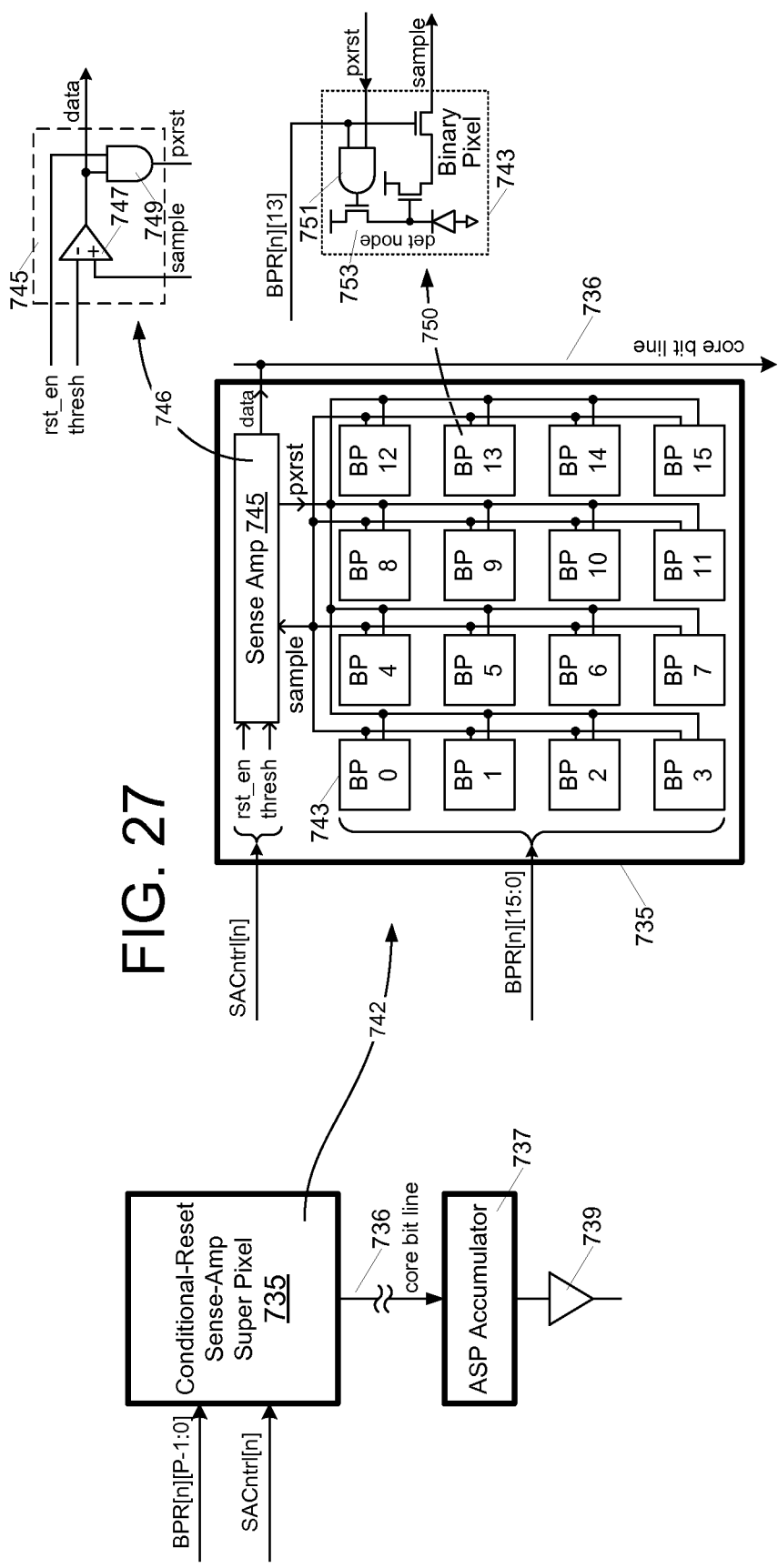
FIG. 27 illustrates an embodiment of a sense-amp super pixel having conditional (over-threshold) pixel reset logic that enables the variable temporal oversampling described in reference to FIG. 26.

FIG. 27 illustrates an embodiment of a sense-amp super pixel 735 having conditional (over-threshold) pixel reset logic that enables the variable temporal oversampling described above. The conditional-reset SSP 735 may be deployed within any of the binary pixel image sensors described above and thus receives binary pixel row signals (BPR[n][P−1:0]) and sense amp control signals (SACntrl[n]) corresponding to an 'nth" SSP row within the image sensor and, when enabled, outputs pixel data onto a core bit line 736 to be counted within an ASP accumulator 737 and output via I/O circuit 739. In the exemplary embodiment shown in detail view 742, conditional-reset SSP 735 includes an embedded sense amplifier 745 coupled to sixteen binary pixels through one or more local bit lines (shown as a "sample" line) and one or more pixel reset lines ("pxrst"). Though shown at the margin of SSP 735, sense amplifier 745 may alternatively be distributed among binary pixels 743 (e.g., consuming pixel cells as discussed above). As in all embodiments, more or fewer binary pixels 743 may be present than those shown.

The sense amp control signals (SACntrl) provided to embedded sense amplifier 745 include, in addition to other signals discussed below, a digital or analog threshold signal ("thresh") and a reset-enable signal ("rst_en"). The threshold and reset-enable signals are applied within the sense amplifier as shown conceptually at 746. That is, comparator circuitry 747 compares the threshold with a binary pixel value driven onto the sample line (i.e., by a binary pixel selected by assertion of a corresponding BPR signal) to produce a pixel data signal ("data") which, in turn, is ANDed with the reset-enable signal in logic 749 to drive the pixel reset line. By this operation, a reset signal is asserted on the pixel reset line to reset the selected binary pixel only if that binary pixel has received sufficient light to yield an over-threshold binary pixel value. Because the conditional pixel reset events are synchronized by the timing of the reset-enable signal (itself asserted, for example, at regular intervals within a sequence of pixel cycles), the effective exposure interval for a given binary pixel is established at a predetermined number of clocked exposure intervals as shown in FIG. 26.

Still referring to FIG. 27 and more specifically to detail view 750 of a binary pixel 743, the pixel reset line is coupled to pixel reset logic 751 where it is logically ANDed with a pixel-specific control signal (e.g., the binary pixel row signal for the subject pixel, though a different control signal may alternatively be used) to selectively switch on reset transistor 753 and thereby couple the detection node of the pixel to a precharge voltage source. Accordingly, when the pixel reset signal is asserted by the sense amplifier (i.e., in response to a binary pixel value that exceeds the sampling threshold), and the pixel-specific control signal is also asserted, the binary pixel is reset. Through this operation, each of the binary pixels within conditional-reset SSP 735 may be reset at different times and thus accumulate light without reset over disparate numbers of clocked exposure intervals in accordance with their respective photon absorptions.

FIGS. 28A-28C illustrate embodiments of conditional-reset sense amplifiers and corresponding binary pixels that may be employed to achieve variable temporal oversampling within a binary pixel image sensor. FIG. 28A illustrates a current-mode sense amplifier 770 that operates generally as described in reference to FIG. 17 (with the local bit lines re-labeled as "sample" and "crsc") to yield an output data value according to whether the charge level on the detection node of an attached binary pixel 785 (i.e., the "binary pixel value") is above or below a sampling threshold. In a departure from the embodiment of FIG. 17, sense amplifier 770 additionally includes conditional-reset circuitry to assert an active-low pixel-reset signal if the binary pixel value exceeds (i.e., detection node voltage is lower than) the sampling threshold, thus enabling a conditional reset operation within the attached pixel. More specifically, the data output of the sense amplifier and a reset-enable signal (rst_en) are supplied to a logic NAND circuit formed by transistors 778, 779, 780 and 781, switching on transistors 778 and 779 and switching off transistors 780 and 781 to pull the pixel reset line low if the sense amp data output (generated by inverter transistors 776 and 777) and reset-enable signals are both high. Conversely, the NAND circuit pulls the pixel reset line high (to a deasserted state) via transistor 781 or 780 (and switching off at least one of transistors 778 and 779) if either of the data output or the reset-enable signal are low.

Within binary pixel 785, the active-low state of the pixel reset line switches on logic AND transistor 791, thereby passing the state of the binary pixel row signal to the gate of reset transistor 787. Accordingly, reset transistor 787 is switched on to reset (i.e., precharge) the binary pixel when the pixel-reset line is pulled low and the binary pixel row signal is asserted. Altogether, when the binary pixel row signal is raised to enable the binary pixel value to be sampled (i.e., enabling the charge level of the detection node onto the sample line) and the binary pixel value exceeds the sampling threshold such that a logic '1' is generated at the sense amp data output, then a concurrent assertion of the reset-enable signal will, in conjunction with the over-threshold binary pixel value, pull the pixel-reset line low to effect a pixel reset operation within the binary pixel selected by the asserted binary pixel row signal. When the pixel reset signal is high, pull-down transistor 790 is switched on within binary pixel 785 to ground the gate of reset transistor 787 and thus prevent reset regardless of the state of the binary pixel row signal.

As noted above, the reset-enable signal and threshold value constitute a subset of the sense-amp control signals provided to the sense amplifier within a given sense-amp super pixel. In the embodiment of FIG. 28A, the sense-amp control signals additionally include a clamp signal that is asserted between pixel sampling events to switch on transistor 775, coupling the output node of the differential amplifier (i.e., drain of transistor 771) to ground and thus avoid a floating input to the inverter formed by transistors 776 and 777 (preventing, among other things, a metastable output on the data line). The bias signal is applied to the gate of current-sinking transistor 772 to effect a desired amplification level within the sense amplifier. In one embodiment, the bias signal is an analog voltage generated, for example, by a current mirror or other bias-control circuit to establish (in conjunction with current-mirror coupled load transistors 773, 774) a desired bias current within the differential amplifier. In an alternative embodiment, the bias signal is a multi-bit digital signal that is applied to a bank of parallel transistors (represented symbolically by transistor 772) so that, as the number of logic '1' bits within the bias signal is increased or decreased, a corresponding number of transistors within the parallel bank are switched on to establish a corresponding bias current. In either implementation, calibration operations may be performed at system startup and/or occasionally thereafter to establish/maintain an appropriate bias signal setting.

FIG. 28B illustrates alternative embodiments of a conditional-pixel-reset sense amplifier 795 and conditionally-resettable binary pixel 805. Sense amplifier 795 works similarly to the sense amplifier of FIG. 28A, except that transistors 796, 797, 798 and 799 are provided to logically AND an active-low reset-enable signal (/rst_en) and the complement data signal output from the differential amplifier pair (i.e., from the drain of transistor 771). That is, when the reset-enable signal is lowered, transistor 799 is switched on to power the inverter formed by transistors 796 and 798. Consequently, when the complement data signal is low (i.e., the binary pixel output exceeds the sampling threshold), the inverter output goes high (i.e., transistor 798 is switched on, while transistors 796 and 797 are switched off), thereby driving the pixel reset line high to effect a pixel reset.

In contrast to the embodiment of FIG. 28A, the pixel reset logic within binary pixel 805 is formed by only two transistors (not three), but is controlled by a pixel-row reset signal (BPR_reset) that is distinct from the binary pixel row signal used to enable the detection node voltage to be sensed (i.e., "BBR_sense" in the embodiment shown). More specifically, the AND transistor 791 and pull-down transistor 790 shown in FIG. 28A are omitted in favor of an additional reset transistor 806 coupled between sense-amp-controlled reset transistor 807 (which corresponds to transistor 787 in the embodiment of FIG. 28A) and the detection node. The two reset transistors 806, 807 are coupled to the pixel-row reset input (BPR_reset) and the pixel reset line (pxrst), respectively, so that, when both inputs are high, the detection node of the binary pixel is switchably coupled to a precharge voltage source (e.g., VDD) to reset the binary pixel.

Still referring to FIG. 28B, in an alternative embodiment a single binary pixel row signal may be supplied to the gates of access transistor 130 and reset transistor 806, provided that any charge trapped in the source-to-drain coupling between the two reset transistors 806 and 807 (i.e., trapped by virtue of pixel reset signal assertion in connection with other binary pixels of the SSP) does not intolerably disturb the pixel sampling result.

FIG. 28C illustrates further alternative embodiments of a conditional-pixel-reset sense amplifier 815 and conditionally-resettable binary pixel 820. In this case, the sense amplifier works as a voltage mode amplifier instead of a current mode amplifier by virtue of local amplifying transistor 816. Because the differential amplifier sensing current passes through amplifying transistor 816 instead of transistor 132 within binary pixel 820, transistor 132 may be tied high as shown and thus operated as a follower amplifier (providing an output to the gate of amplifying transistor 816 via access transistor 130) that follows the state of the detection node. While a follower amplifier is shown, in all such in-pixel amplifying arrangements, the gain of the amplifying transistor or amplifying circuit may be greater than, less than or equal to one. Also, while the conditional pixel reset circuitry within the binary pixel and sense amplifier corresponds to that shown in FIG. 28A, the approaches described in reference to FIG. 28B can be employed in alternative embodiments.

Figure 28D:
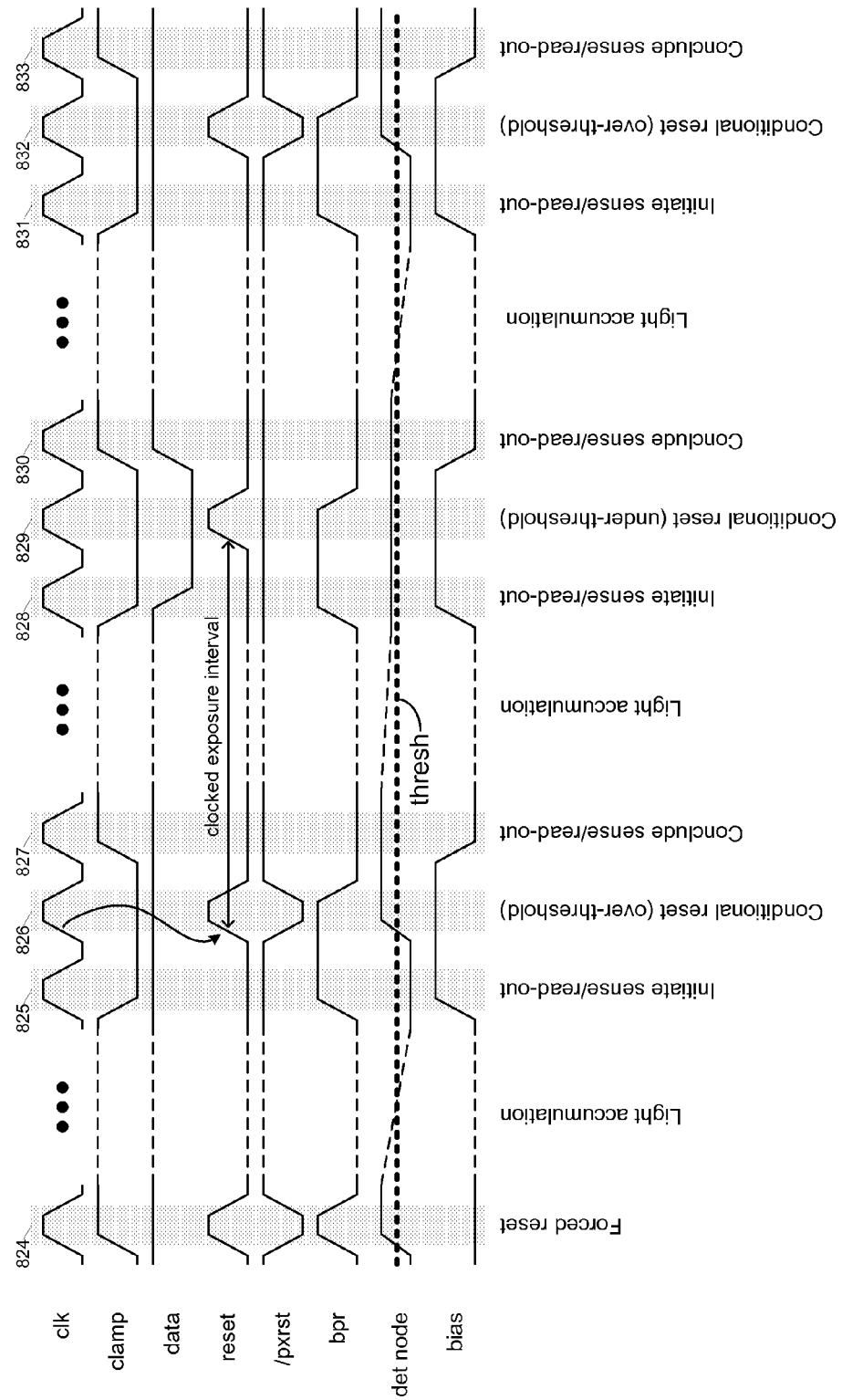
FIG. 28D is a timing diagram illustrating an exemplary operation of a sense-amp super pixel that includes the conditional-reset sense amplifier and binary pixel of FIG. 28A.

FIG. 28D is a timing diagram illustrating an exemplary operation of an SSP that includes the conditional-reset sense amplifier and binary pixel of FIG. 28A. Operations within the SSP are executed synchronously with respect to a clock signal (clk) and are shown as a sequence of shaded events (824-833) in respective clock cycles. Initially, at 824, a forced reset is executed with respect to the binary pixel by asserting (raising) the clamp, reset and binary pixel row signals while deasserting the bias signal, thus forcing a low output from the differential amplifier to emulate an over-threshold condition and trigger a pixel reset. That is, referring briefly to FIG. 28A, the high data output of inverter 776/777 is NANDed with the reset-enable signal to drive the pixel-reset line low, which, in combination with the asserted binary pixel row (bpr) signal, produces a high signal at the gate of the reset transistor 787 to reset the binary pixel (charge or pre-charge the detection node).

Following the pixel reset at 824, the binary pixel is exposed over a light accumulation interval. Note that the light accumulation interval may span many clock cycles as explained above and thus the detection node voltage is shown as having a steady declining slope—in actuality, the detection node voltage will decrease stepwise in response to non-uniformly spaced photon strikes. At 825, the clamp signal is lowered while the bias and binary pixel row signals are raised, thereby initiating a pixel sense/read-out operation. Because the detection node voltage has dropped to a level below the threshold voltage (shown as a steady-state signal level superimposed over the detection node voltage), the differential amplifier generates a logic low output that is inverted to form a logic '1' binary pixel sample. In the embodiment shown, the binary pixel sample is output ("data") onto a core bit line (i.e., to be counted by an on-chip or off-chip ASP accumulator) over a pair of clock cycles before the bias and binary pixel row signals are lowered (and the clamp signal raised) to conclude the sense/read-out operation at 827. In the second clock cycle of the read-out interval, after the binary pixel sample value has stabilized at the sense amp data output, a conditional reset operation is executed as shown at 826. More specifically, the reset signal is raised in response to the rising clock edge as shown, thus causing the NAND gate formed by transistors 778, 779, 780, 781 in FIG. 28A to assert or deassert an active-low pixel reset signal (driving the pixel reset line low or high, respectively) according to whether an over-threshold condition was detected with respect to the subject binary pixel. Accordingly, the logic '1' (over-threshold) binary pixel sample in the example shown triggers assertion of the active-low pixel reset signal, which, in combination with the continued assertion of the binary pixel row signal, effects a pixel reset.

The sense/read-out and conditional-reset operations are repeated at 828, 829 and 830 following a second light accumulation interval, but a lesser light accumulation yields an under-threshold detection node voltage (i.e., a detection node voltage that does not exceed—that is, go lower than—the threshold level). Consequently, the resulting logic '0' binary pixel sample yields a logic high (unasserted) pixel reset signal and thus no pixel reset occurs. Accordingly, at the conclusion of the sense/read-out at interval 830, the binary pixel is again allowed to accumulate light over an exposure interval, with the partially discharged detection node voltage produced in the preceding exposure interval being carried forward as the initial condition for the subsequent exposure interval. Consequently, even though the lower photon flux (i.e., lower than in the exposure preceding the sense operation at 825) continues, the non-reset during conditional reset interval 829 effectively joins the two clocked exposure intervals (i.e., the exposure interval between 827 and 828, and the exposure interval between 830 and 831) into a single effective exposure interval such that the detection node voltage at the subsequent sense/read-out interval 831 reflects the total number of photon strikes during those two clocked exposure intervals. In the example shown, the photon count over the last two clocked exposure intervals is sufficient to exceed the threshold and thus yields a logic '1' data output that contributes to the net ASP value and produces the pixel reset shown at 832. Though a photon accumulation without reset over two exposure intervals is shown, lower levels of photon flux may result in continuous photon accumulation over any number of clocked exposure intervals between one and the total image frame interval (or other maximum) before a forced reset is executed.

Figure 29:
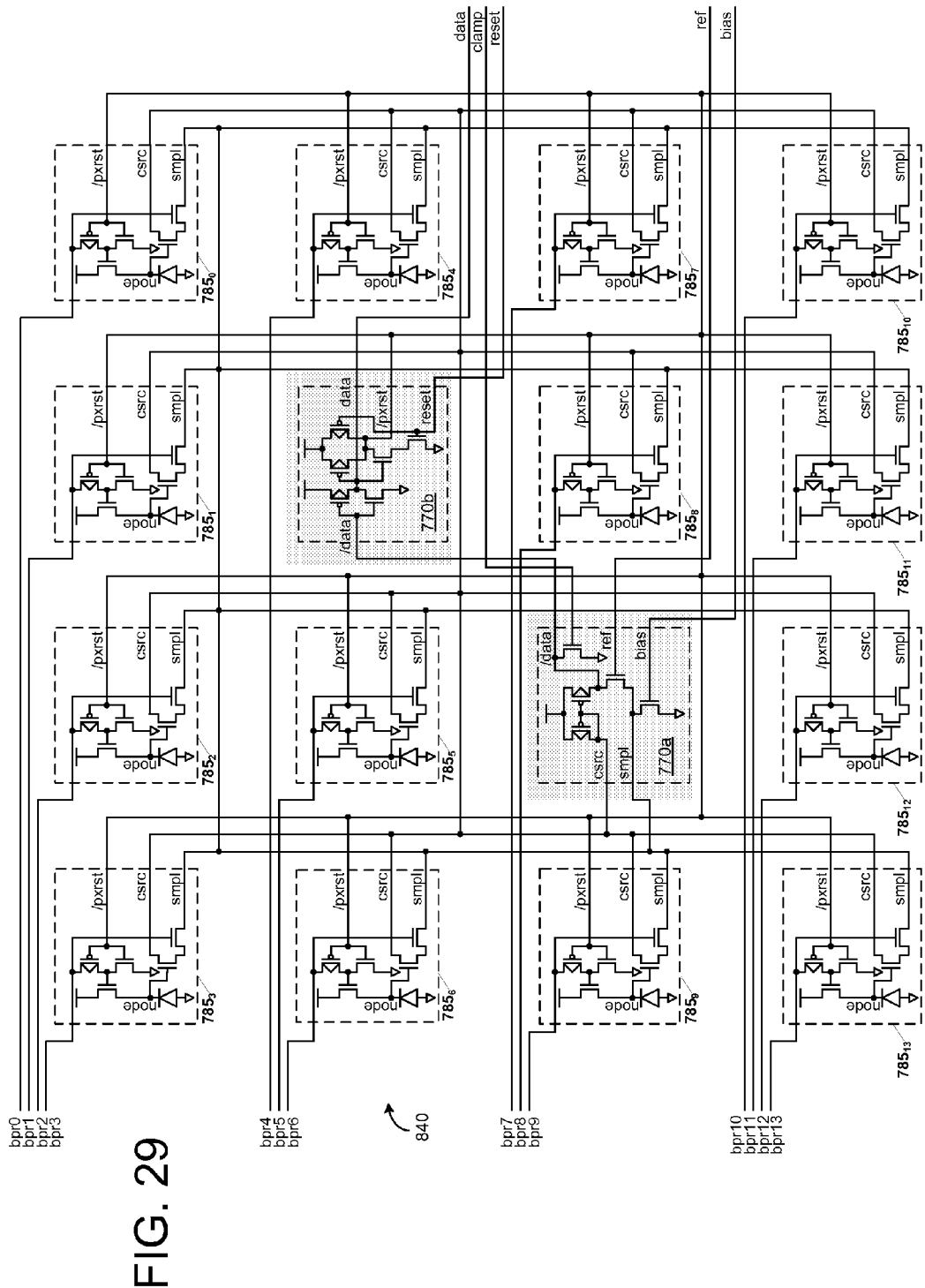
FIG. 29 illustrates an embodiment of a sense-amp super pixel having conditionally-resettable binary pixels and a conditional-reset sense amplifier, each implemented in accordance with the embodiment described in reference to FIG. 28A.

FIG. 29 illustrates an embodiment of an SSP 840 having conditionally-resettable binary pixels 785$_0$-785$_{13}$ and a conditional-reset sense amplifier 770a/770b, each implemented in accordance with the embodiment described in reference to FIG. 28A. As shown, the component transistors of the conditional-reset sense amplifier are distributed within the area of two pixel cells (i.e., 770a and 770b), while fourteen conditionally-resettable binary pixels 785$_0$-785$_{13}$ make up the remainder of the SSP. In an alternative embodiment, the conditional-reset sense amplifier may be distributed within the SSP differently than shown (and, as discussed above, consolidated at the margin or elsewhere within the SSP) and more or fewer binary pixels may be coupled to the sense amplifier. Also, a voltage-mode sense amplifier may be provided instead of the current-mode sense amplifier shown, thus obviating the current source line ("crsc") and the connection of that line to each of the binary pixels. Further, the conditional pixel reset circuitry described in reference to FIG. 28B may be employed within each of the binary pixels instead of that shown.

Non-Uniform Sampling Thresholds

Mathematical analysis and simulation results indicate the potential for undesired monotonicity in the response curve of a variable temporal oversampling image sensor at low luminances due to the quantized nature of the temporal oversampling. In a number of embodiments, those errors and resulting output anomalies are mitigated or avoided altogether by effecting non-uniform sampling thresholds within the sensor. In a first set of non-uniform threshold embodiments, for example, different reference voltages are applied to respective binary pixels that contribute to a single image pixel to effect a spatial distribution of non-uniform thresholds. That is, each of the pixels is sampled with respect to a given reference voltage (threshold voltage) and thus yields a single-bit digital sample, but the reference voltage applied in at least one of the binary pixels differs substantially from the reference voltage applied in at least one other of the binary pixels during a given exposure interval, so that a range of reference voltages is applied to respective binary pixels. In another set of non-uniform threshold embodiments, binary pixels of varying sizes (i.e., exhibiting non-uniform light accumulation areas) are provided within each image pixel field to effect a spatial-distribution of non-uniform thresholds with a single reference voltage, thus avoiding the complexities and potential errors involved with generating multiple reference voltages. In yet another set of non-uniform threshold embodiments, different reference voltages are applied sequentially to the binary pixels of the image sensor in respective portions of the image frame period to effect a temporal rather than a spatial distribution of thresholds, thereby achieving the benefits of multiple reference voltages without the added wiring and in-situ reference selection circuitry required for spatial distribution of the reference voltages. Instead of or in conjunction with any of the non-uniform threshold embodiments, non-uniform thresholds can also be effected by varying the reset voltage applied to one or more of the binary pixels, either spatially or temporally. By intentionally "under-precharging" a binary pixel to a voltage that is closer to the comparison reference, the threshold is effectively lowered because fewer photon strikes are required to discharge the pixel to a voltage below the reference voltage.

FIG. 30A illustrates an embodiment of a conditional-reset SSP 845 that applies multiple reference voltages to respective subsets of binary pixels to effect spatially-distributed, non-uniform thresholds. In general, multiple sampling thresholds between $q_{min}$ (≥single-photon charge dissipation) and $q_{max}$ are determined by expected incident luminances, spatial and temporal oversampling factors and physical constraints on VLSI design and manufacture and applied to respective groups of binary pixels 847 within the SSP and thus within an image sensor as a whole. In a number of embodiments, the threshold distribution is determined so as to optimize a luminance fidelity metric, (e.g., minimize the signal to noise weighted by the expected probability of finding a given luminance level). In at least one such determination, for instance, all other parameters being equal, the distribution is dominated by low-threshold values in low-luminance conditions and by high-threshold values in high-luminance conditions. Once the number of binary pixels associated with each threshold value, 'q', has been determined, the spatial arrangement of all the binary pixels may be determined so as reduce spatial artifacts in the final rendered image, in particular to reduce aliasing artifacts. In one embodiment, for example, the spatial distribution of different-threshold binary pixels is chosen so as to minimize the peak of the two-dimensional Fourier transform of the image pixel sensitivity.

Still referring to FIG. 30A, SSP 845 operates generally as explained above in reference to FIG. 27, receiving a set of binary pixel row signals (BPR[n][15:0] in this example) and sense-amp control signals (SACntrl[n]), and executing conditional reset operations to effect variable temporal oversampling. Instead of receiving a single reference (threshold) voltage, however, the embedded sense amplifier 849 receives multiple reference voltages, depicted in detail view 850 as q0, q1, q2, q3 (or q[3:0]), and a select signal ("sel") that indicates which of the reference voltages is to be applied to establish the threshold for a given binary pixel sense/read-out operation. In the embodiment shown, sixteen binary pixels 847 are split into four threshold-groups with each of the four threshold groups being sensed in comparison to a respective one of the four thresholds, q0, q1, q2 or q3, as indicated within the label of the binary pixel. Further, the binary pixels 847 that constitute each of the four groups are spatially dispersed (or scattered) within the SSP such that each of the thresholds is applied to an expansive rather than a concentrated region within the SSP. In FIG. 30, for example, the footprint of each subgroup extends to upper, lower, right and left edges of the binary pixel area; a region that can be envisioned, for example, by a box outline that includes each of the shaded binary pixels to which threshold q0 is applied.

In one embodiment, illustrated by the exemplary SSP read-out sequence in FIG. 30B, the binary pixel pixels of SSP 845 are read-out in a sub-group order that yields a stepwise increase in the applied threshold. That is, the binary pixels of sub-group 0 (BP0-BP3) are read out in the first set of four pixel sense/read-out operations, while the threshold select value is set to select reference voltage q0 as the applied threshold ("applied thresh"), a selection effected by selector element 855 as shown within detail view 850 of sense amplifier 849. After the sense/read-out of the binary pixels of sub-group 0 (each of which includes a comparison with the selected q0 threshold in comparator circuitry 851 to yield a data value that is ANDed with a reset-enable signal in logic 853 to yield a conditional pixel reset signal) is completed, the binary pixels of sub-group 1 (i.e., BP4-BP7) are read out while reference voltage q1 is selected as the applied threshold, then the binary pixels of sub-group 2, and finally the binary pixels of sub-group 3. In alternative embodiments, the sub-groups may be sensed and read-out in an order reverse of that shown (i.e., ramping the applied threshold down from q3 to q0) or in a scattered order in which the threshold select signal transitions as frequently as the binary pixel row signal. As the application of a given threshold in a binary pixel sense/read-out operation defines the subject binary pixel as being part of the threshold subgroup, the various different subgroup read-out sequences may be used to establish a desired distribution of binary pixel sub-groups within the SSP; distributions that may be programmably determined (e.g., by one or more fields within a threshold policy register) and thus changed in accordance with application requirements or dynamically according to ambient or other conditions.

FIG. 31 illustrates an embodiment of a multi-thresholding, conditional-reset sense amplifier 865 that may be employed within the SSP of FIG. 30A. In general, sense amplifier 865 operates as discussed in reference to FIG. 28C except that input transistor 771 of that sense amplifier is replaced (or supplemented) by multi-threshold circuitry 867 ("mt"). In one implementation, shown for example in detail view 870, multi-threshold circuitry 867 includes an input transistor 871 corresponding to transistor 771 of FIG. 28C together with a multiplexer (formed by pass gates 873$_0$-873$_3$) that applies one of the four incoming reference voltages (q[3:0] in this example) to the gate of input transistor 871 in accordance with the state of the threshold select signal, "sel." In alternative embodiments, single-transistor pass-gates (or other switching elements) may be used instead of the two-transistor pass gates shown, and more or fewer reference voltages may be provided.

Still referring to FIG. 31, an alternative embodiment of the multi-threshold reference circuitry includes parallel reference paths as shown in detail view 880. Each of the reference paths includes an input transistor (881*a*, 882*a*, 883*a* or 884*a*) coupled to receive a respective one of reference voltages q[0]-q[3] (again, there may be more or fewer reference voltages than the four shown), and an enable transistor (881*b*, 882*b*, 883*b* or 884*b*) coupled to receive a respective bit of the threshold select signal. By this arrangement, the threshold select signal may be output in one of four one-hot states (i.e., one bit set, the others cleared) to couple the input transistor of a selected one of the reference paths between transistors 774 and 772 of sense amplifier 865, thereby establishing the corresponding reference voltage as the applied threshold. Again, there may be more or fewer reference voltages (and corresponding reference paths) than the four shown. Also, an additional enable transistor may be disposed in series between transistors 773 and 772 of the sense amplifier and/or other loading element coupled to the drain terminal of bias transistor 772 for load matching purposes.

Figure 32A:
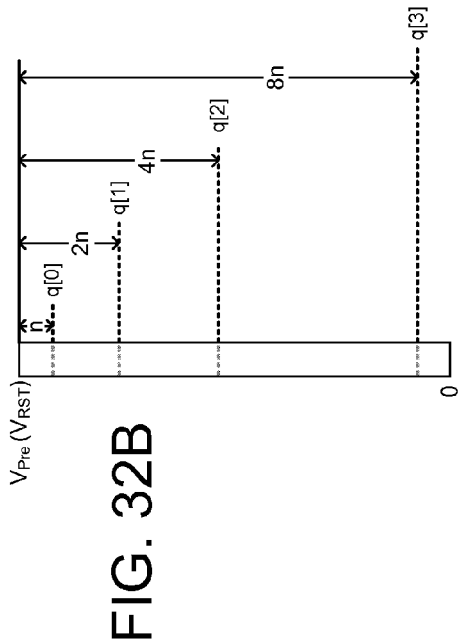
FIG. 32A illustrates an embodiment of a reference generator that may be used to generate the reference voltages supplied to the multi-threshold SSP of FIG. 30A and applied within the sense amplifier of FIG. 31.

FIG. 32A illustrates an embodiment of a reference generator 890 that may be used to generate the reference voltages supplied to the multi-threshold SSP of FIG. 30A and applied within the sense amplifier of FIG. 31. As shown, reference generator 890 includes a base register 891 to store a programmed or predetermined base reference value, "q-base," and a set of canonically coupled multipliers 893, 895, 897. The output of base register 891 and each multiplier 893, 895, 897 is supplied to a respective digital-to-analog converter (892, 894, 896, 898), thereby yielding a set of reference voltages having an amplitude $q[i]=q\text{-base}^{i*M}$, where i is the index of the reference voltage and M is the factor applied within each multiplier 893, 895, 897. In one embodiment, for example, M=2 so that each reference voltage is twice that of the nearest reference (and so that each multiplier may be implemented by a small-footprint shift arrangement that prepends a '0' bit in the least significant bit position of the incoming reference value to generate an output reference value). Other multiplication factors may be applied by the multipliers 893, 895, 897 in alternative embodiments, including non-uniform multiplication factors (e.g., applying $M_1$, $M_2$ and $M_3$, where $M_1 \neq M_2$ and/or $M_2 \neq M_3$). More generally, any number of reference voltages may be generated with any practicable voltage distribution, including distributions that are determined adaptively or heuristically instead of according to predetermined formulae. In all such cases, the reference voltages may be supplied to an adjuster circuit 899 that calibrates and/or adapts the reference voltages according to their differences or other source of information indicating a deviation from desired thresholds. Also, base register 891 may be loaded with an updated value in a register programming operation, or incremented/decremented as part of a calibration loop or adaptive loop (e.g., receiving an increment/decrement signal from adjuster 899) to shift all the reference voltages up or down.

Figure 32B:
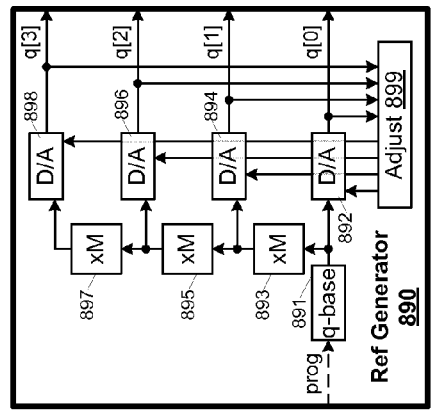
FIG. 32B illustrates an exemplary threshold profile that may be generated by the reference voltage generator of FIG. 32A or a variation thereof.
Figure 32C:
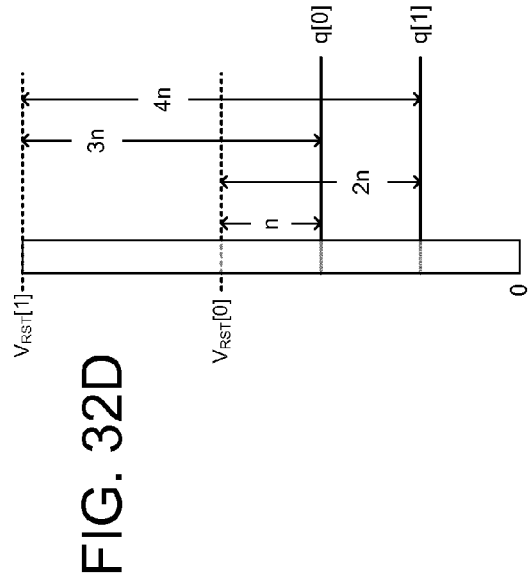
FIG. 32C illustrates an exemplary threshold profile that may be effected by applying reference voltages generated by the reference voltage generator of FIG. 32A (or a variation thereof) as pixel reset voltages.
Figure 32D:
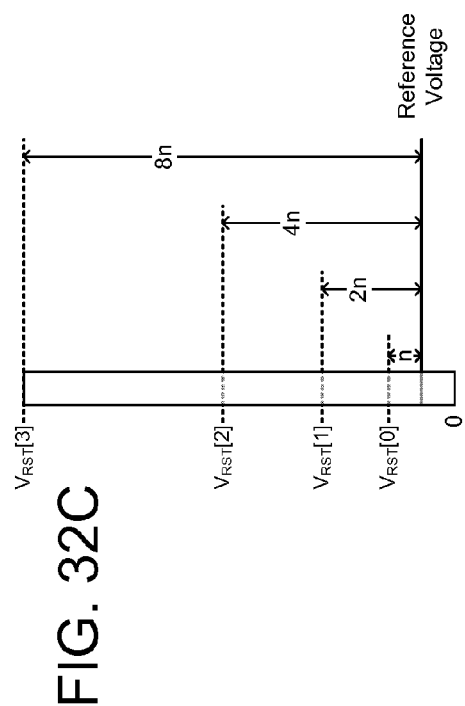
FIG. 32D illustrates an exemplary threshold profile effected by applying multiple pixel reset voltages in combination with multiple threshold voltages.

In one implementation, the digital-to-analog converters of FIG. 32A generate threshold voltages as respective offsets from a pixel reset (or precharge) voltage, thus yielding the threshold profile shown in FIG. 32B. In another embodiment, the reference voltages output from generator 890 are applied as pixel reset voltages instead of decision thresholds, thus enabling binary pixel sub-groups to be reset to respective voltages having different offsets from a threshold level. FIG. 32C illustrates an example of such an arrangement, with the outputs q[3:0] of the reference generator in FIG. 32A constituting binary pixel reset voltages $V_{RST}[3:0]$. As shown, the different reset voltages effect different binary pixel sampling thresholds without requiring multiple reference voltages to be delivered to the sense amplifier (i.e., the output of all binary pixels may be compared with a single reference voltage to yield a logic '1' or logic '0' binary pixel value). Though exponentially related threshold voltages and reset voltages are shown in FIGS. 32B and 32C, numerous other voltage step sizes (including adaptively or algorithmically determined step sizes as well as programmably controlled step sizes) may be applied in alternative embodiments. Also, the two approaches shown in FIGS. 32B and 32C (multi-thresholding through application of non-uniform threshold voltages and multi-thresholding through application of non-uniform pixel reset voltages) may be combined as shown in FIG. 32D. In the example shown, two different pixel reset voltages (VRST[1:0]) are applied in combination with two different reference voltages (q[1:0]) to achieve four distinct binary pixel thresholds. Though a linear threshold step (n, 2n, 3n, 4n) is shown in FIG. 32D, other threshold steps may be effected in alternative embodiments.

Figure 33:
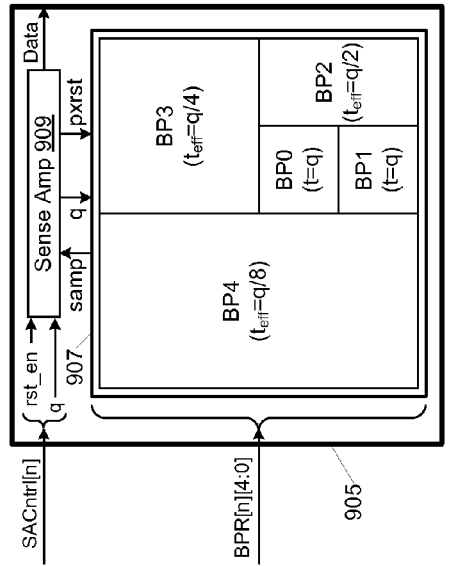
FIG. 33 illustrates an embodiment of a conditional-reset sense-amp super pixel having variably-sized binary pixels to effect a spatial-distribution of non-uniform thresholds without requiring multiple reference voltages.

FIG. 33 illustrates an embodiment of a conditional-reset SSP 905 having variably-sized (i.e., non-uniform) binary pixels 907 to effect a spatial-distribution of non-uniform thresholds without requiring multiple reference voltages. In the example shown, the SSP includes five binary pixels, including two "1×" binary pixels, BP0 and BP1, having sizes corresponding to singe binary pixel cells, a "2×" binary pixel (BP2) sized to occupy approximately twice the area of a 1× binary pixel, a 4× binary pixel (BP3) sized to occupy approximately four times the area of a 1× binary pixel and an 8× binary pixel (BP4) sized to occupy approximately eight times the area of a 1× binary pixel. In one embodiment, the 1× binary pixels and the 4× binary pixels have a square aspect, while the 2× and 8× binary pixels have an oblong aspect, thus enabling all the binary pixels to be disposed compactly within a square SSP footprint. Different size ratios and binary pixel aspect ratios may be used in alternative embodiments (e.g., each binary pixel may have an aspect ratio of $\frac{1}{2}^{1/2}$ so that when doubled along the shorter dimension to produce a larger binary pixel, the same aspect ratio is maintained), particularly where the SSP footprint is oblong or non-quadrilateral.

Regardless of the exact pixel size ratios and aspect ratios, all else being equal, larger binary pixels can have effectively lower thresholds (greater sensitivity) than smaller binary pixels when their outputs are compared with a consistent reference voltage. This is particularly true with extremely small pixel sizes (i.e., at sizes where the capacitance of the photodiode itself does not dominate the overall capacitance of the sensing node) as the larger of two such pixels receives on average proportionally more photoelectrons, and therefore exhibits a faster decline in detection node voltage (on average), than the smaller of two such pixels for the same incoming photon flux. Accordingly, the effective threshold, "$t_{\textit{eff}}$" for the 2×, 4× and 8× binary pixels can approach ½, ¼ and ⅛ that of the 1× binary pixel for the same reference voltage, 'q' and thus are shown as 'q/2', 'q/4' and 'q/8', respectively. In devices where the photodiode capacitance is non-negligible, a less pronounced difference will be observed—the differences can be characterized for a specific implementation and expressed as a set of thresholds.

Still referring to FIG. 33, the SSP receives binary pixel row signals and sense amp control signals generally as described in reference to FIG. 27 (including a single reference voltage ('q') and a reset-enable signal ("rst_en") to time the variable temporal oversampling operation described above), except that the number of binary pixel row signals is reduced to account for the reduced number of binary pixels per unit area (i.e., a logarithmically reduced number of binary pixels in the embodiment shown). The reference voltage, q, is applied to all of the binary pixels, thus obviating the distribution and selection of multiple reference voltages. In one embodiment, the same binary pixel layout is applied in all SSPs. In alternative embodiments, the sizes and/or relative positioning of differently-sized binary pixels may be altered from ASP to ASP (e.g., mirrored across an axis). Also, though a single-reference voltage embodiment is shown, multiple reference voltages may be used in combination with non-uniform binary pixel sizes to effect multi-thresholding in other embodiments. For example, two reference voltages can be applied in combination with two sizes of binary pixels to achieve four effective thresholds within a given SSP.

Figure 34:
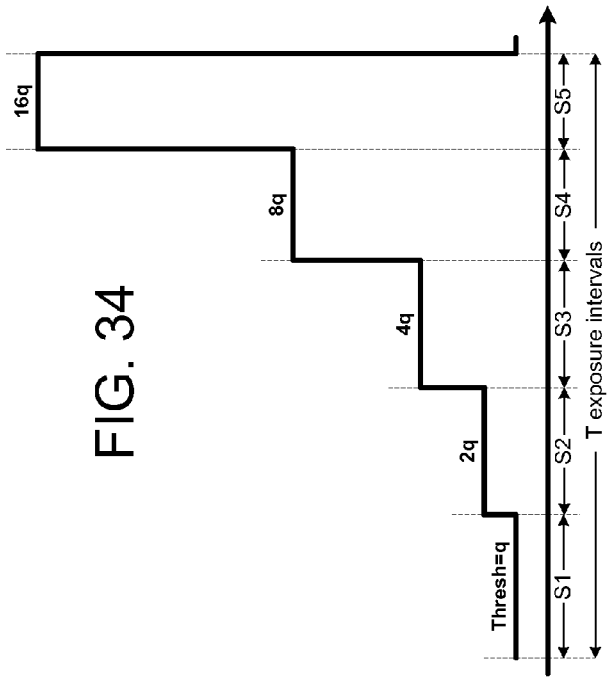
FIG. 34 illustrates an exemplary sequential application of different reference voltages to the binary pixels of an image sensor to effect a temporal rather than a spatial distribution of thresholds.

FIG. 34 illustrates an exemplary sequential application of different reference voltages to the binary pixels of an image sensor to effect a temporal rather than a spatial distribution of thresholds. In the example shown, the T clocked exposure intervals (each corresponding to a read-out of the image sensor) that constitute an image frame period are divided into a number of sub-frame intervals (five in the example shown), each associated with a respective sampling threshold. Thus, a single threshold 'q' is applied in sense/read-out operations executed within all binary pixels within the image sensor for the exposure intervals that constitute a first sub-frame interval, S1. At the conclusion of S1, the threshold is adjusted (e.g., doubled in this example) and again applied in sensor-wide binary pixel sense/read-out operations for the exposure intervals that constitute a second sub-frame interval, S2. This threshold-adjust and sensor read-out approach is repeated for each of the remaining sub-frame intervals, until the conclusion of the image frame interval is reached (i.e., image sample count=T). In alternative embodiments the threshold voltage may be stepped between more, fewer and/or different threshold levels than those shown, and the threshold steps may progress downward instead of upward or even be non-monotonic. Also, the number of image samples acquired for respective thresholds may be non-uniform (i.e., capturing more image samples at one threshold than another). Further, all such parameters (threshold value applied in each sub-frame interval, number of image samples per sub-frame interval, number of threshold steps per image frame) may be varied dynamically according to ambient conditions or other considerations (e.g., power mode, image resolution, ISO, etc.). The temporally adjusted thresholds may be employed in combination with either or both of the spatially-distributed threshold approaches described above (i.e., different reference voltages applied in connection with respective sub-groups of binary pixels and/or variably-sized binary pixels). Moreover, in all such cases, variable temporal oversampling may be employed so that a given binary pixel is reset only if its binary pixel value exceeds the threshold applied in the sampling interval.

Figure 35:
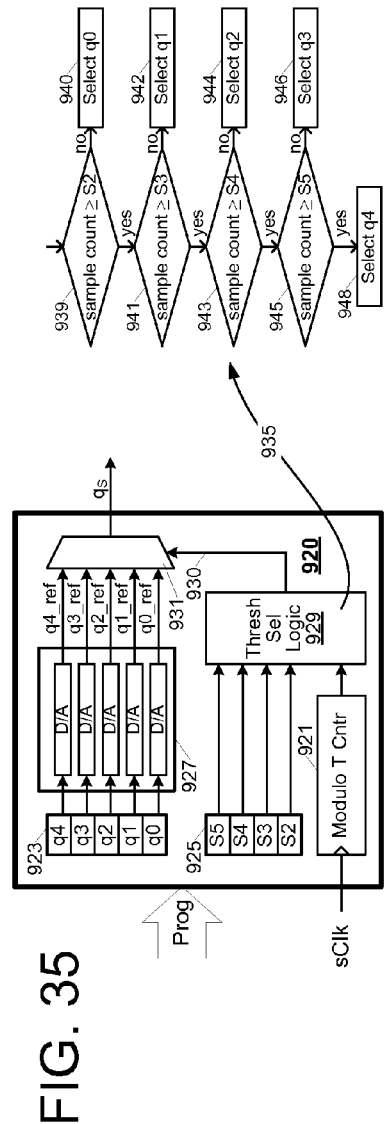
FIG. 35 illustrates an embodiment of a threshold generator that may be used to generate sequentially adjusted sampling thresholds as described in reference to FIG. 34.

FIG. 35 illustrates an embodiment of a threshold generator 920 that may be used to generate sequentially adjusted sampling thresholds as described in reference to FIG. 34. In one embodiment, threshold generator 920 is included within the row control logic of an image sensor IC (e.g., logic 155 of FIG. 3) and outputs a sequence of reference voltages as part of the sense-amp control signals supplied to the SSPs of the image sensor. In alternative embodiments, the threshold generator may be disposed elsewhere within an image sensor IC, or even partly or completely off-chip (e.g., in a host processor that outputs a sequence of digital reference values to be converted to analog form within the image sensor IC and applied in binary pixel sense/read-out operations).

In the embodiment shown, reference generator 920 includes a modulo T counter 921, threshold select logic 929, sub-frame-interval register 925, threshold register 923, D/A converter bank 927 and selector circuit 931. Subframe-interval register 925 includes storage fields to store sub-frame count values above which a corresponding one of the thresholds programmed within threshold register 923 is to be applied. In the implementation shown, for example, sub-frame-interval register 925 includes four storage fields that define the durations (in clocked exposure intervals) of the final four sub-frame intervals within the image frame period, with the first sub-frame interval (i.e., S1) being implied by the S2 sub-frame count value. More or fewer sub-frame intervals than the five shown may be supported in alternative embodiments.

Still referring to FIG. 35, modulo-T counter 921 counts transitions of a clock signal, Clk, counting up from zero to T−1 before overflowing to zero (or down from T−1 to zero before underflowing to T−1). The counter output, which represents a count of the sensor read-out being performed (i.e., the '$i^{th}$' one of the T image samples to be acquired within the image frame period) and thus a sample count, is supplied together with the sub-frame count values from register 925 to threshold select logic 929. Threshold select logic 929 compares the sample count to the sub-frame count values to produce a threshold-select value 930 corresponding to the sub-frame count range in which the sample count falls. That is, as shown in conceptual view 935, if the sample count is less than the S2 sub-frame count value (negative determination at 939), threshold select logic 929 outputs a threshold-select value to selector circuit 931 to select the q0 reference voltage (i.e., voltage level generated by D/A converter bank 927 in response to the q0 value programmed within threshold register 923) to be output as the sub-frame threshold, '$q_S$' (940). After the sample count reaches the S2 sub-frame count (affirmative determination at 939) the threshold select logic outputs a threshold-select value to select the q1 reference voltage at 942 and continues to do so until the sample count reaches the S3 sub-frame count (affirmative determination at 941). Upon reaching the S3 sub-frame count, the threshold select logic outputs a threshold-select value to select the q2 reference voltage at 944 and continues to do so until the sample count reaches the S4 sub-frame count (affirmative determination at 943). Similarly, upon reaching the S4 sub-frame count, the threshold select logic outputs a threshold-select value to select the q3 reference voltage at 946 and continues to do so until the sample count reaches the S5 sub-frame count (affirmative determination at 945), after which the threshold select logic outputs a threshold-select value to select the q4 reference voltage at 948.

The threshold generator of FIG. 35 may be varied in numerous ways in alternative embodiments. For example the D/A converters may be omitted and the threshold values instead output as set of digital signals (e.g., an N-bit signal that can be used within recipient sense amplifiers to adjust a digitally-controlled reference). Also, a single "base" threshold value may be programmed within a threshold control register and applied within other circuitry to derive the remaining thresholds (or all of the thresholds) as in the embodiment of FIG. 32A. Similarly, a single sub-frame count value (or smaller number of sub-frame count values) may be programmed and used to derive the remaining sub-frame count values. More generally, any circuitry capable of output different thresholds for different sub-frame intervals within an image frame interval may be used in alternative embodiments.

Threshold Calibration

Figure 36C:
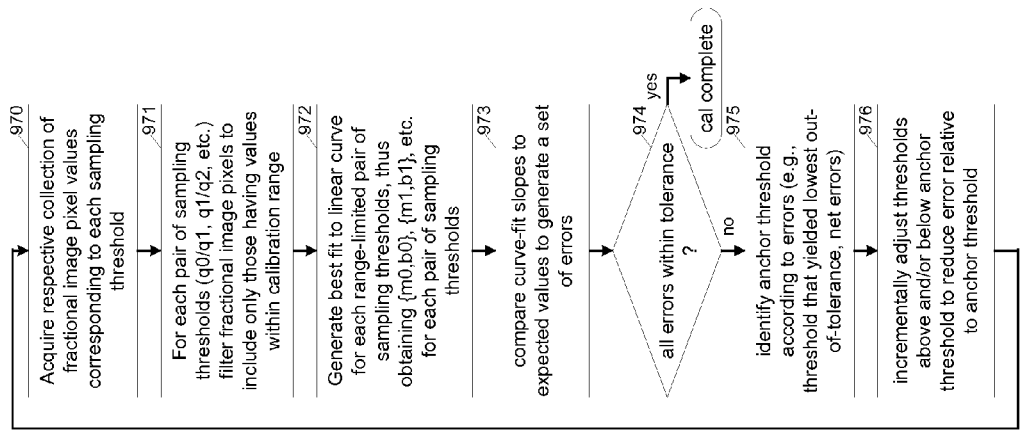
FIGS. 36A-36C illustrate an exemplary approach to calibrating thresholds in a multi-threshold binary pixel image sensor.
Figure 36A:
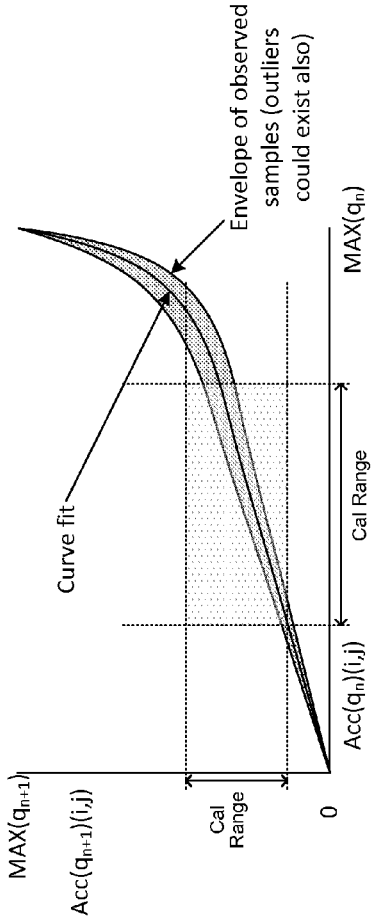
Figure 36B:
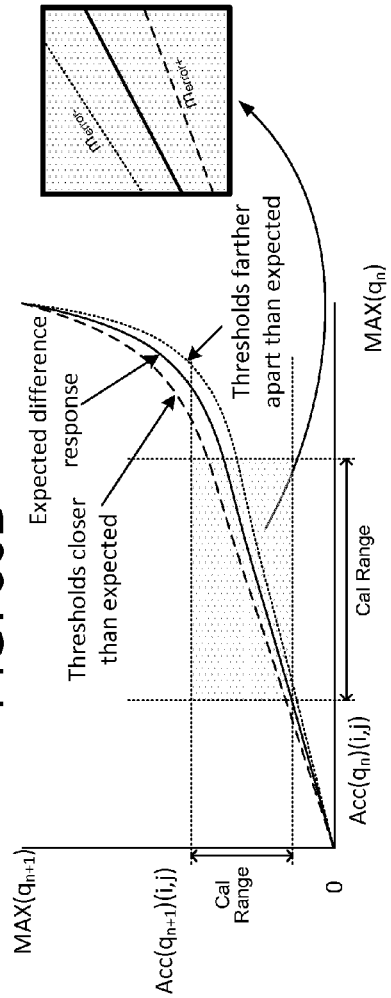

FIGS. 36A-36C relate to an exemplary approach to calibrating thresholds in a multi-threshold binary pixel image sensor. FIG. 36A is a frequency graph of threshold-specific ASP accumulations generated for sampling thresholds $q_n$ (X-axis) and $q_{n+1}$ (Y-axis). That is, binary pixel values generated in comparison to thresholds $q_n$ and $q_{n+1}$, and corresponding to spatially distributed ASPs (distributed over, for example, a quadrant or an entire image) are accumulated over a predetermined time interval (e.g., an image frame or one or more sub-frames), and values generated by each ASP are plotted as a single count in the frequency graph. That is, for a given ASP having image coordinates (i,j), a count is accumulated in the frequency graph at location (x, y) where x=accumulated value at ASP(i,j) for threshold $q_n$, and y=accumulated value at ASP(i,j) for threshold $q_{n+1}$. Regardless of actual image content, if the image is exposed so as to fully exercise both thresholds, the plotted counts will almost all lie within the envelope shown in FIG. 36A (or some other envelope, FIG. 36A being merely exemplary), with the differences largely due to photon noise and other array noise sources. As the frequency graph shows, the envelope of observed samples exhibits non-linearity at the maximum extreme (i.e., near the total possible accumulated samples) because the lower threshold begins to saturate for high luminances before the higher threshold. Below this region, the envelope progresses substantially linearly. From this observation, it follows that for a range of luminances that yields threshold-specific accumulated values within a range somewhat centered between the minimum and maximum extremes in x and below the midpoint between the minimum and maximum extremes in y, the linear relationship can be readily estimated from a single image (or less than a single image) and can be readily predicted from response equations, simulations or controlled experiments. Sampling those same luminances with a different spacing between the two threshold accumulations than those expected, however, will yield a different linear relationship. Accordingly, by e.g. choosing an appropriate calibration range ("Cal Range") for a pair of thresholds, capturing accumulated values that fall within the calibration range (which defines a window when applied to the accumulated values for each threshold) for neighboring, known-to-be-accurate thresholds, and then generating a best fit curve against the frequency results, an expected response may be obtained. In one embodiment, the expected response for each pair of adjacent thresholds (e.g., q0 and q1, q1 and q2, q2 and q3, and so forth) is predetermined and parameterized to provide references against which production-time or run-time generated frequency results may be compared. FIG. 36B illustrates an example of such a comparison, with the expected response for frequency measurements (i.e., number of instances of respective accumulated values generated by summing binary pixels) for thresholds $q_{n+1}$ and $q_n$ shown as a solid line, and error-indicating responses resulting from run-time or production-time sample accumulations for the two thresholds shown as dashed and dotted lines. As shown, when the thresholds are closer together than desired (or expected), the response rises more quickly through the calibration window than the expected response and, conversely, when the thresholds are farther apart than desired, the response rises more slowly through the calibration window than the expected response. Accordingly, in one embodiment, the slope of the calibration-segment of the estimated response curve (i.e., that portion of the response generated based on accumulated values falling within the calibration window) is compared with the slope of the calibration-segment of the reference curve to obtain error information that indicates whether the subject thresholds ($q_n$ and $q_{n+1}$) are too near or too far from one another. This error information may be used, in turn, to adjust the level of one or both thresholds, with the error measurement then being repeated to iteratively drive the thresholds to the desired separation.

FIG. 36C illustrates an embodiment of a calibration sequence that may be executed by calibration logic (e.g., a state machine, processor or other control circuitry) disposed within the image sensor IC and/or within a host processor, post-processing system or other device having access to raw image data (i.e., accumulations at different binary thresholds for each ASP). At 970, the calibration logic acquires accumulations of binary pixel values corresponding to respective sampling thresholds (referred to herein as "fractional image pixel values" as the image pixel values lack sample accumulations from all but the subject threshold). At 971, for each pair of sampling thresholds (i.e., q0 and q1, q1 and q2, etc.), the calibration logic filters the fractional image pixel values to include only those having values within a predetermined calibration range. Note that a different calibration range may be used for each of the sampling thresholds within a given pair, and again for each different pair of thresholds. At 972, the calibration logic determines a best-fit linear curve (e.g., using least-squares or other curve fit methodology) to the range-limited collection of fractional image values for each pair of sampling thresholds, thus obtaining slope (and optionally an intercept) for the range-limited response for each pair of sampling thresholds. At 973, the calibration engine compares the curve-fit slope coefficients to the expected slope coefficients to generate a set of slope errors, each slope error having a magnitude (i.e., a difference between the curve-fit slope values and expected slope values) and direction (the sign of the difference between the curve-fit slope values and expected slope values). If the magnitudes of all the slope errors are within a predetermined or programmed tolerance value (affirmative determination at 974), the calibration is deemed complete. Otherwise, the threshold that yielded the smallest out-of-tolerance net slope error (e.g., determined by averaging the out-of-tolerance slope errors obtained for any two pairs of thresholds that includes a given threshold) is determined at 975 and designated an "anchor threshold" that is to remain unchanged while one or more other thresholds are adjusted. At 976, the threshold above the anchor threshold and/or the threshold below the anchor threshold is adjusted to reduce the slope error corresponding to the adjusted threshold/anchor threshold pair. Additional adjustments may be applied with respect to other thresholds at this point, though in the embodiment shown, the operations at 970-974 are repeated to determine whether all slope errors are within tolerance and, if not, to repeat the anchor threshold identification at 975 and the incremental adjustment at 976. By this approach, the smallest out-of-tolerance slope error is identified in each loop iteration and the anchor-adjacent threshold is incrementally adjusted to reduce the magnitude of that error. The calibration loop continues to iterate until the slopes of all difference responses are within tolerance and thus, the differences between thresholds are at expected levels.

Numerous alternative or additional calibration techniques may be applied in alternative embodiments, including without limitation, further image-data-dependent calibration as well as precision reference comparison. In all such embodiments, calibration operations may be executed by logic on the image sensor die and/or on an IC coupled to the image sensor IC. Calibration operations may be carried out at regular intervals, opportunistically (e.g., when an idle state is detected or another maintenance operation is being performed) or in response to events such as threshold divergence detection, user input, etc. Also, in some embodiments, the calibration techniques are not used to adjust the sensor thresholds (or at least not used exclusively for that purpose), but are used to detect the ratios of the observed thresholds and adjust the image reconstruction algorithms to reconstruct relative luminance based on the observed thresholds from the instant the image was gathered.

Reconstruction of a multilevel-per-pixel image from a variable-temporal oversampled—and potentially multi-thresholded—binary pixel array is somewhat different than for a prior art reset binary pixel array. For a single threshold array, each ASP can return a value ACC(i,j) for the number of binary '1' pixel outputs observed spatially and temporally within that ASP for an image frame. ACC(i,j) can be accumulated on-chip, partially on-chip and partially off-chip, or completely off-chip, e.g., using the methods described above for reset binary pixel array. Once the accumulation is made, however, the device completing the accumulation can either convert the accumulation to a relative luminance value or pass the raw accumulation downstream to a storage or processing device for downstream conversion.

The relative luminance value estimated for a non-reset binary pixel ASP is, in one embodiment, the maximum likelihood relative luminance mapping to ACC(i,j). Due primarily to photon shot noise and quantization noise bias (there is a non-zero likelihood that a binary pixel will exceed the current threshold by more than one photoelectron between sample times), a range of luminances can produce each possible value of ACC(i,j). The maximum likelihood relative luminance is the luminance value that is most probable given ACC(i,j). The values can be derived from an equation and stored in a lookup table or evaluated directly by a processor, derived via simulation and stored in a lookup table, or derived via controlled measurements and stored in a lookup table. A lookup table can be stored in on- or off-chip nonvolatile memory, transferred from such memory to an on- or off-chip volatile memory for use, or created directly by a host processor for a given current thresholds/samples setting set.

A variety of approaches exist when the non-reset binary pixel ASP is operated in a multi-threshold mode. In one approach, a value ACC(i,j) is returned for each ASP as in the single-threshold case, and evaluated by an equation or input to a lookup table as in the case above. The equation/lookup table result depends on the actual thresholds used and the number of sample points available per ASP at each sample point. When the equation or lookup table miss-models these factors, reconstruction errors will result. The calibration methods described above can reduce such errors in an appropriate embodiment.

Although a direct estimate from a multi-threshold joint-accumulated ASP is possible, such an estimate is generally sub-optimal. Optimality is not achieved because not all accumulated samples have the same probability density function—intuitively, a threshold that is exceeded at almost every observation point has a much larger uncertainty than one that is exceeded at roughly every third observation point. Thus a better estimate can be obtained if it is possible for the binary sensor to return, for each ASP, separate accumulations ACC $(q_n)$(i,j) for each threshold $q_n$. A relative luminance maximum likelihood function can then be evaluated from the joint probability density function of all ACC($q_n$)(i,j), considered together. In one embodiment, the joint PDF is stored as a multidimensional lookup table, from which relative luminance is interpolated. In another embodiment, the PDFs are assumed independent and are represented separately for each threshold $q_n$. The individual PDFs are then jointly evaluated to produce an estimate.

For embodiments that rely on mathematical construction of a luminance function or lookup, the following equations provide a mathematical underpinning for calculation of a response function for a non-reset, multi-threshold binary pixel array:

| | |
|---|---|
| A | Area of ASP |
| $n_{qa}$ | Number of groups of BP in ASP, q and a are the same within a group but different between groups |
| $q_i$ | Threshold of BP in group i |
| $s_i$ | Number of BP in group i |
| $a_i$ | Area of BP in group i |
| $\Phi$ | Photon flux |
| $t_{exp}$ | Exposure time |
| $\Lambda$ | Number of photons hitting ASP during exposure time |
| $\lambda_{im}$ | Number of photons hitting one BP out of group i during sampling period m |
| $t_{im}$ | Duration of sampling period m in group i |
| N | Total temporal oversampling |
| S | Total spatial oversampling |
| $p_m(q_i)$ | Probability of BP in group i to exceed threshold during sampling period m |
| c | Accumulated sensor response (count of events above threshold in ASP) |
| E(c) | Expected value of sensor response |
| $c_{meas}$ | Measured sensor response (count of events above threshold in ASP) |
| $\Lambda_{est}$ | Estimated number of photons on ASP |
| $\Phi_{est}$ | Estimated photon flux |

$$A = \sum_{i=1}^{n_{qa}} s_i a_i$$

$$S = \sum_{i=1}^{n_{qa}} s_i$$

$$\Lambda = \Phi t_{exp} A$$

$$\lambda_{im} = \Lambda \frac{t_{im}}{t_{exp}} \frac{a_i}{A}$$

For $i \in [1, n_{qa}]$ $$t_{exp} = \sum_{m=1}^{N} t_{im}$$

$$Q_{q_i,m} = 1 - e^{-\lambda_{im}} \sum_{k=0}^{q_i-1} \frac{\lambda_{im}^k}{k!}$$

$$p_1(q_i) = Q_{q_i,1}$$

$$p_2(q_i) = p_1(q_i) Q_{q_i,2} + \sum_{n=0}^{q_i-1} \frac{\lambda_{i1}^n e^{-\lambda_{i1}}}{n!} Q_{q_i-n,2}$$

For $m \in [3, N]$ and $i \in [1, n_{qa}]$

-continued $$p_m(q_i) = \left( p_{m-1}(q_i)Q_{q_i,m} + \sum_{j=1}^{m-2} p_j(q_i) \frac{\sum_{n=0}^{q_i-1} \left[\sum_{k=1}^{m-1}\lambda_{ik}\right]^n e^{-\sum_{k=1}^{m-1}\lambda_{ik}}}{n!} + \frac{\left[\sum_{k=j+1}^{m-1}\lambda_{ik}\right]^n e^{-\sum_{k=j+1}^{m-1}\lambda_{ik}}}{n!} \right) Q_{q_i-n,m}$$

$$\mathbb{E}(c) = \sum_{i=1}^{n_{qa}} s_i \sum_{m=1}^{N} p_m(q_i)$$

$$\Lambda_{est} = \mathbb{E}^{-1}(c_{meas})$$

$$\Phi_{est} = \frac{\Lambda_{est}}{t_{exp}A}$$

Photo Detector Concentration

Simulations and analyses of temporal-oversampled binary imaging embodiments disclosed above demonstrate the importance of threshold uniformity and fill factor in the development of high fidelity images. Further, while conceivable that information regarding "brighter" vs. "darker" areas of an algorithmic super pixel could be obtained and applied, for example, to effect a weighted combination of the samples obtained from respective binary pixels, obtaining and applying such information adds significant cost and overhead to the resultant imaging system. Accordingly, in a number of embodiments, logic '1' binary pixel values are tallied to form an ASP value without regard to the location of individual binary pixels from which those values were drawn (i.e., no intra-ASP location information is obtained or applied in generating the tally). This approach not only avoids the cost and overhead of applying location-specific information, but also loosens constraints on pixel structure and layout as crosstalk between neighboring binary pixels becomes moot (so long as a given photon strike is captured within an ASP it is not critical which binary pixel of the ASP registers the photon strike) and a spatially regular binary pixel layout (e.g., square or hexagonal tessellation) is not strictly required.

In view of the foregoing considerations, in a number of embodiments, the photo-detection elements and control elements of the binary pixels within a given algorithmic super pixel are segregated, thus permitting concentration of the photo detection elements (i.e., light sensitive portions of an algorithmic super pixel) to be concentrated in a common area that can be associated with a microlens or other light-focusing structure. The control elements (or "binary pixel transistors") may then be pushed to the periphery of the super pixel and co-located with or made contiguous to sense amplifier circuitry. In one embodiment, for example, an oblong photodiode shape is used to push binary pixel control elements to one end of a given row of binary pixels, thus effecting a central ASP region composed almost entirely of photodiodes. A microlens and color filter (for color systems) can be provided to focus light on the photodiode region and away from the binary pixel control elements and sense amplifier structures. Also, by positioning pixel control transistors adjacent the photodiode row at a super pixel border region, a sense amp can be placed between two ASPs and serve both, with the two sets of pixel control transistors and sense amp optionally being masked from incoming light.

FIG. 37 illustrates an embodiment of a sense amp super pixel 1001 having spatially concentrated photodiodes in accordance with the approach described above. As shown, SSP 1001 includes a sense amplifier sandwiched between upper and lower binary pixel control transistors, with the overall set of sense amp and binary pixel control transistors being centered between upper and lower photodiode concentrations. A corresponding binary pixel schematic is shown, for example, in detail view 1006. When stacked within a column with other such SSPs as shown at 1003, the upper photodiodes of SSP 1001 are disposed adjacent the lower photodiodes of the SSP above, and the lower photodiodes of SSP 1001 are likewise disposed adjacent the upper photodiodes of the SSP below, thus effecting an extremely dense arrangement of light collecting elements within a region (e.g., an ASP) to which light may be focused and over which a color filter may be applied.

Figure 38:
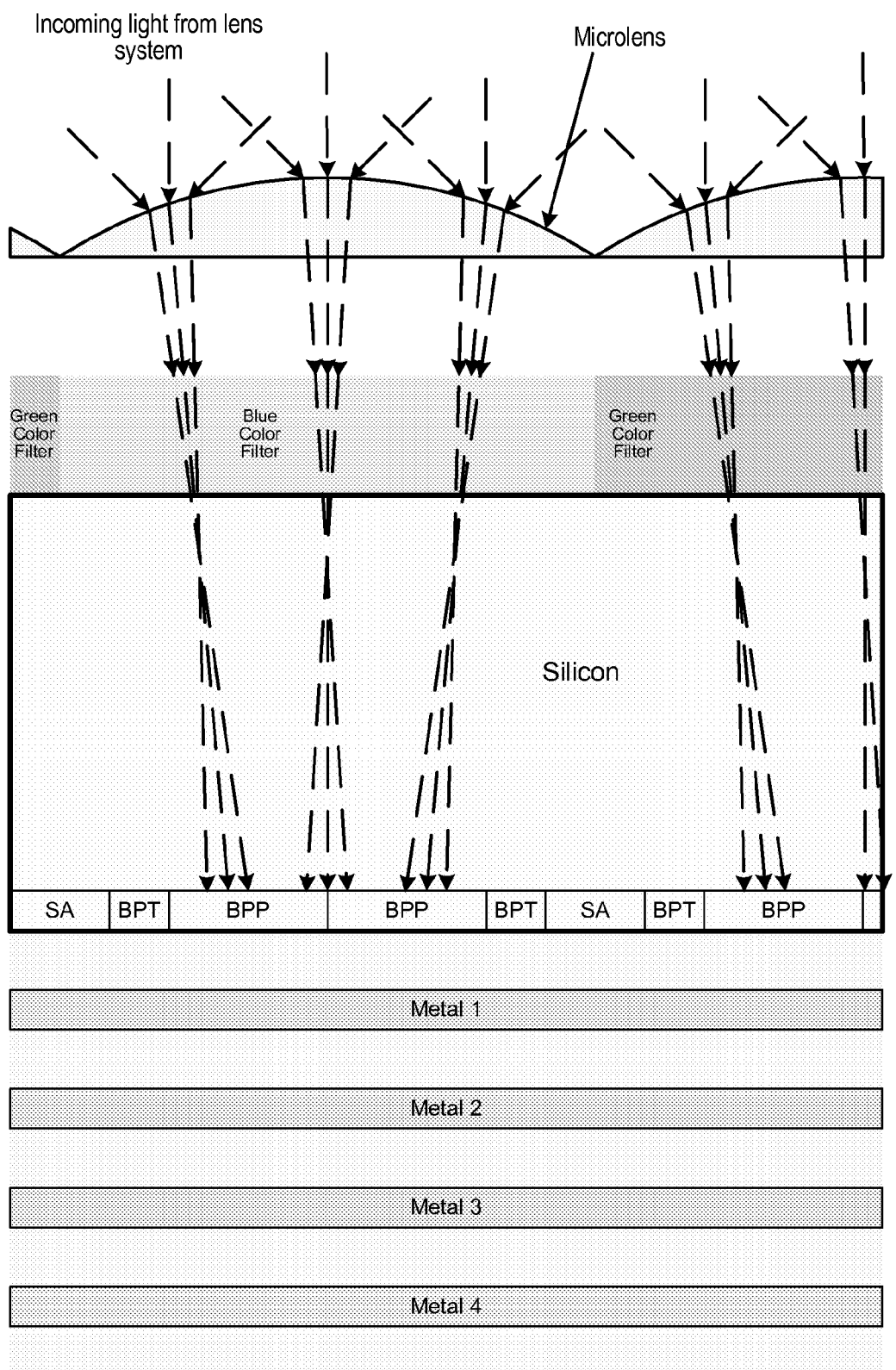
FIG. 38 shows a side view of a simplified material stack corresponding to FIG. 37.

FIG. 38 shows a side view of a simplified material stack corresponding to FIG. 37 (back side imaging may be employed to accommodate wiring at the binary pixel pitch). Although point sources are not "resolved" by a binary pixel (BP), light is generally directed to the binary pixel photodiodes ("BPP") and not to the binary pixel control transistors ("BPT") or sense amplifiers ("SA").

Figure 39:
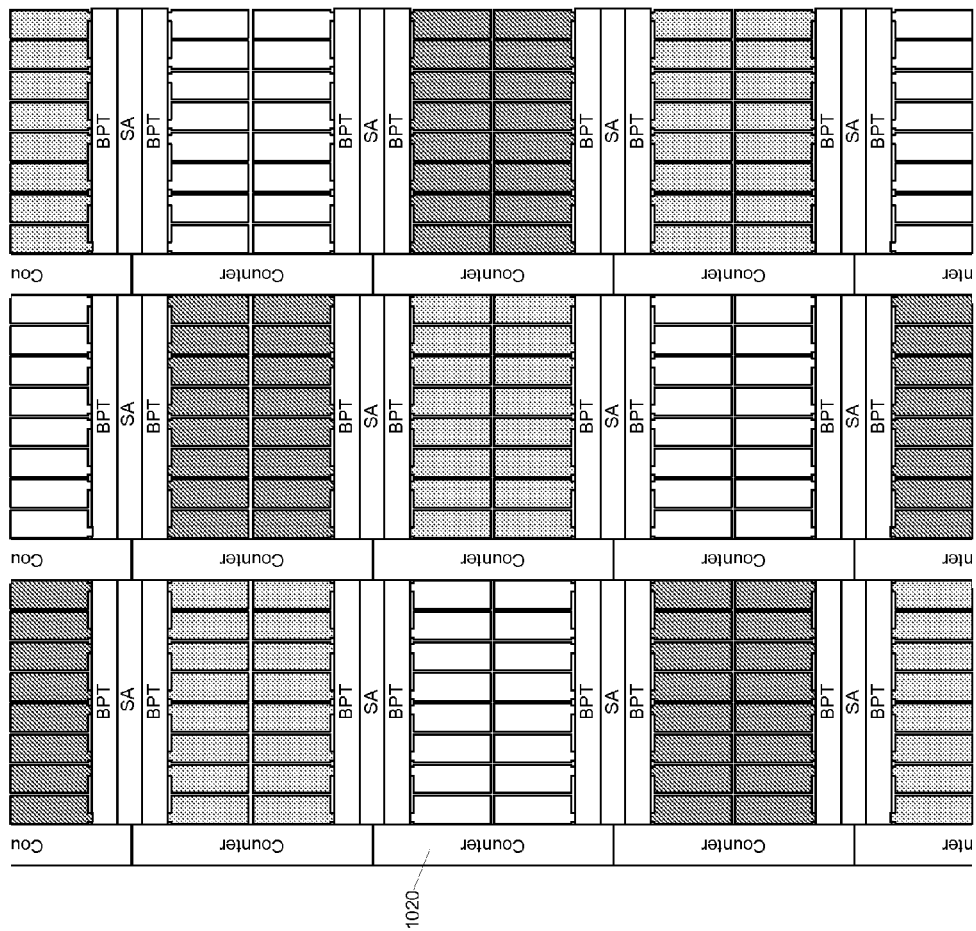
FIG. 39 illustrates an exemplary disposition of counters between columns of super pixels to effect massively parallel counting of the ASP readouts.

In other embodiments, the approach shown in FIGS. 37 and 38 is extended by embedding compression logic (e.g., counter circuitry) within the array, thereby shortening the signal drive path from SSPs to compression logic and dramatically reducing the signaling bandwidth (and thus the power) required to extract data from the image sensor array. FIG. 39, for example, illustrates the disposition of counters 1020 between columns of super pixels to effect massively parallel counting of the ASP readouts. In the embodiment shown, a counter is provided per ASP so that no image readout is required until the complete oversampling period (i.e., partial or complete image frame period, depending on counter depth) transpires. That is, the counter counts up P individual binary pixel values read-out of the ASP in each of the T clocked exposure intervals that transpire within an image frame period, thus generating a count value between 0 and (P*T)−1 for the corresponding image pixel (which may be further processed to reconstruct a final image pixel value). In other embodiments, a given counter may be shared by some number (R) of ASPs within a given column, where R=2, 3, 4, 5, or any other practicable number of counter-sharing ASPs. In the latter embodiment, the binary pixel row signal may be sequenced to enable sampling of all binary pixels within a given ASP row before proceeding to the next ASP row, thus enabling all the binary pixel values within a given ASP to be tallied before the ASP value is output from the counter to a I/O circuitry (or further compression circuitry) at the edge of the array. The counter is then reset and another ASP is tallied.

Figure 40:
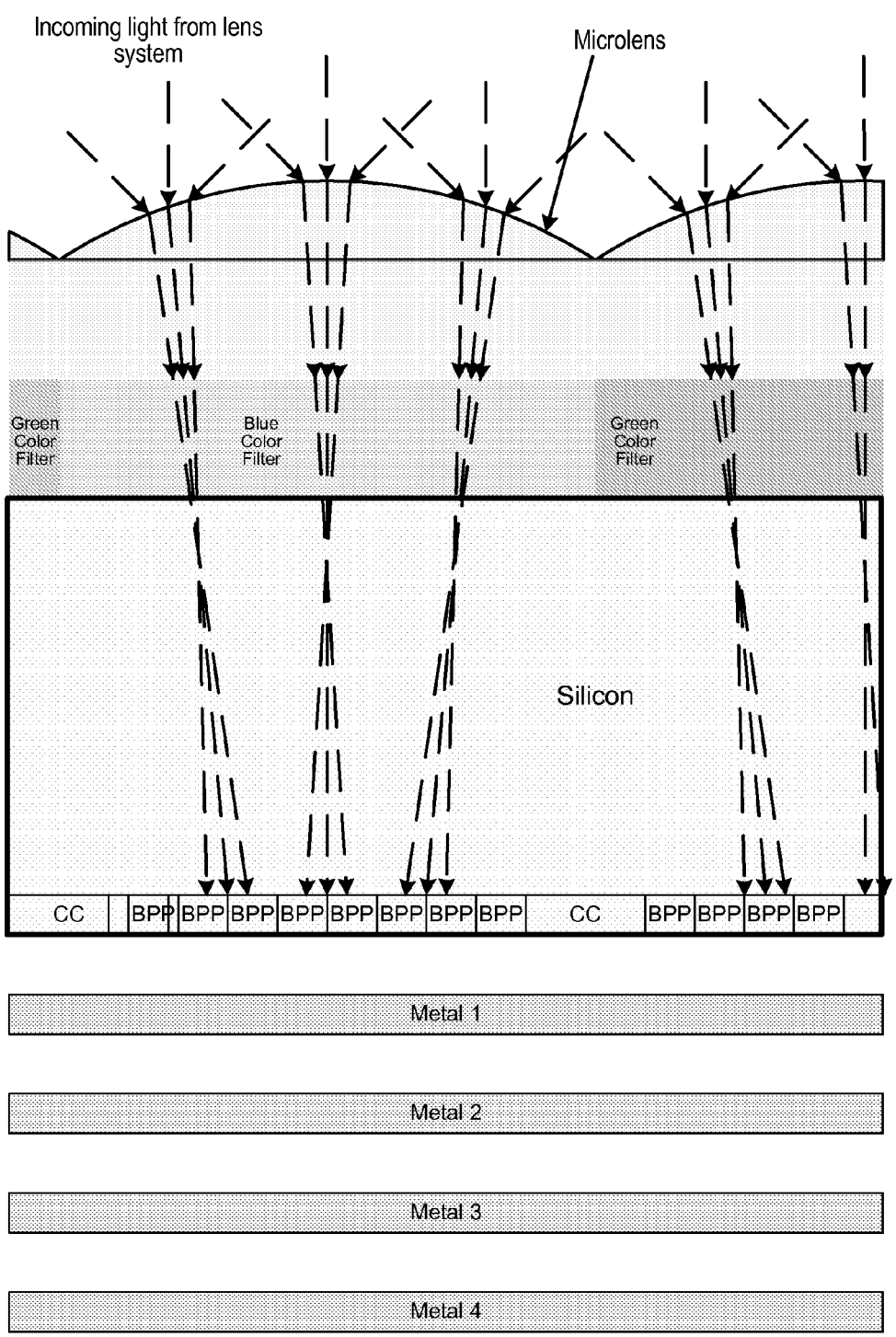
FIG. 40 illustrates an orthogonal cross-section of a binary pixel image sensor having embedded counters.

In the orthogonal cross-section of an embedded-counter embodiment shown in FIG. 40, the BP pitch is finer, with the counter circuitry ("CC") disposed between super pixels. Although conceptually the light is shown reaching the BPs, in reality photons are converted to electron-hole pairs in the silicon layer shown and the electrons are collected by a nearby binary pixel.

In one embodiment, a maximum threshold corresponding to approximately 200 photons is used to resolve between logic '1' and logic '0' samples, and a photodiode area of roughly 0.25 square microns is employed to achieve this full-well. An exemplary super pixel unit cell is laid out with 16 such photodiodes (0.25×1 micron), with a unit cell pitch of 2.33 microns in both directions, as shown in FIG. 41A. Other maximum-thresholds, photodiode dimensions and super pixel layouts may be used in alternative embodiments.

Still referring to FIG. 41A, freed from the need to control which binary pixel receives a given photoelectron, the isolation between the photodiodes (covered by the green filter) can be reduced as compared to traditional neighboring pixels to further improve efficiency. Color isolation may be achieved by placing circuits (e.g., binary pixel transistors, sense amp/reset, counter, etc.) between the super pixel color groups. Each sense amp/reset circuit serves eight binary pixels from one color filter above (i.e., above the sense amp/reset circuit) and eight binary pixels from one color filter below. The upper sense amp can sense an upper "green" pixel, and then output the result to be counted within the counter while the lower sense amp senses a lower green pixel. The upper sense amp can sense the next upper green pixel while the lower sense amp outputs its result to the counter. Counters can be shared by neighboring super pixels, or one dedicated to each color filter (e.g., counter for a cluster of green super pixels, counter for a cluster of red super pixels and a counter for a cluster of blue super pixels). In the either case, a single set of binary pixel row signals (e.g., /bprE0-/bprE7) may be used to support pixel sense, read-out and count operations within the super pixel shown. For example, concurrent operations may be enabled with respect to counterpart upper and lower binary pixels through sequential assertion of shared binary pixel row signals /bprE0-/bprE7, or separate binary pixel row signals may be provided (e.g., /bprO0-/bpr07 as shown) to enable the upper and lower binary pixels to be separately accessed and controlled. In an embodiment in which the pixel reset voltage is used to establish (in whole or part) the binary pixel sampling thresholds, Vrst1 and Vrst2, can be set to the same or different voltages and thus effect uniform or non-uniform sampling thresholds between the upper and lower sets of pixels. The pixel read/reset circuitry shown is merely exemplary, demonstrating one possible way in which this layout allows sharing of contacts along a line of BPs.

FIG. 41B illustrates one of the exemplary binary pixels from FIG. 41A together with a corresponding schematic demonstrating the manner in which the doped channels, p-well and polysilicon structures form the five interconnected binary pixel transistors shown in detail view 1006 of FIG. 37. FIG. 41C illustrates lines of symmetry about which adjacent binary pixels within the embodiment of FIG. 41A are mirrored to form a particularly compact binary pixel transistor implementation, including three shared contacts at the line of symmetry between binary pixels 1025*a* and 1025*b*, and two shared contacts at the line of symmetry between binary pixels 1025*b* and 1025*c*. Also, deposition layer 1028 extends across the breadth of the binary pixel row (like a bus bar) to permit convenient interconnection to the pixel reset ("pxrst"), current-source ("csrc") and sample ("samp") lines. Another row of binary pixels may be mirrored across an axis parallel to the pixel reset, current-source and sample lines, and connected thereto via contacts to a corresponding instance of deposition layer 1028.

FIG. 42 shows an alternate embodiment of a super pixel cell layout (not necessarily to scale as far as achievable pixel fill factor—the smaller the circuits can be, the larger the central region for light collection). Each photodiode 1-16 features a contact to the diode and a contact to a reset gate. Neighboring pixels share a contact to one of 3 voltage reset references Vrst1-Vrst3. The source follower and its select transistor, and the pixel reset enable circuitry (together with a source follower reset block SFRn) for each of the BPs are arranged around the periphery of the photodiode group, with sense amps and counters ringing the SFRn blocks. An alternate embodiment may include the source follower in each pixel block, e.g., if required to achieve uniformity.

It should be noted that the various circuits disclosed herein can be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions can be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions can be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

The section headings in the above detailed description have been provided for convenience of reference only and in no way define, limit, construe or describe the scope or extent of the corresponding sections or any of the embodiments presented herein. Also, various modifications and changes can be made to the embodiments presented herein without departing from the broader spirit and scope of the disclosure. For example, features or aspects of any of the embodiments can be applied, at least where practicable, in combination with any other of the embodiments or in place of counterpart features or aspects thereof. Accordingly, the specification and drawings are to be regarded in an illustrative rather than a restrictive sense.

What is claimed is:

1. An image sensor comprising:
    a plurality of pixel circuits disposed in rows and columns, each of the plurality of pixel circuits having a first light-detecting element operable to integrate photocharge, output circuitry operable to selectively output a signal indicative of photocharge integrated by the first light-detecting element, and individual pixel-circuit addressable reset circuitry operable to remove photocharge integrated by the first light-detecting element since the prior operation of the reset circuitry;
    control circuitry operable to select subgroups of the pixel circuits to output the respective signals indicative of integrated photocharge, and operable such that each pixel circuit in the plurality is selected at least four times during a frame period;
    a plurality of comparators, operable such that each pixel circuit in a given subgroup of the pixel circuits selected by the control circuitry is paired with one of the comparators to generate a binary pixel value that indicates whether the photocharge integrated by the corresponding light-detecting element exceeds a threshold; and
    a plurality of reset signal generators each paired with a respective one of the comparators and each operable such that when the paired comparator generates a binary pixel value indicating threshold exceedance, the reset signal generator asserts a reset signal to cause the reset circuitry within the currently paired pixel circuit to reset the state of the light-detecting element.

2. The image sensor of claim 1, integrated into an optical system wherein the plurality of pixel circuits is placed on a pixel pitch smaller than the diffraction limit of the optical system.

3. The image sensor of claim 1 wherein the output circuitry in each of the pixel circuits comprises:
    an amplifying element coupled to a detection node of the light-detecting element to generate, at an output node of the amplifying element, the signal indicative of the integrated photocharge; and
    an access element to switchably couple the output node of the amplifying element to the paired comparator based on a select signal supplied by the control circuitry.

4. The image sensor of claim 3 wherein the reset circuitry in each of the pixel circuits comprises circuitry coupled to the detection node of the light-detecting element to remove integrated photocharge based on both a signal supplied by the control circuitry and the reset signal supplied by the paired reset signal generator.

5. The image sensor of claim 1, wherein each of the pixel circuits further comprises a second light-detecting element operable independently of the first light-detecting element.

6. The image sensor of claim 5, wherein the first and second light-detecting elements have different sizes.

7. The image sensor of claim 1 further comprising accumulators paired respectively with pixel circuits to, when one of the reset signal generators generates a binary pixel value indicating threshold exceedance, add a corresponding pixel circuit value to a value stored in the paired accumulator.

8. The image sensor of claim 7, wherein the pixel circuit value is binary.

9. The image sensor of claim 1 further comprising output logic to, when a reset signal generator generates a binary pixel value indicating threshold exceedance, transmit a corresponding pixel circuit value to another circuit.

10. The image sensor of claim 9, wherein the pixel circuit value is binary.

11. The image sensor of claim 1 further comprising counter logic to generate a count value corresponding to a subgroup of the pixel circuits, the counter logic including circuitry to increment the count value, based on a first collection of at least two of the pixel circuits, when the state of the light-detecting element within any of the pixel circuits of the first collection of the pixel circuits is reset.

12. The image sensor of claim 1, wherein the reset circuitry for at least two pixel circuits pairable with one of the comparators is connected to drive the light-detecting elements for those two pixel circuits to different reset voltages.

13. The image sensor of claim 1, wherein for at least two pixel circuits pairable with one of the comparators, the comparator compares the photocharge integrated by the light-detecting elements of the two pixel circuits with respective, different thresholds.

14. A method of operation for capturing an image frame with a plurality of pixel circuits on an image sensor, the method comprising:
    selecting a subgroup of the pixel circuits to output respective signals indicative of integrated photocharge, each pixel circuit being selected N times during the period of the image frame, where N is greater than one;
    determining, for each pixel circuit in the selected subgroup, whether the signal indicative of integrated photocharge exceeds one or more thresholds; and
    conditionally resetting each pixel circuit in the selected subgroup to a reset state depending on whether the corresponding signal indicative of integrated photocharge within that pixel circuit exceeds the one or more thresholds and independently of whether signals indicative of integrated photocharge in other pixel circuits in the selected subgroup exceed the one or more thresholds such that a time interval between successive resets of any one pixel circuit in the selected subgroup may be different from a time interval between successive resets of any other pixel circuit in the selected subgroup.

15. The method of claim 14 wherein the pixel circuits on the image sensor are disposed on the image sensor with a pitch smaller than a diffraction limit of an optical system into the image sensor is integrated.

16. The method of claim 14 further comprising incrementing a count value corresponding to the subgroup of the pixel circuits when any of the pixel circuits of the subgroup is reset.

17. The method of claim 14 wherein conditionally resetting each pixel circuit to a reset state comprises resetting a first one of the pixel circuits in the selected subgroup to a first reset voltage and resetting a second one of the pixel circuits in the selected subgroup to a second reset voltage, the second reset voltage being different from the first reset voltage.

18. The method of claim 14 wherein determining, for each pixel circuit in the selected subgroup, whether the signal indicative of integrated photocharge exceeds the one or more thresholds comprises comparing the signal indicative of integrated photocharge for a first one of the pixel circuits in the selected subgroup with a first threshold and comparing the signal indicative of integrated photocharge for a second one of the pixel circuits in the selected subgroup with a second threshold, the second threshold being different from the first threshold.

19. The method of claim 14 wherein N is greater than three.

20. An image sensor having a plurality of pixel circuits, the image sensor comprising:

means for concurrently selecting a subgroup of the pixel circuits to output respective signals indicative of integrated photocharge, each pixel circuit being selected at least four times during the period of the image frame;

means for determining, for each pixel circuit in the selected subgroup, whether the signal indicative of integrated photocharge exceeds one or more thresholds; and means for conditionally resetting each pixel circuit in the selected subgroup to a reset state depending on whether the corresponding signal indicative of integrated photocharge within that pixel circuit exceeds the one or more thresholds and independently of whether signals indicative of integrated photocharge in other pixel circuits in the selected subgroup exceed the one or more thresholds such that a time interval between successive resets of any one pixel circuit in the selected subgroup may be different from a time interval between successive resets of any other pixel circuit in the selected subgroup.

* * * * *